Figure 3:
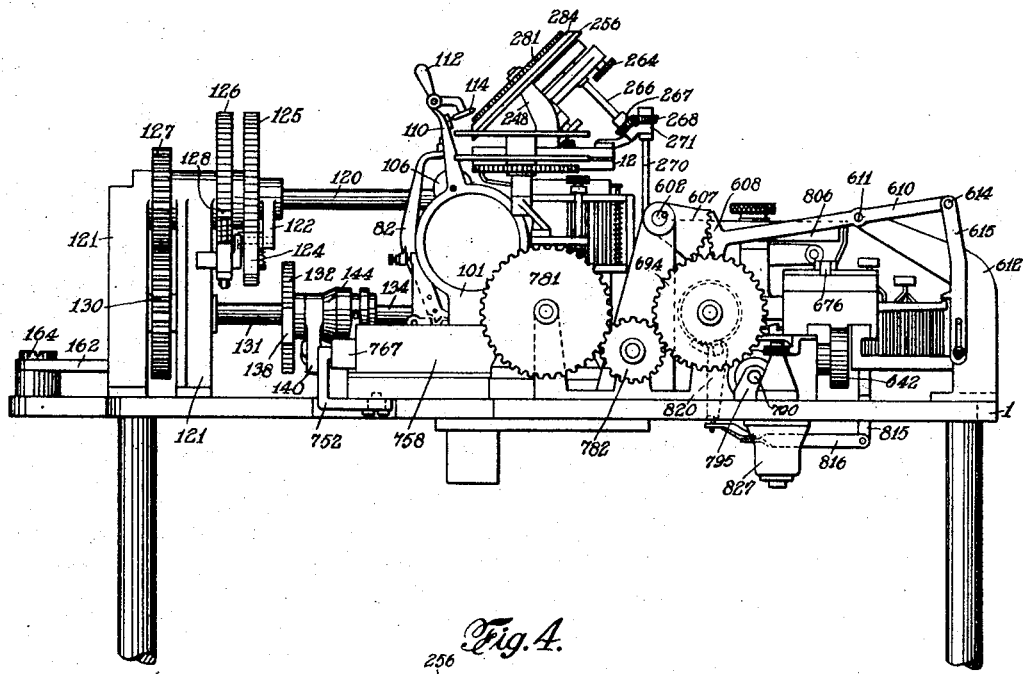

May 21, 1940.  H. C. JONES  2,201,776
TYPING MACHINE
Filed May 2, 1934  33 Sheets-Sheet 1
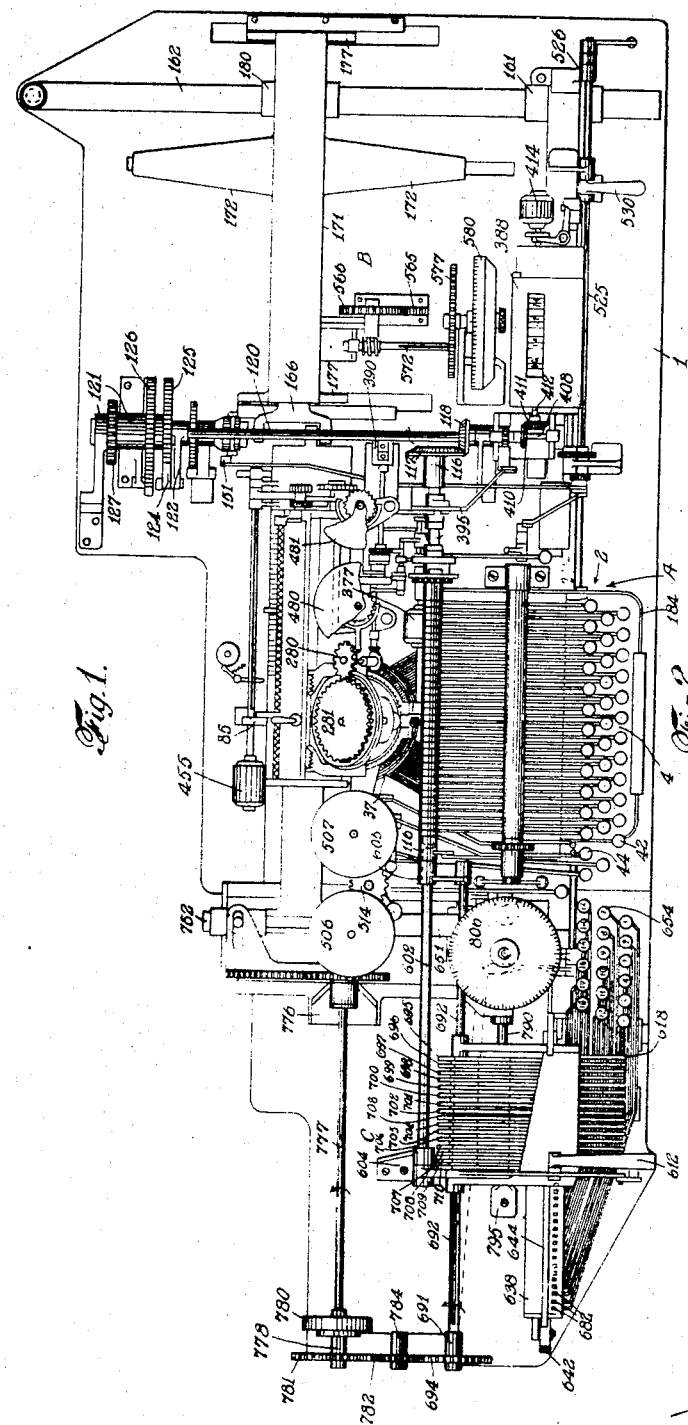
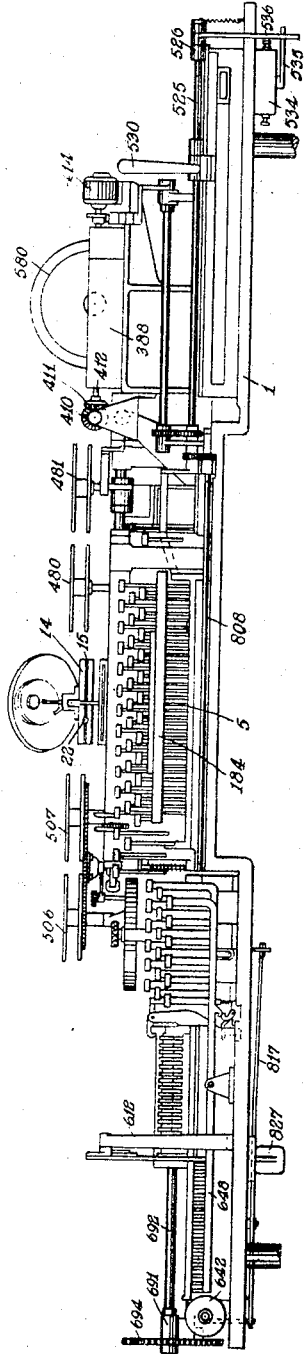
INVENTOR
Harry C. Jones
BY
Williams, Rich & Morse
ATTORNEYS May 21, 1940.  H. C. JONES  2,201,776
TYPING MACHINE
Filed May 2, 1934  33 Sheets-Sheet 2

INVENTOR
Harry C. Jones
BY
Williams, Rich & Morse
ATTORNEYS

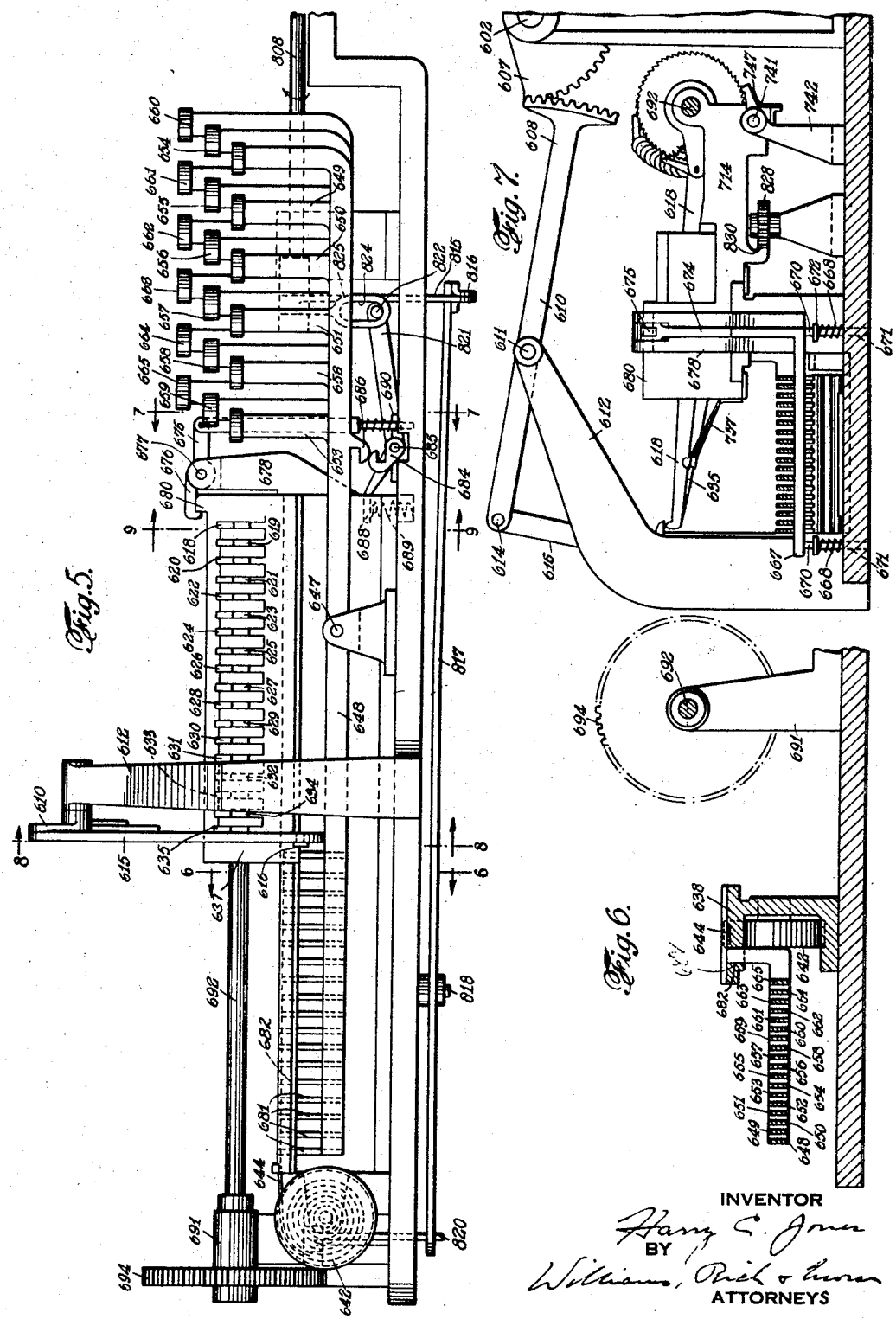

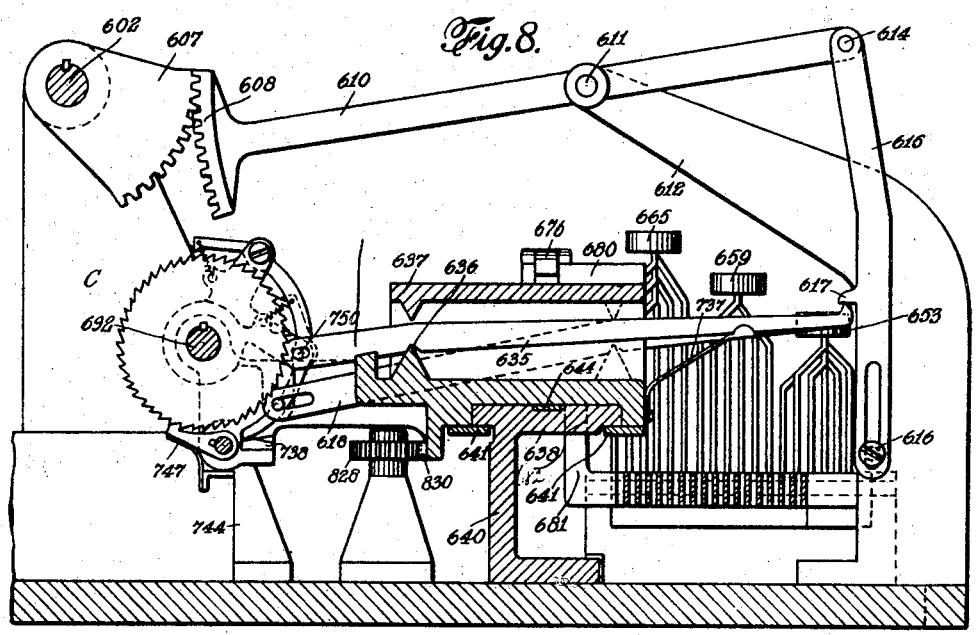

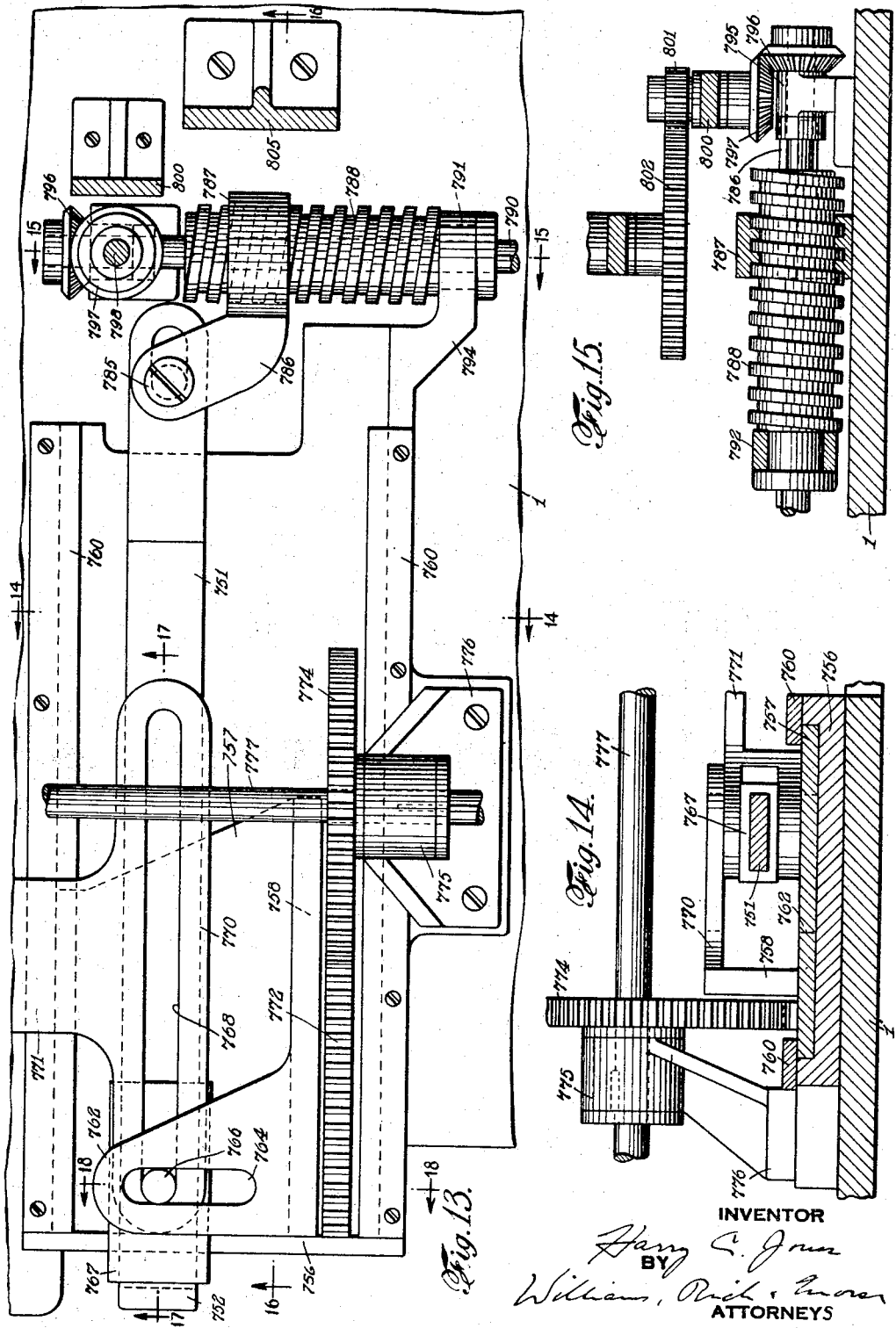

May 21, 1940.                    H. C. JONES                    2,201,776
                                TYPING MACHINE
                             Filed May 2, 1934            33 Sheets-Sheet 6
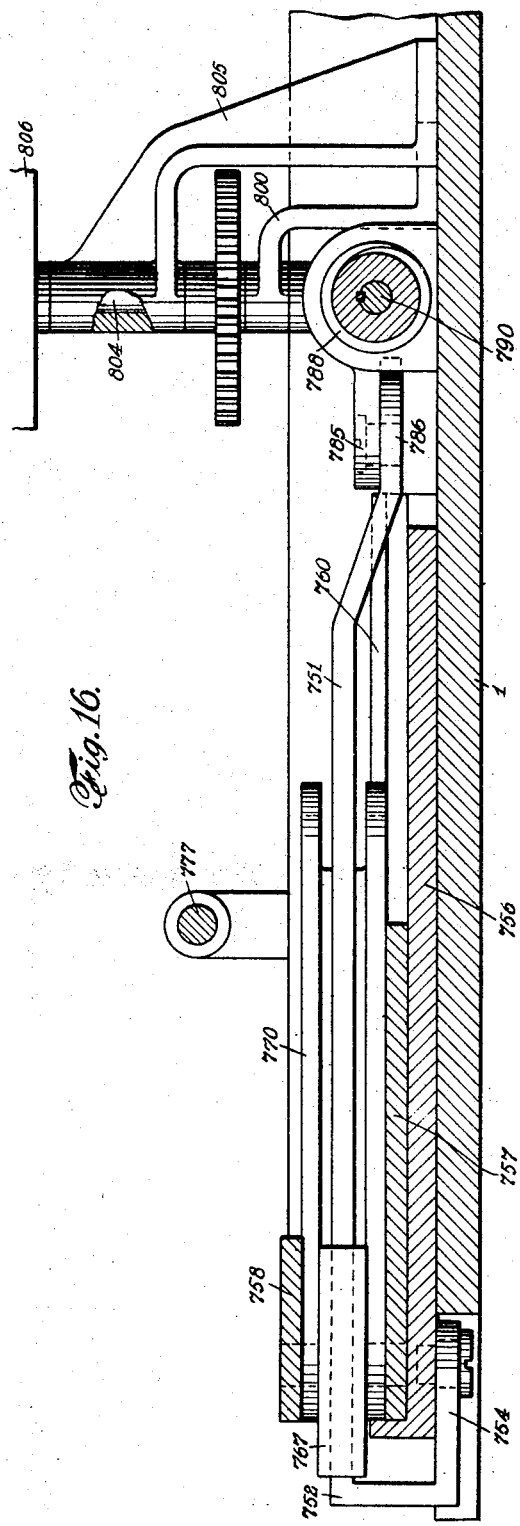
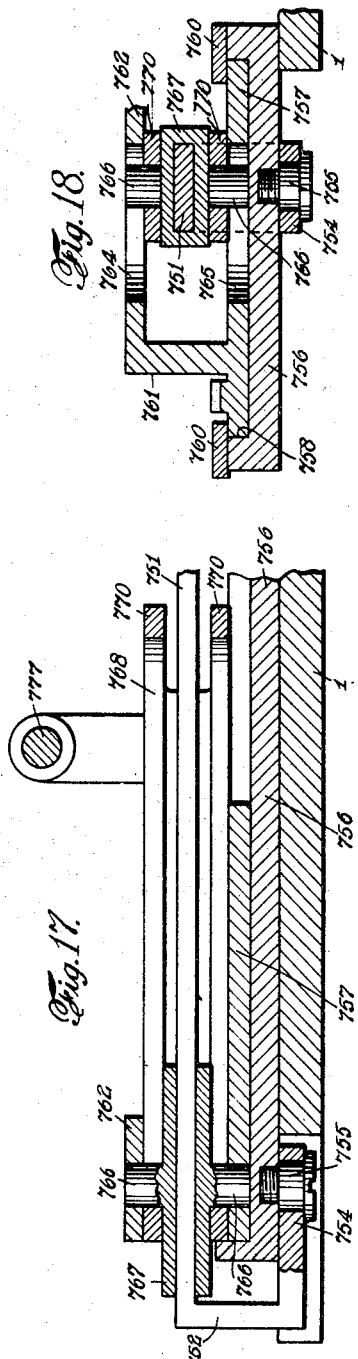
INVENTOR
Harry C. Jones
BY
Williams, Rich & Morse
ATTORNEYS

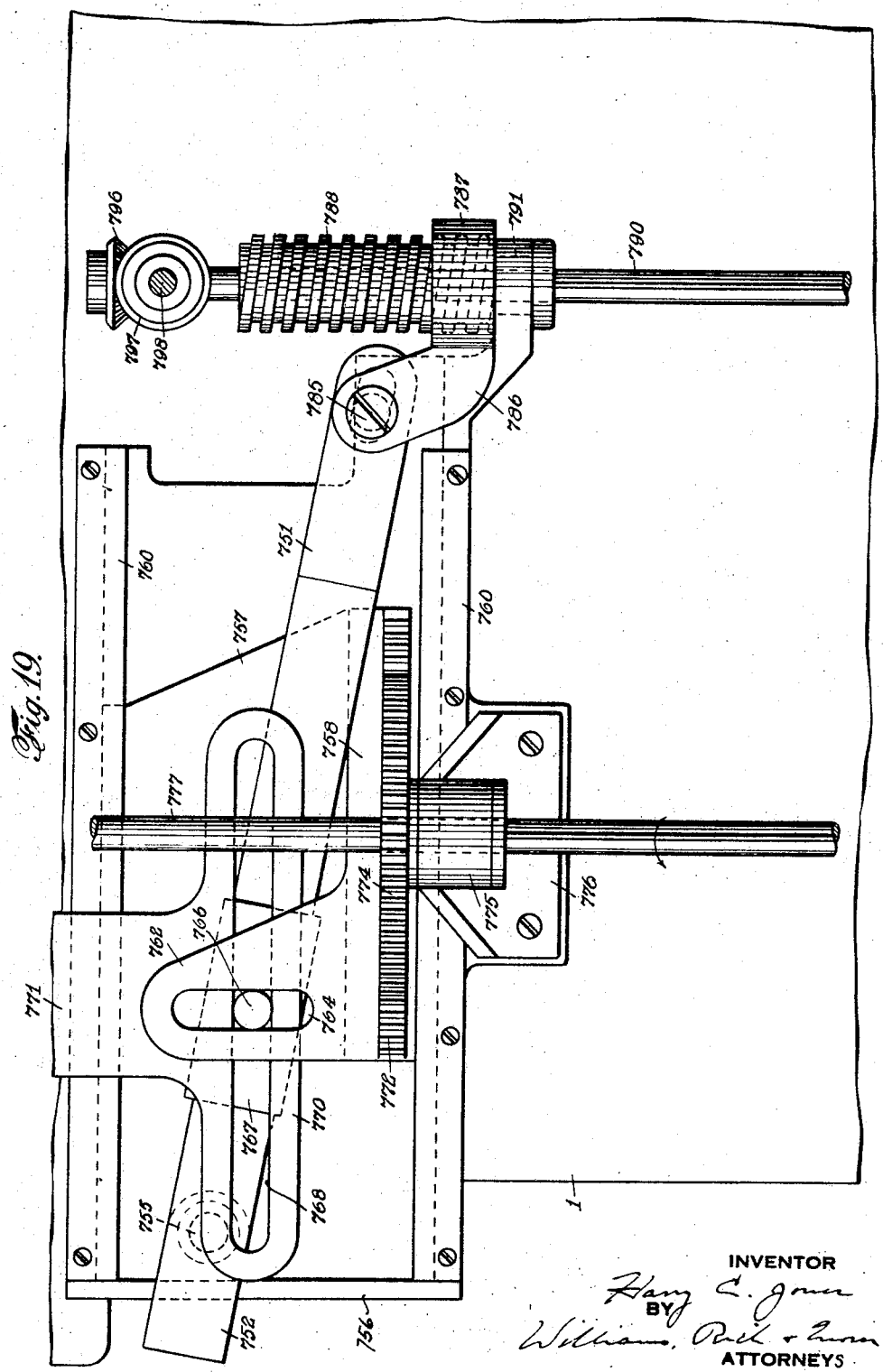

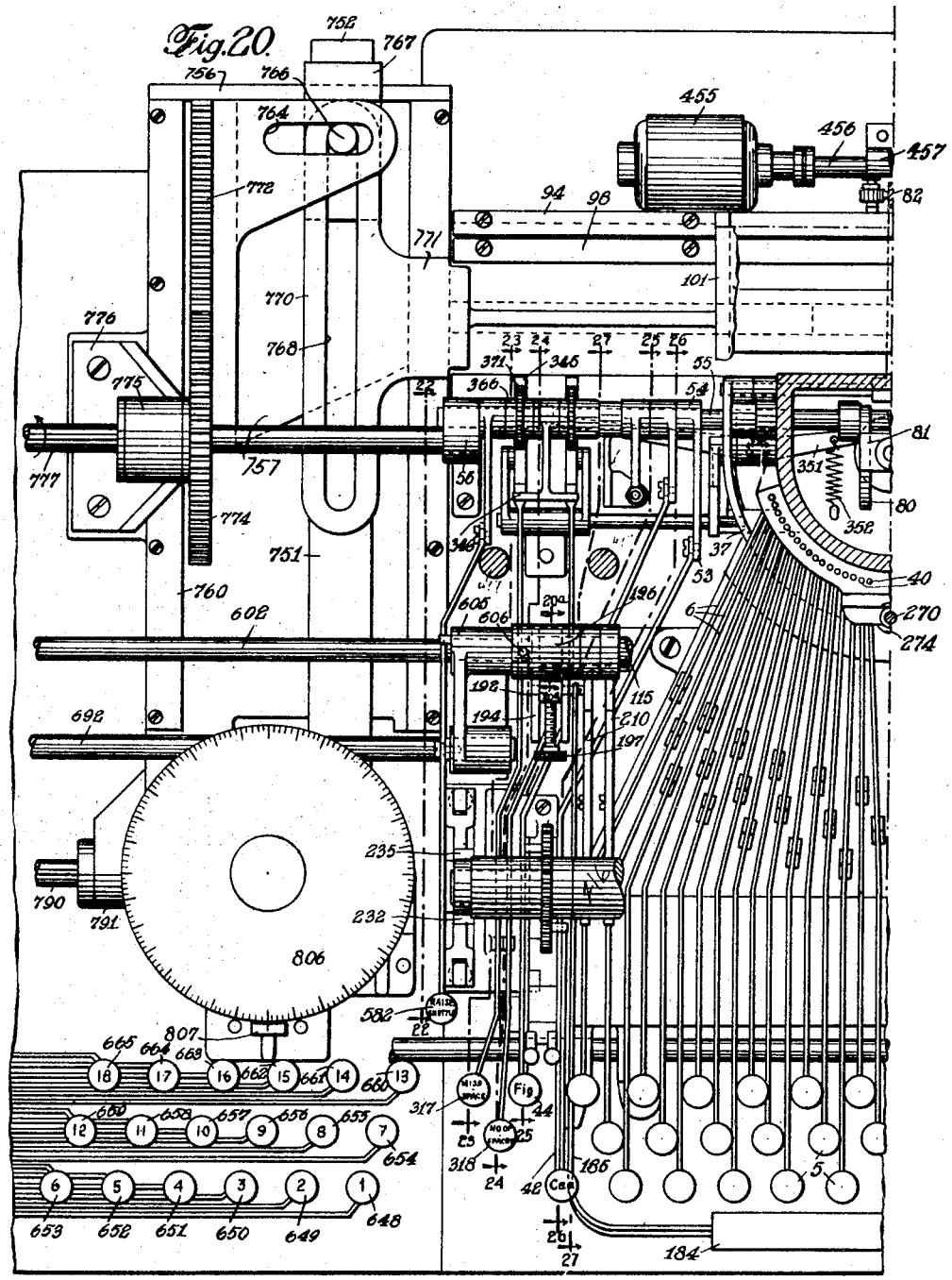

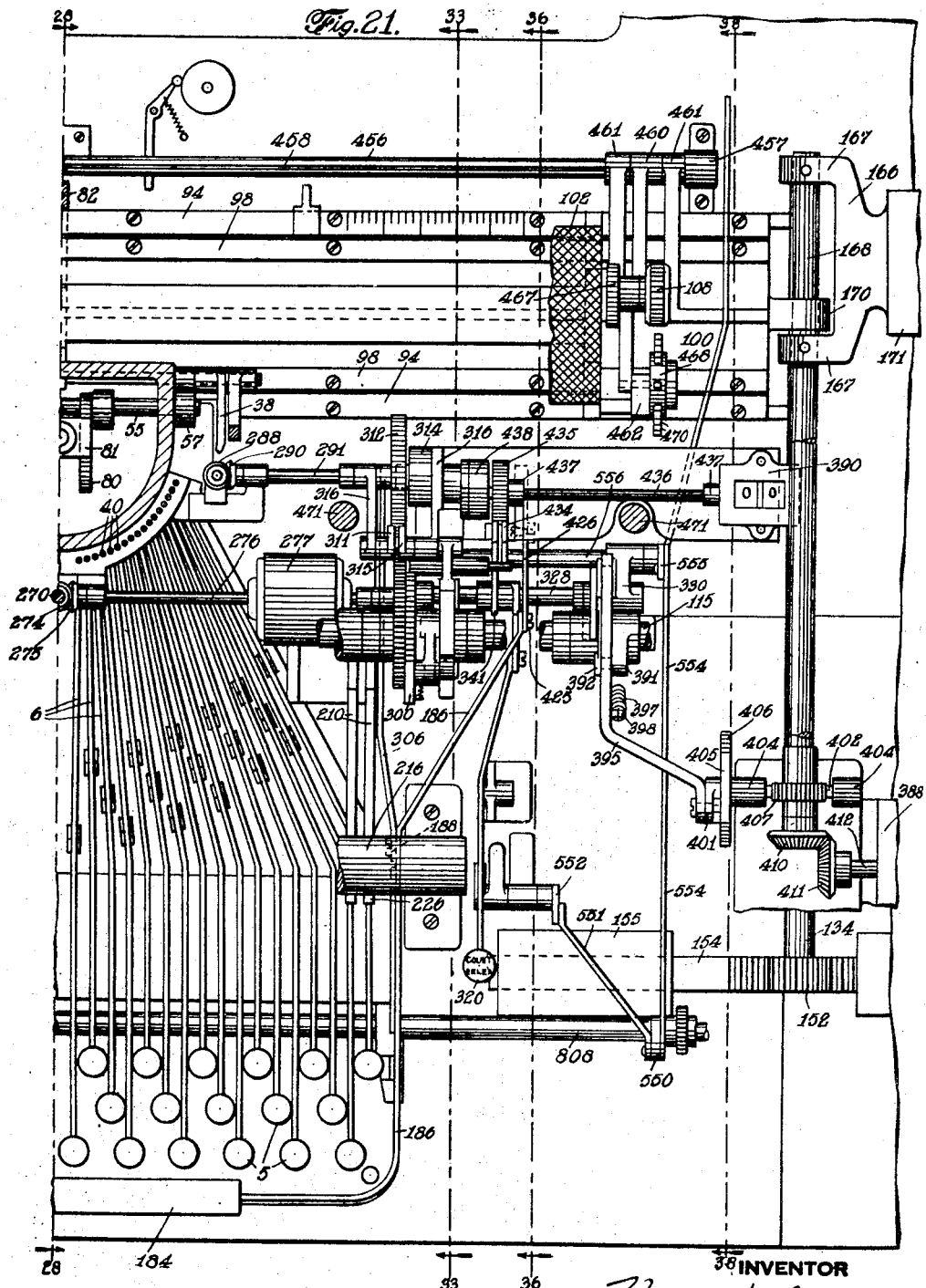

May 21, 1940. H. C. JONES 2,201,776
TYPING MACHINE
Filed May 2, 1934 33 Sheets-Sheet 10
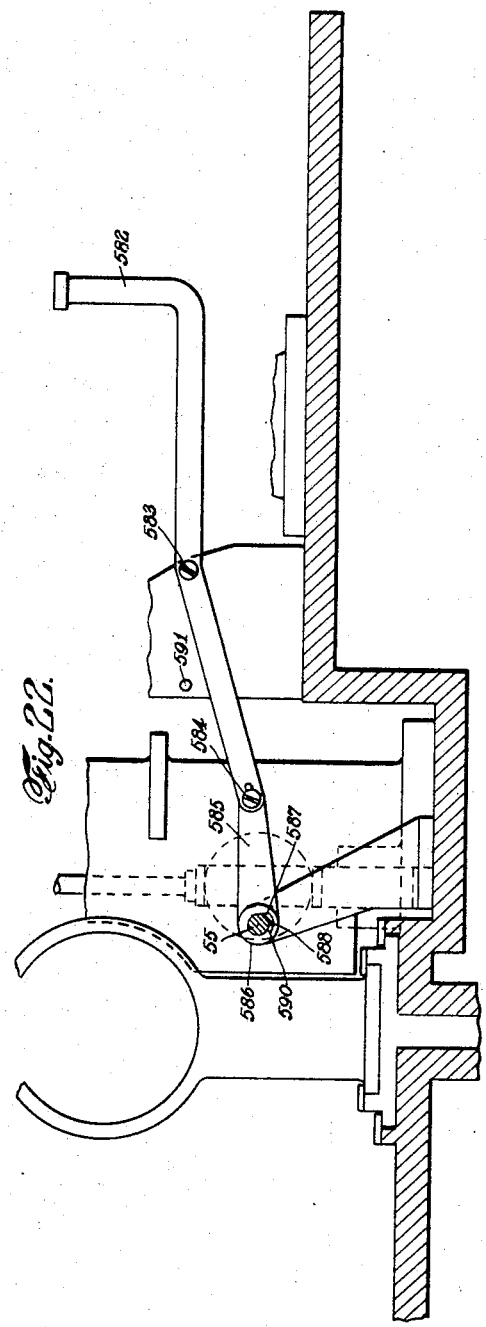
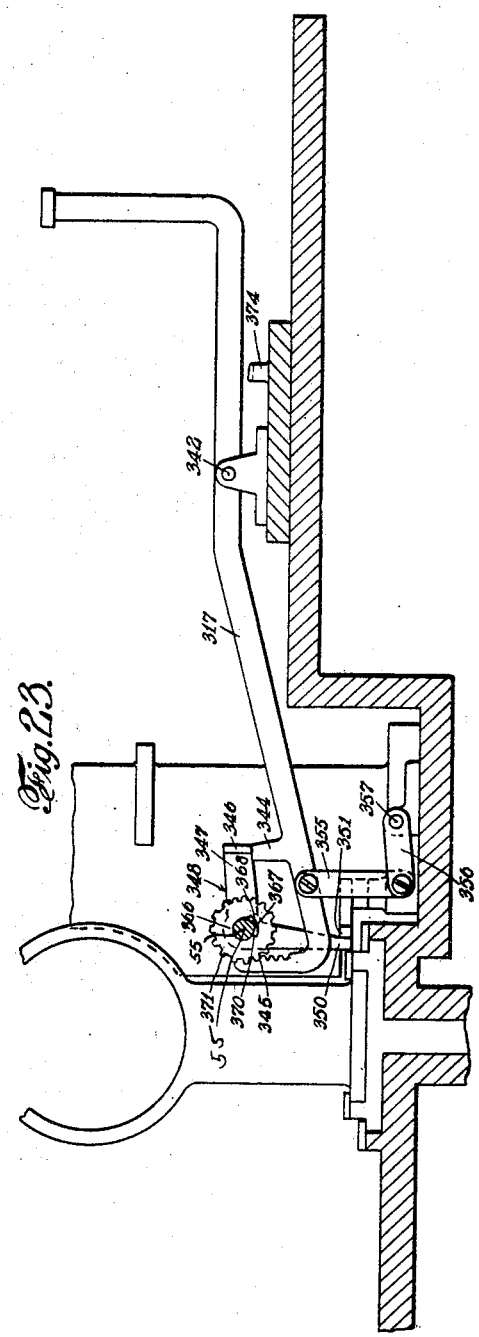
INVENTOR
Harry C. Jones
BY
Williams, O'Neil & Turner
ATTORNEYS

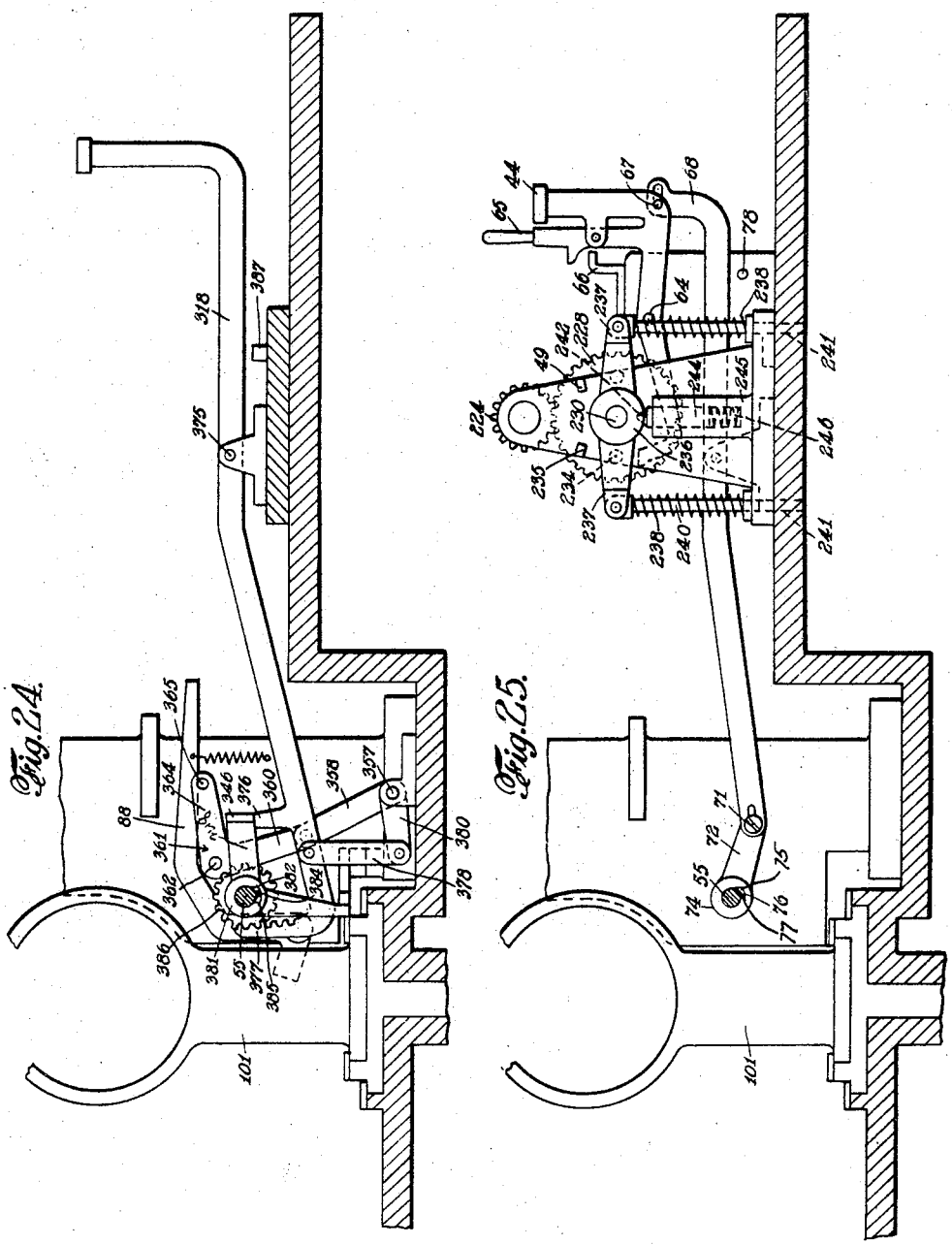

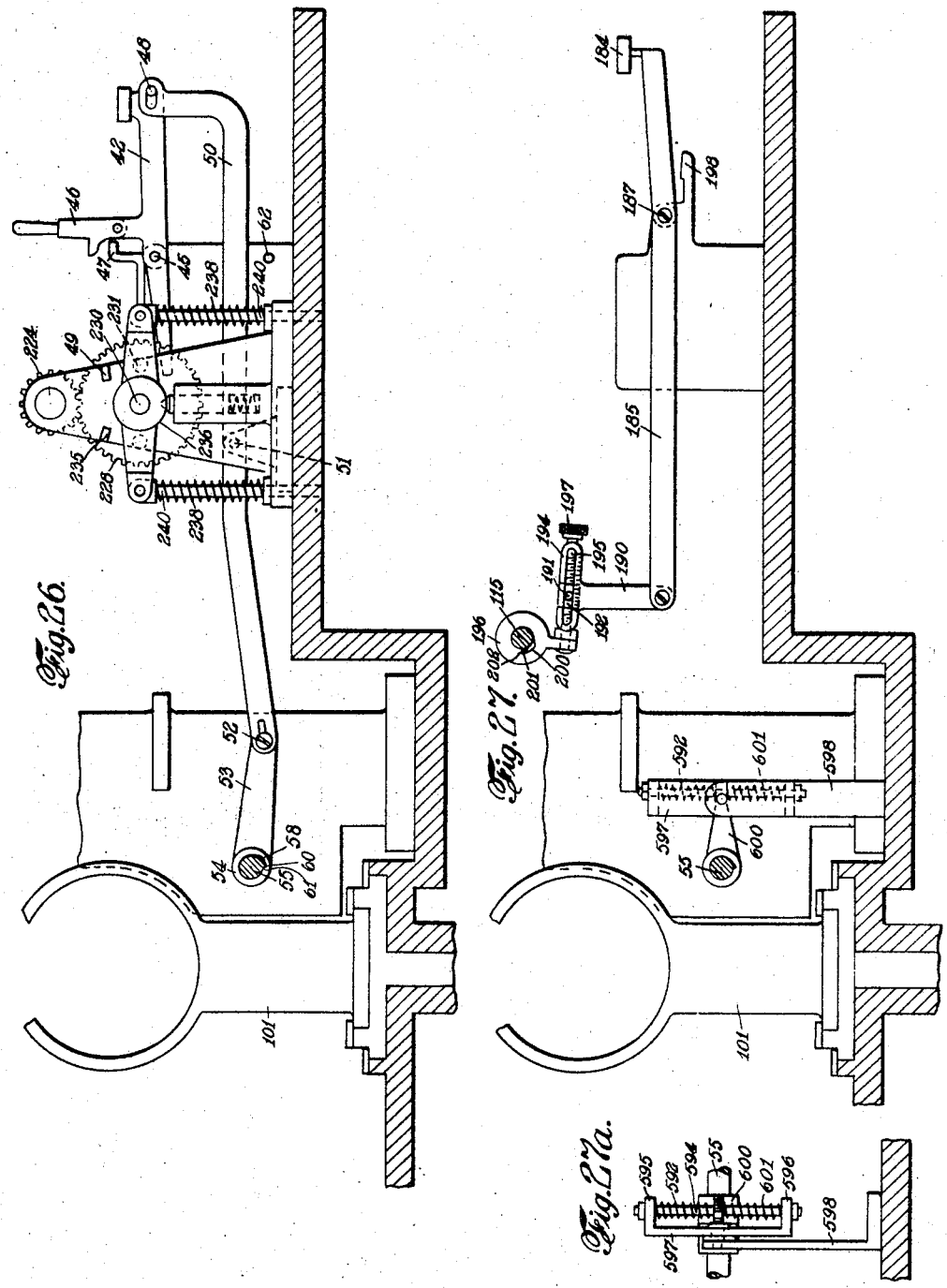

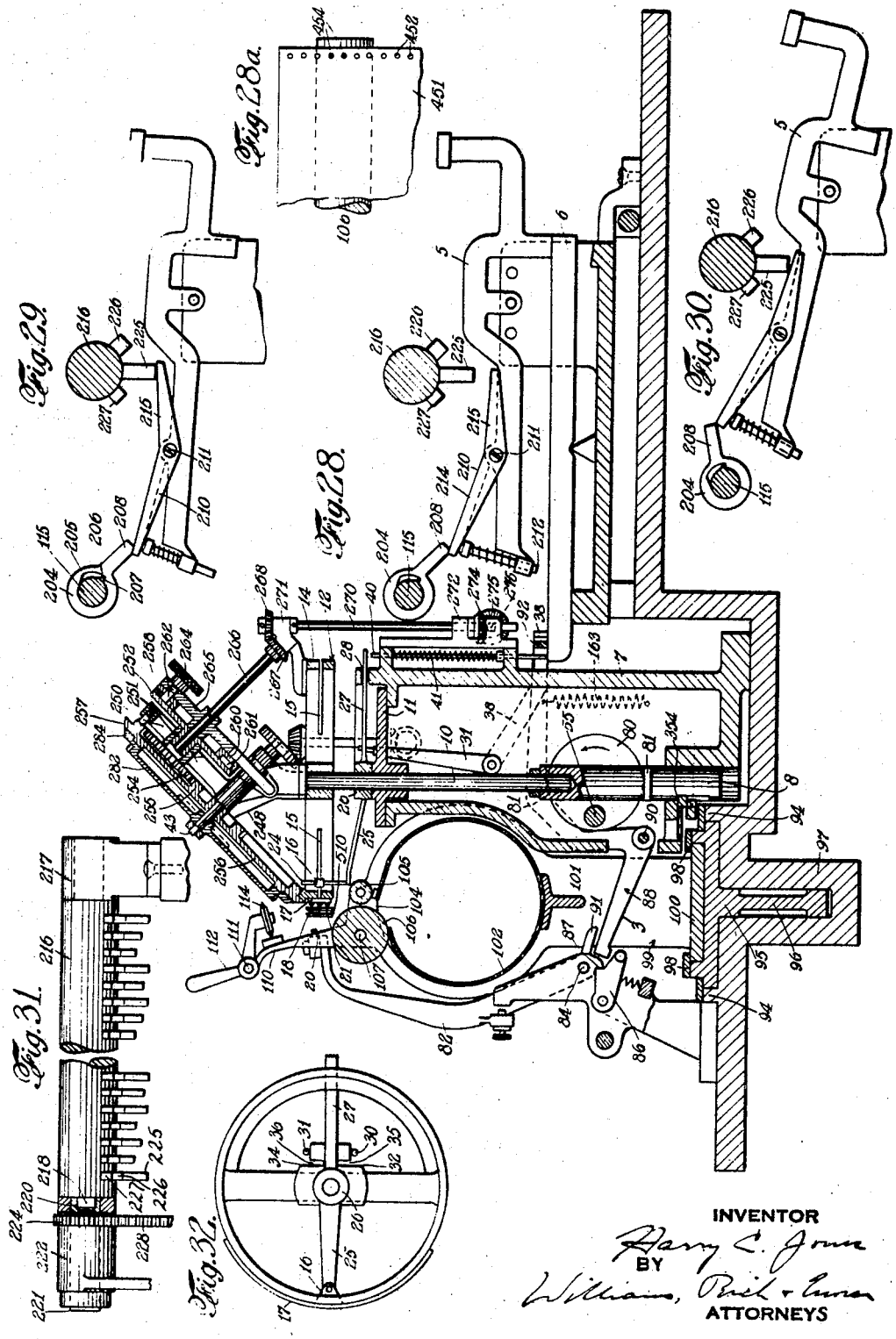

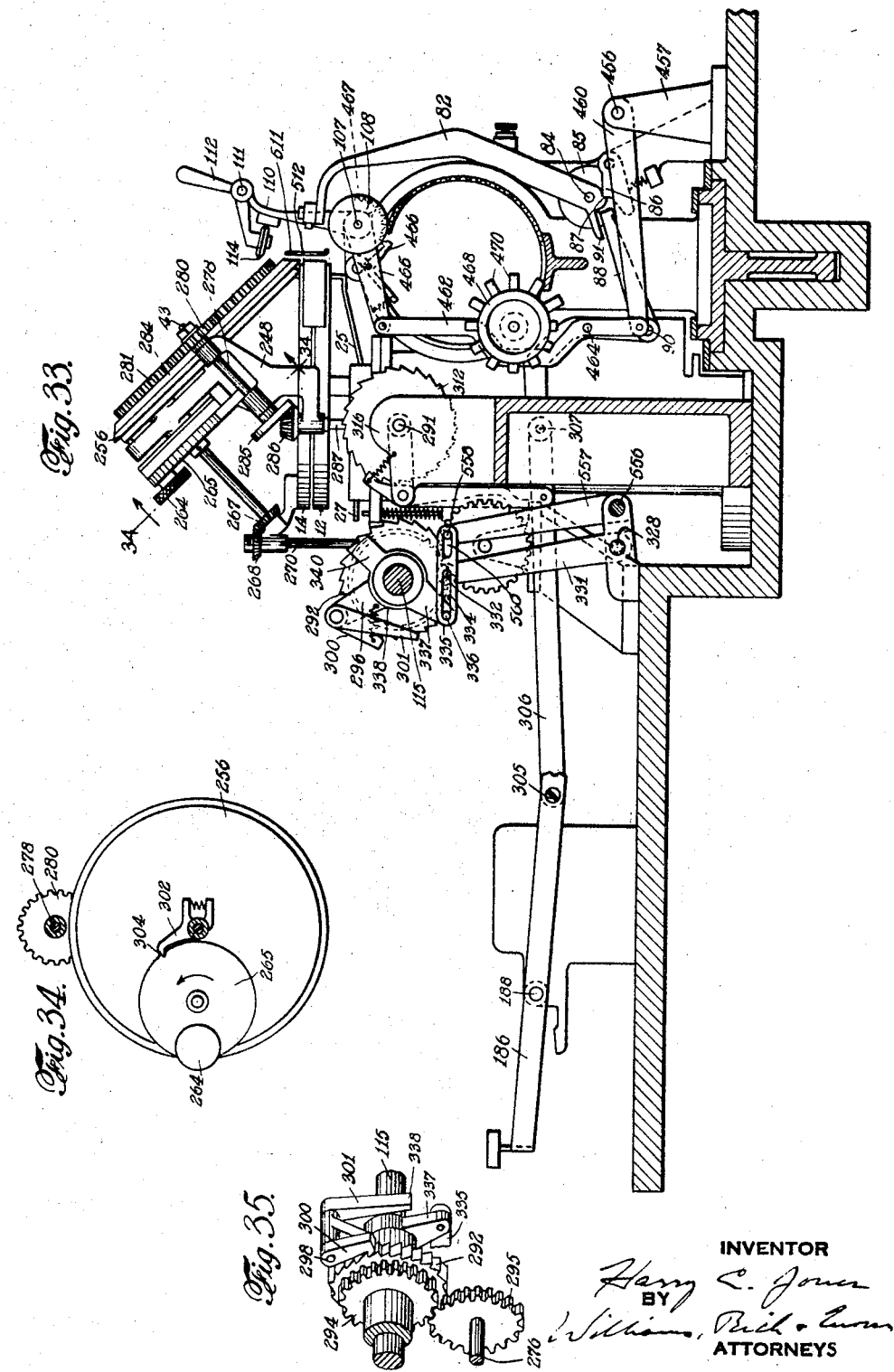

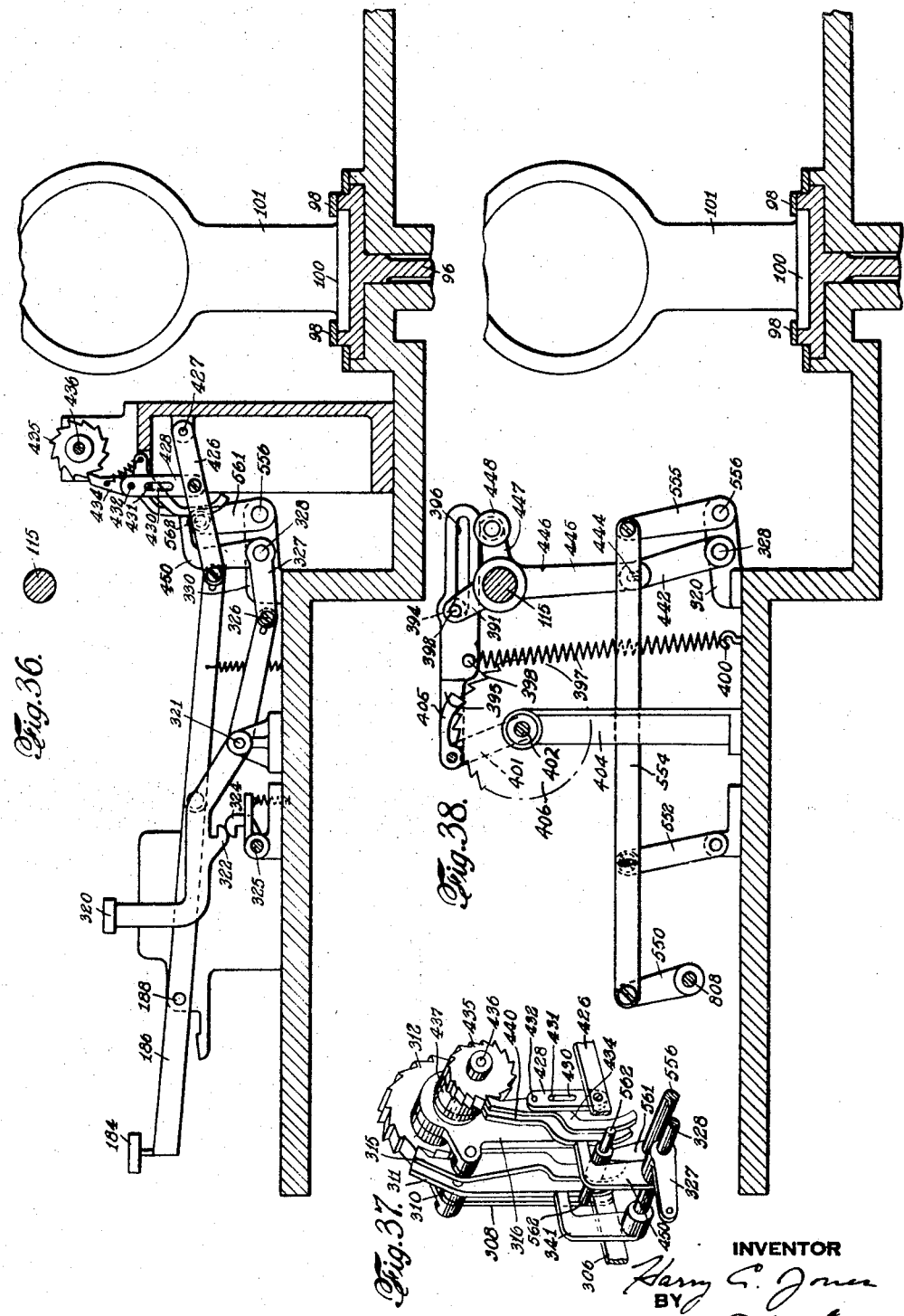

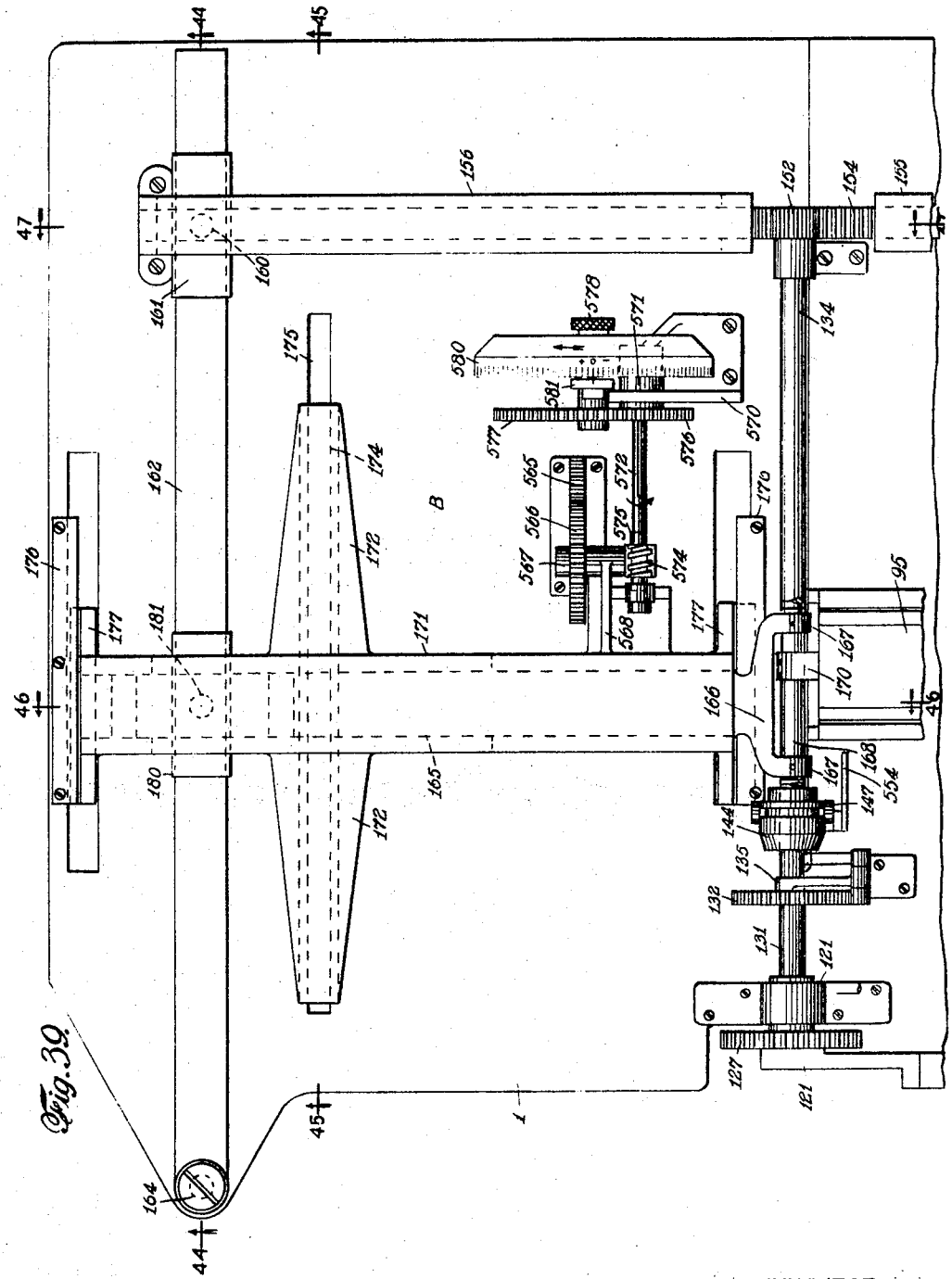

May 21, 1940.					H. C. JONES					2,201,776
TYPING MACHINE
Filed May 2, 1934					33 Sheets-Sheet 17
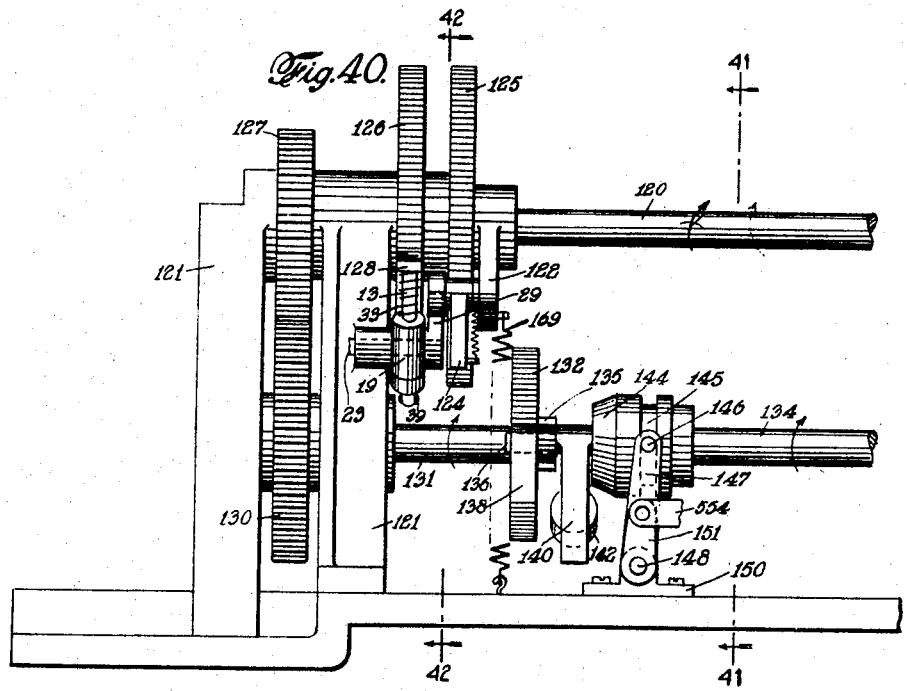
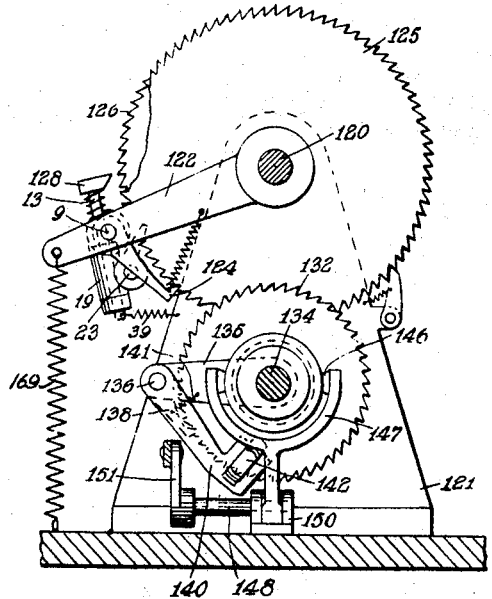
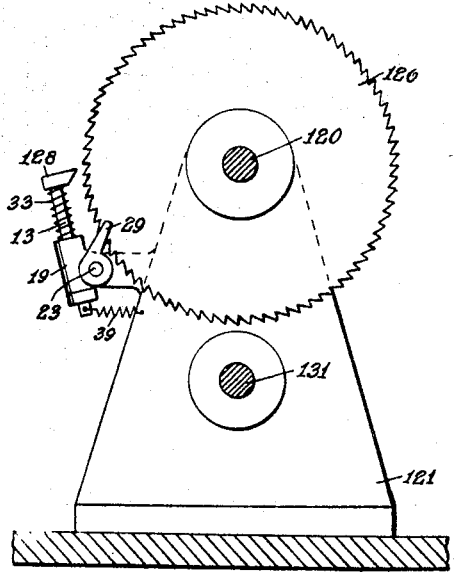
INVENTOR
Harry C. Jones
BY
Williams, Rich & Morse
ATTORNEYS

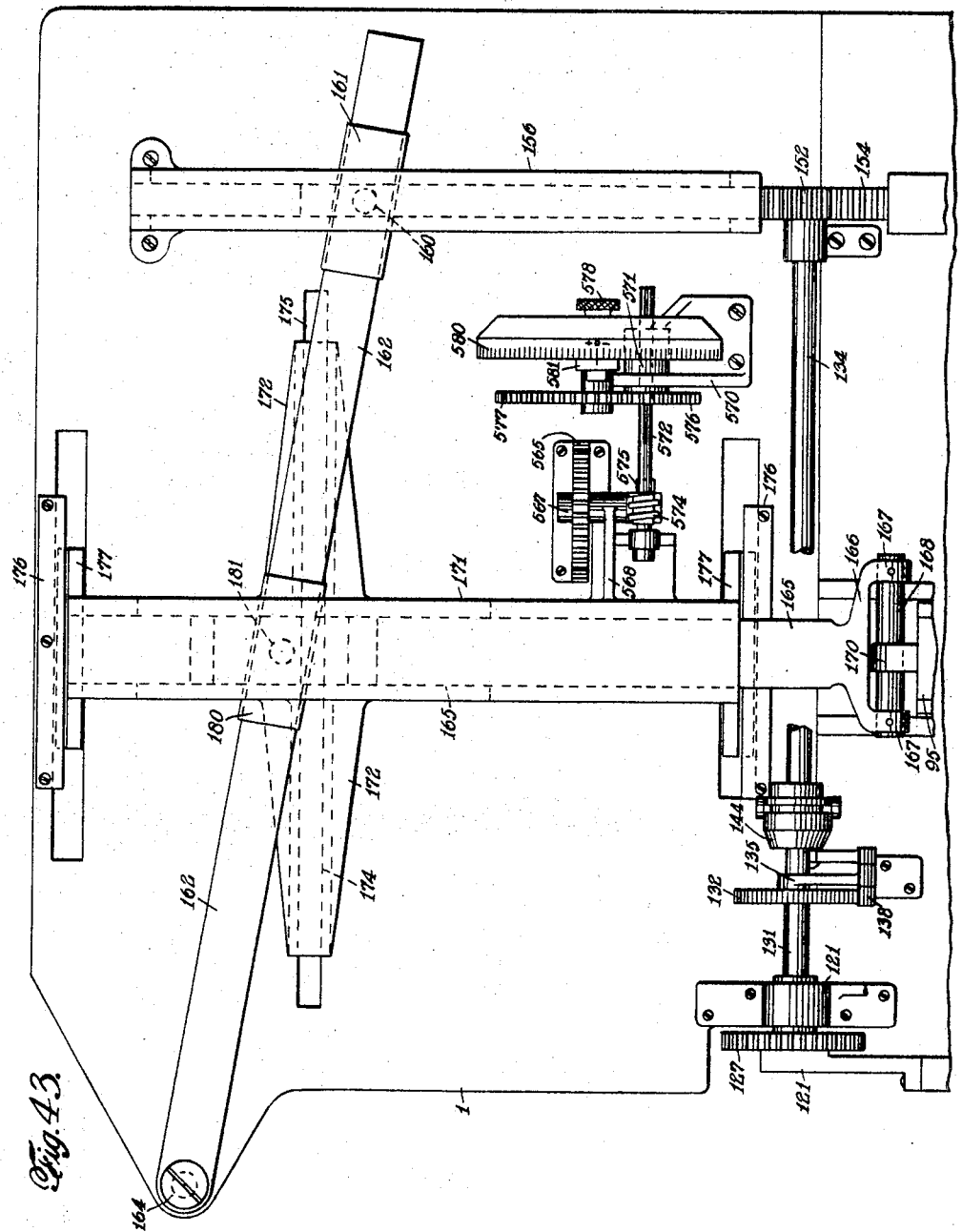

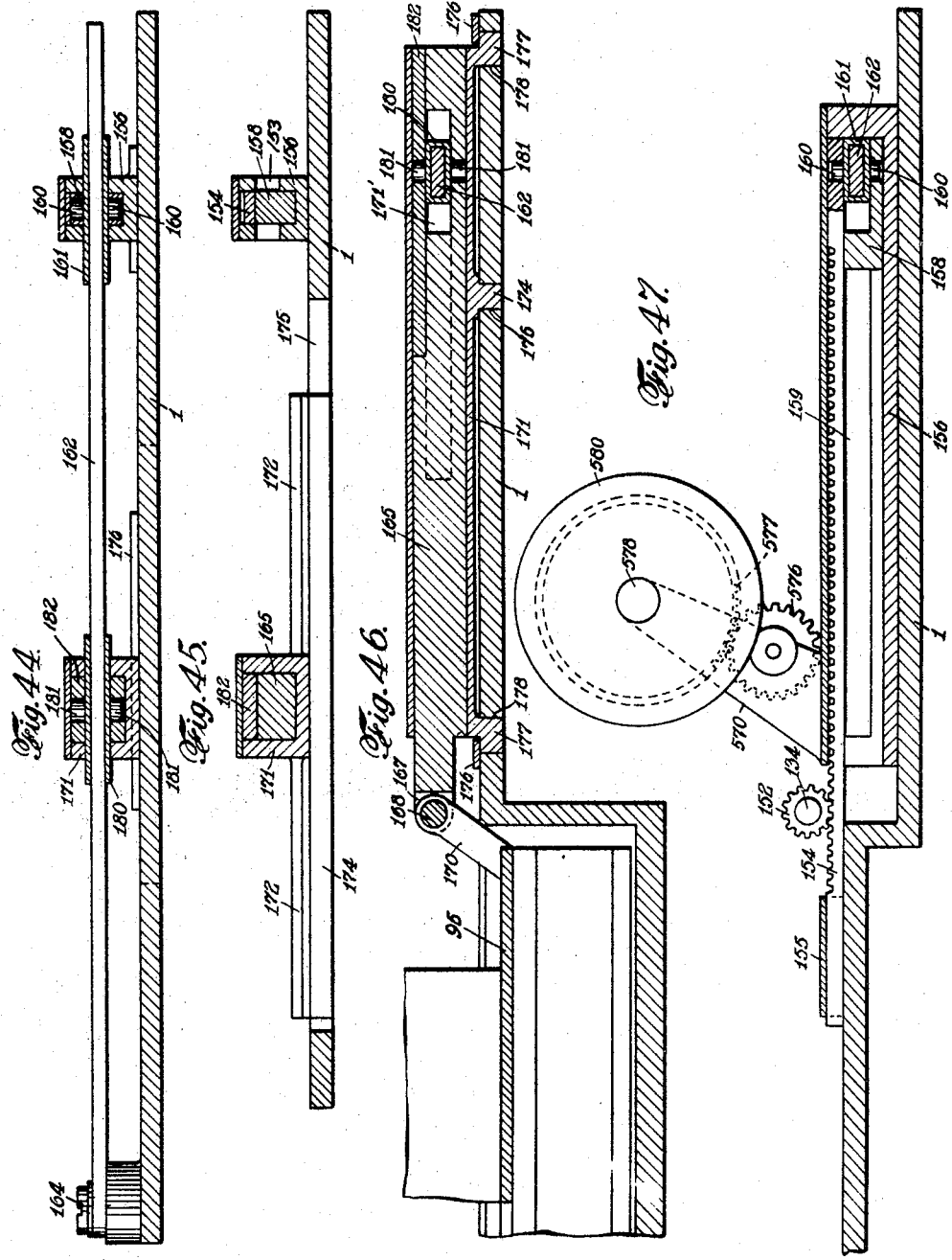

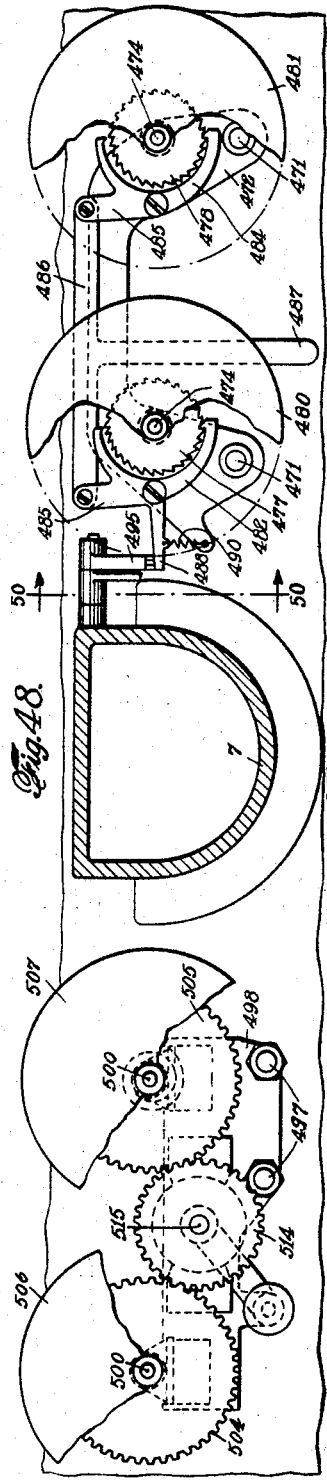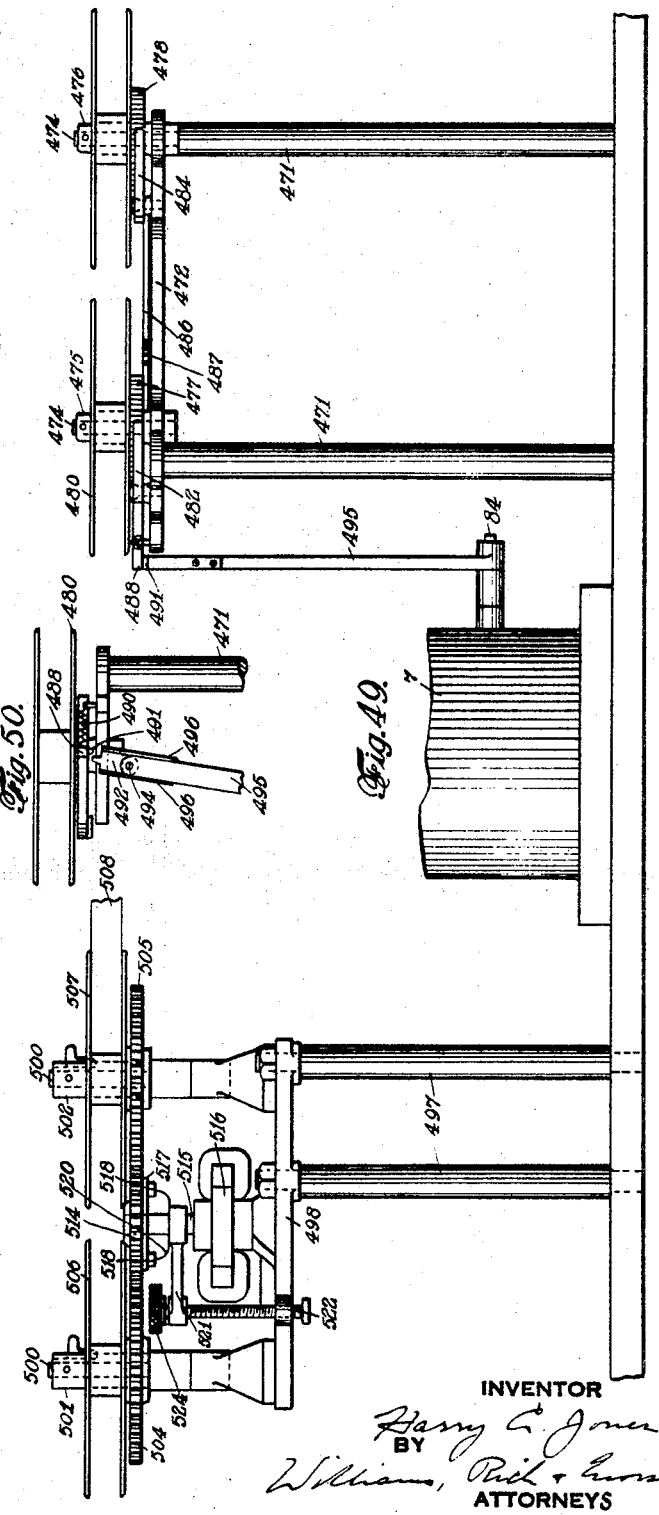

May 21, 1940.                    H. C. JONES                       2,201,776
                                TYPING MACHINE
                            Filed May 2, 1934            33 Sheets-Sheet 21
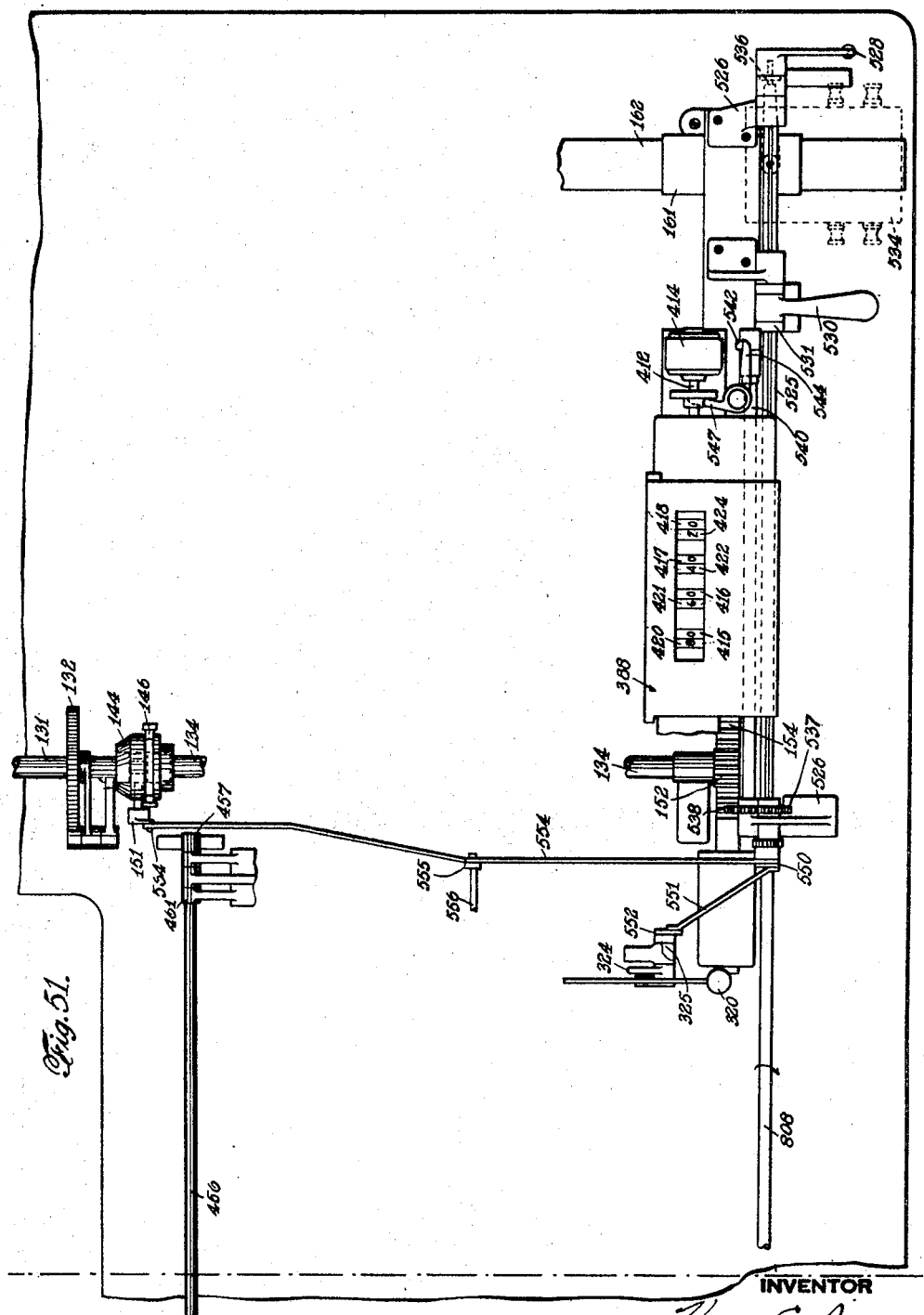

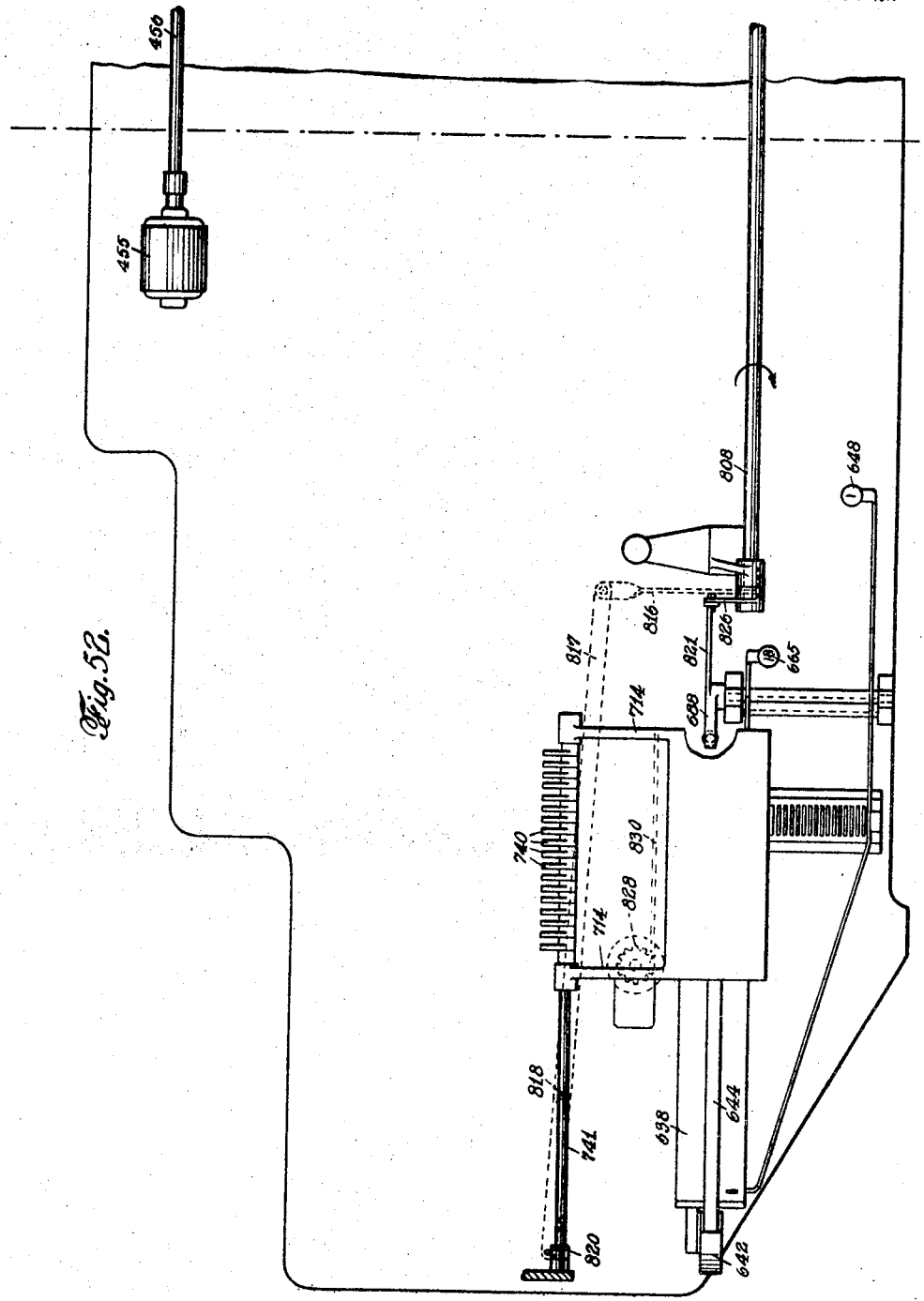

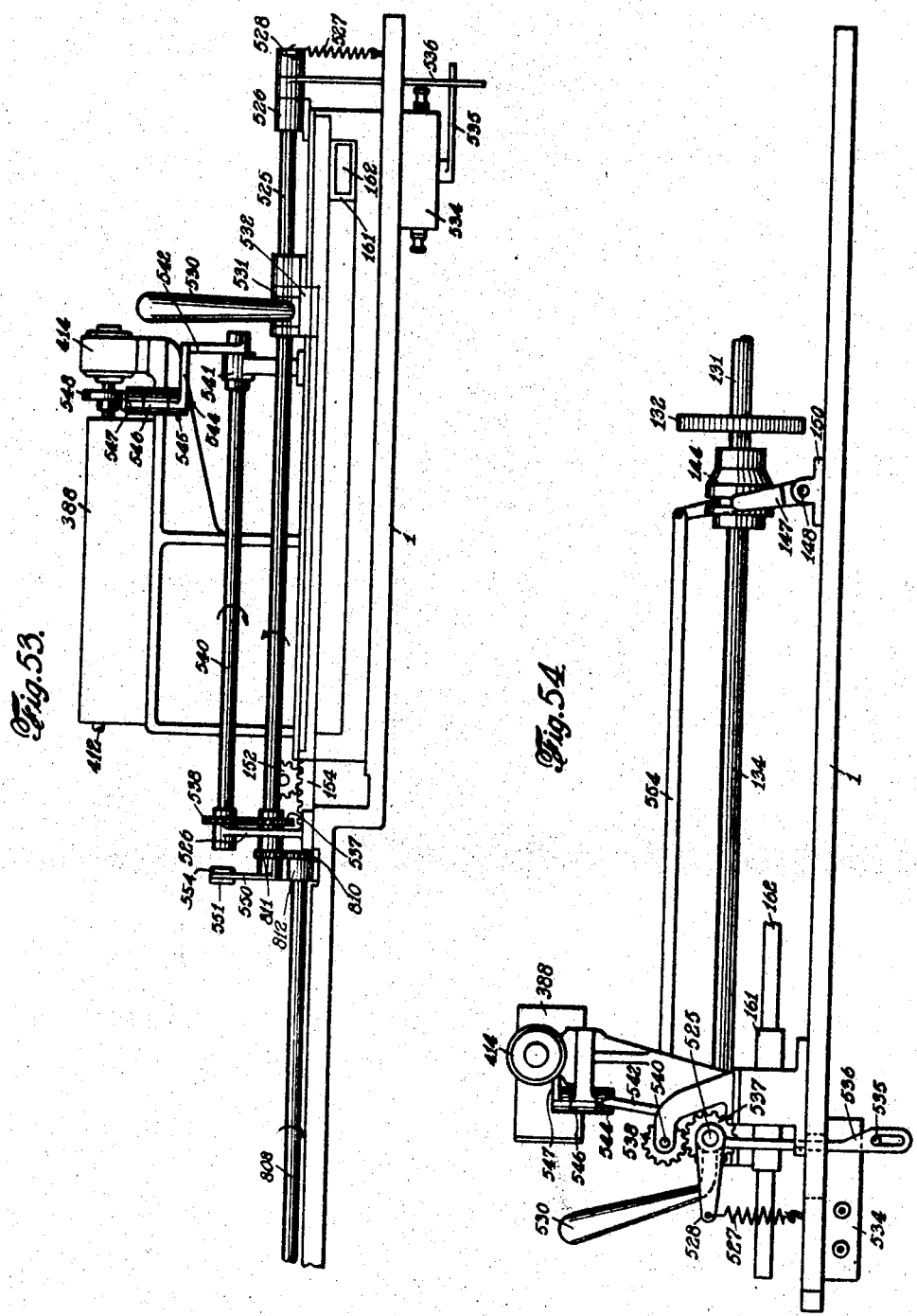

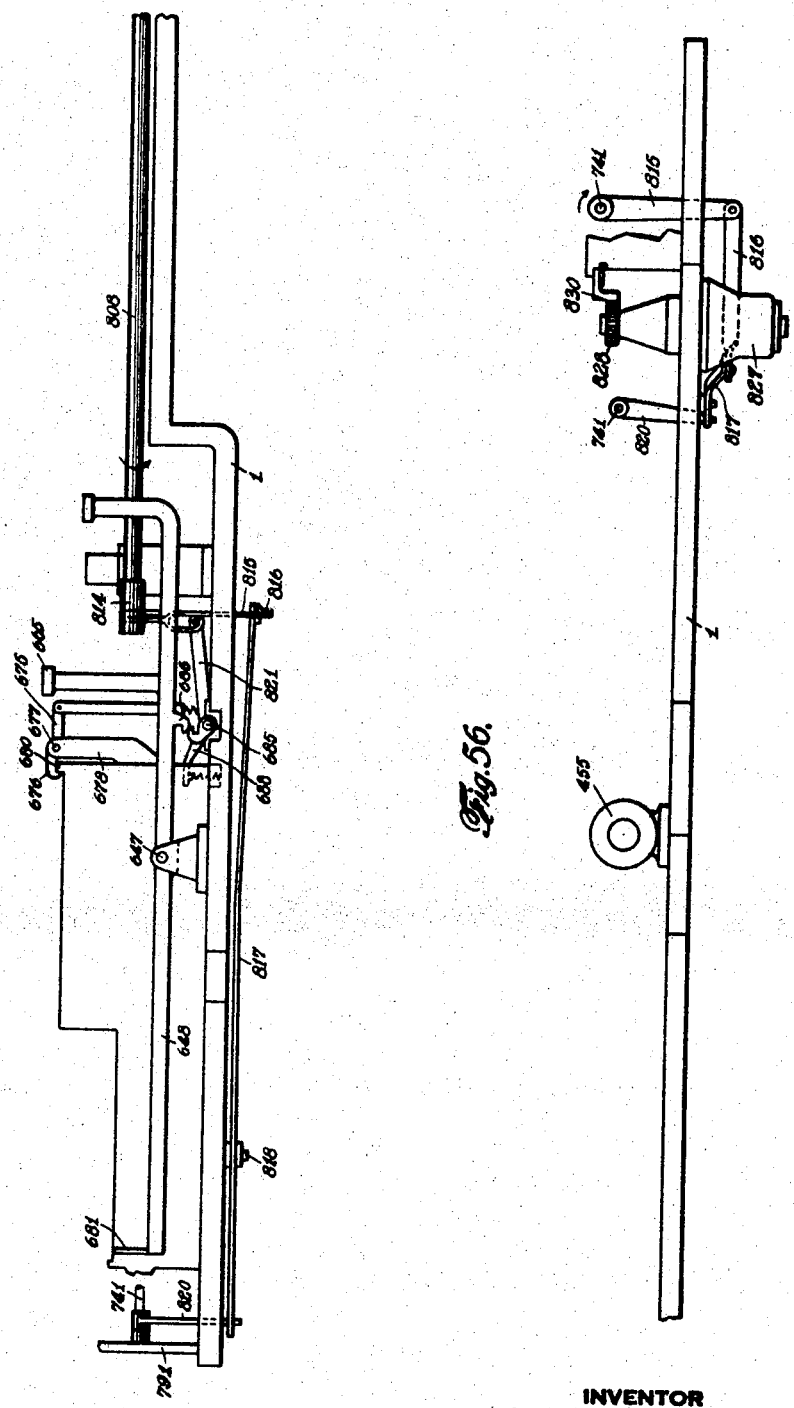

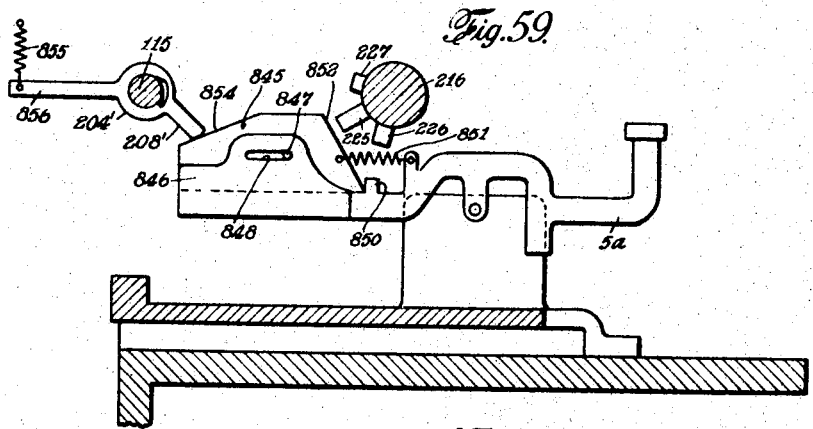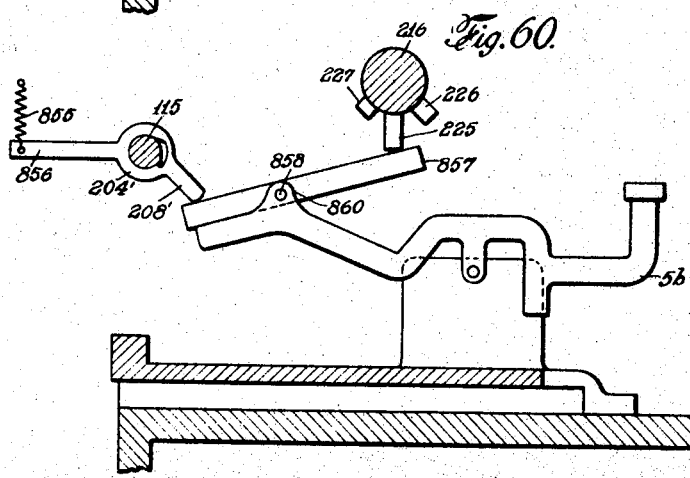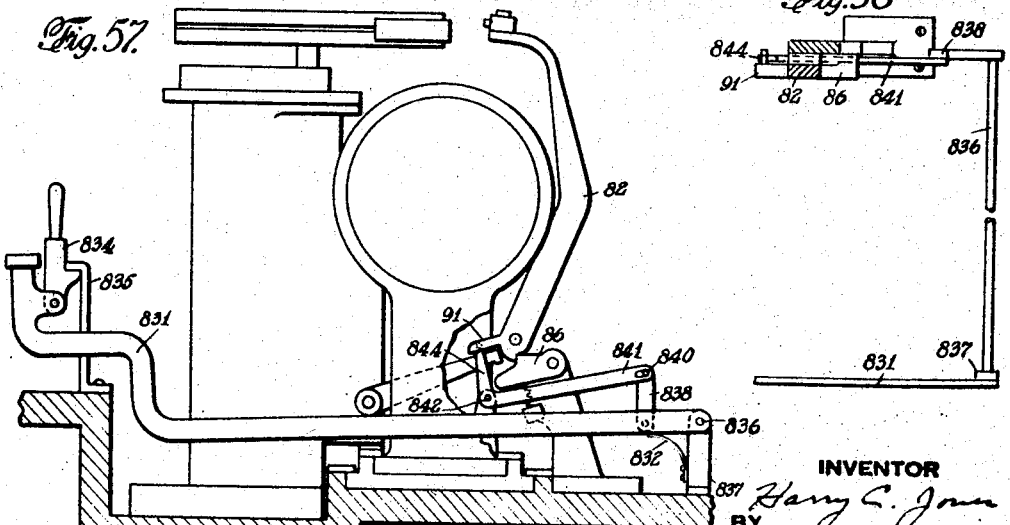

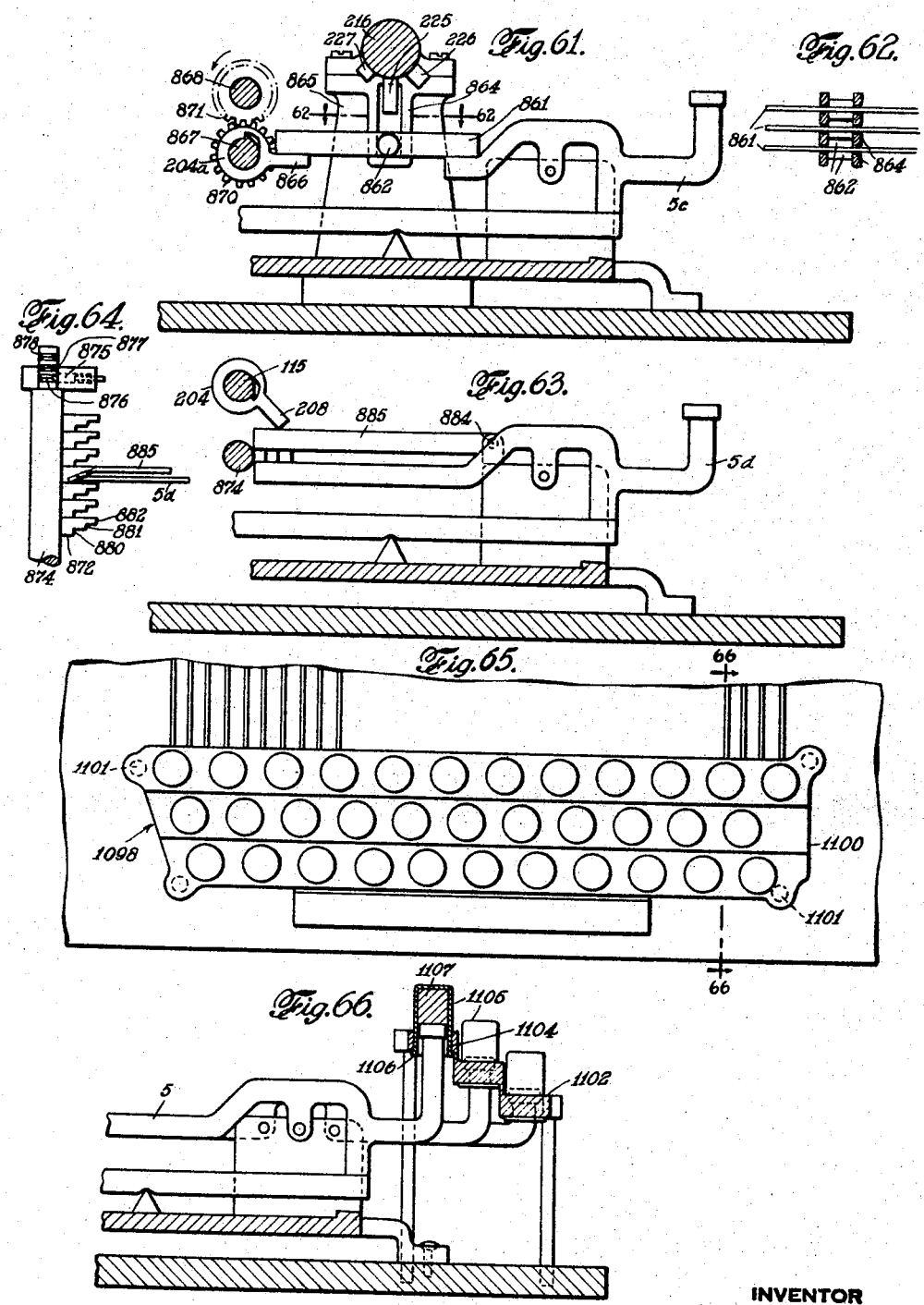

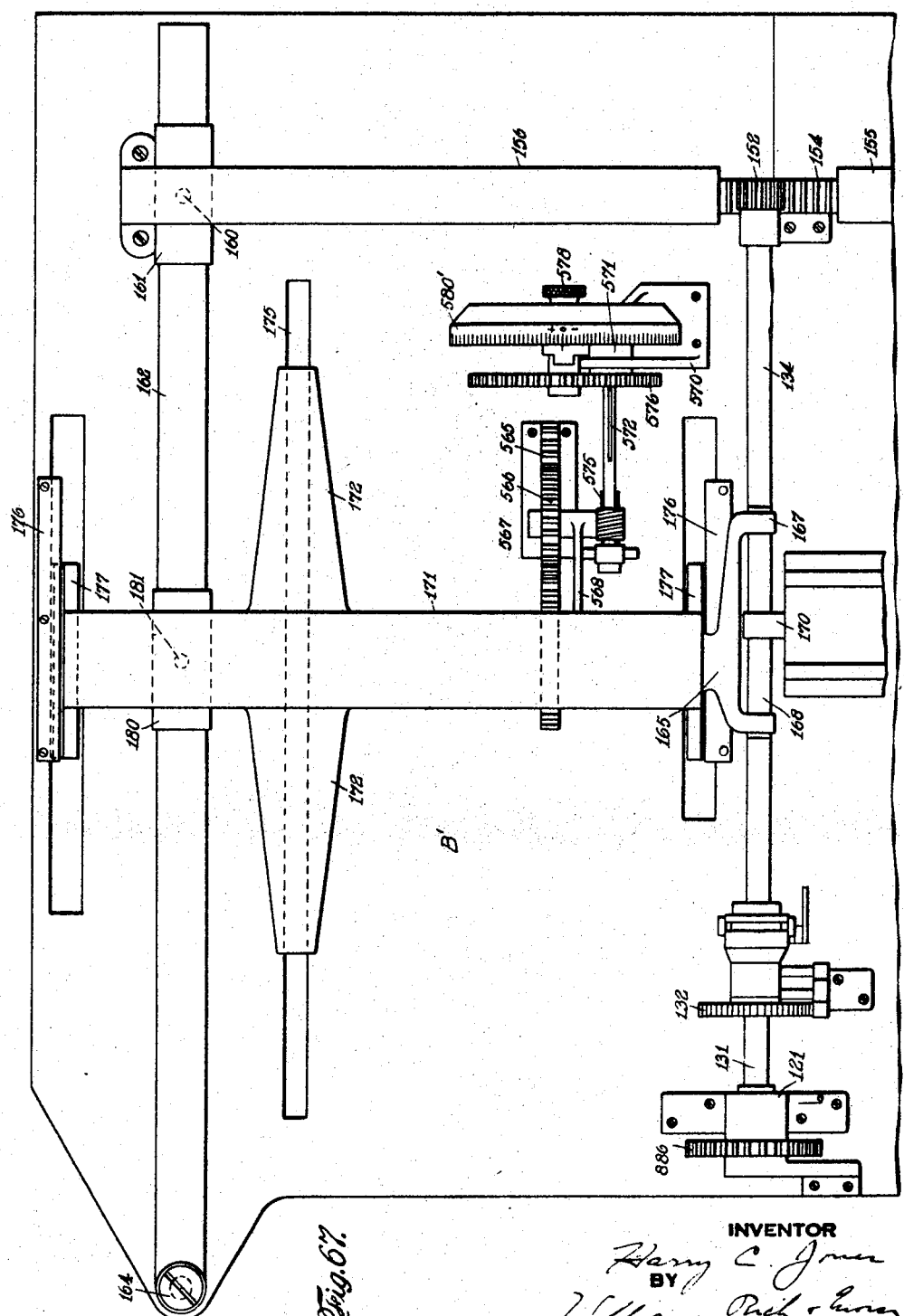

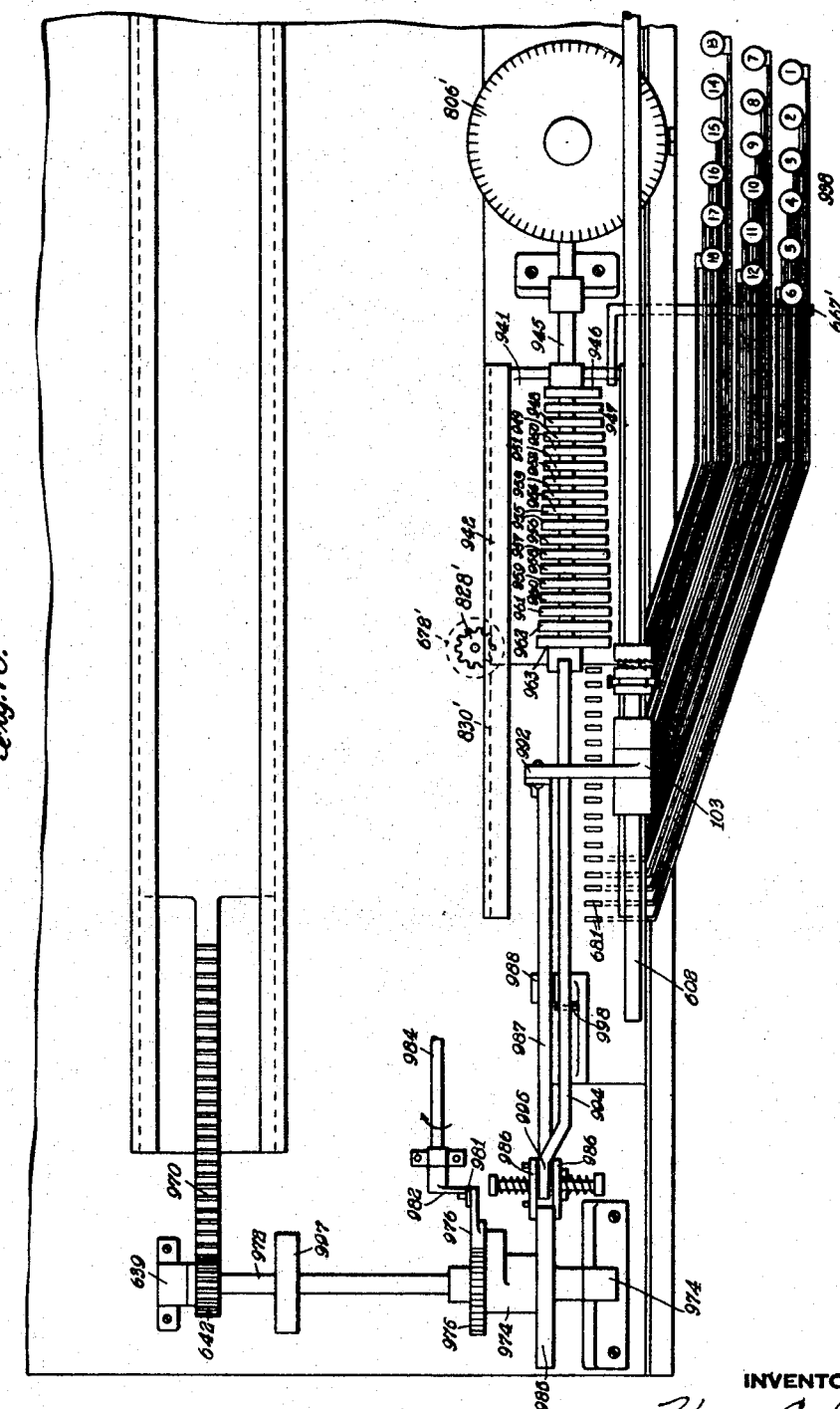

May 21, 1940.  H. C. JONES  2,201,776
TYPING MACHINE
Filed May 2, 1934   33 Sheets-Sheet 30
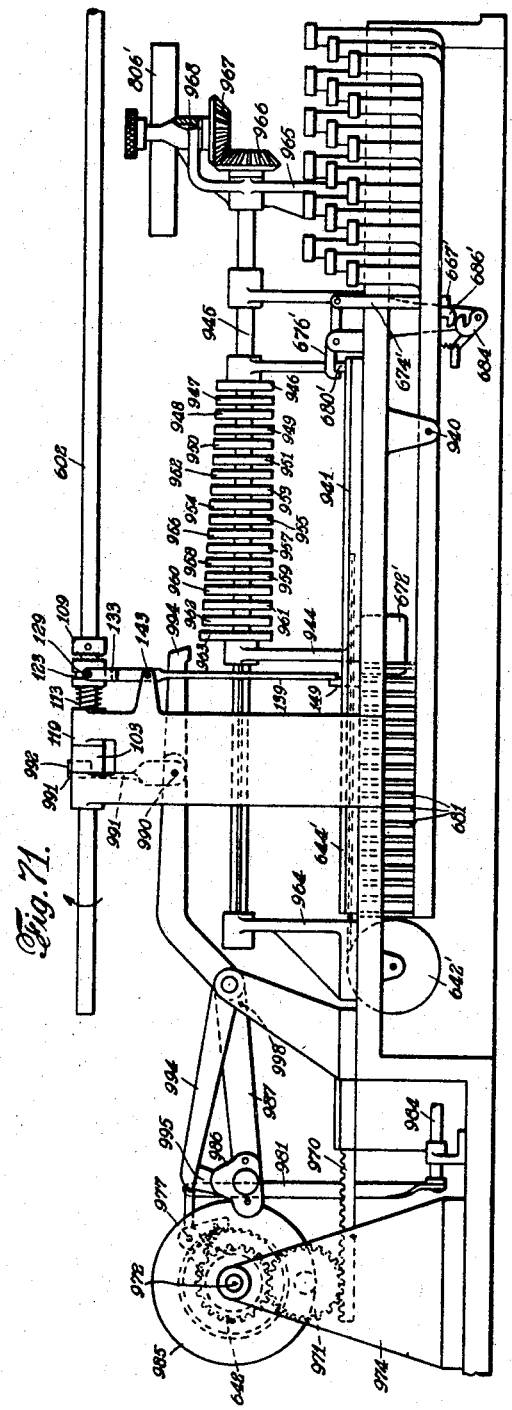
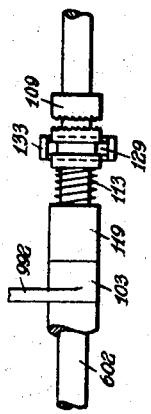
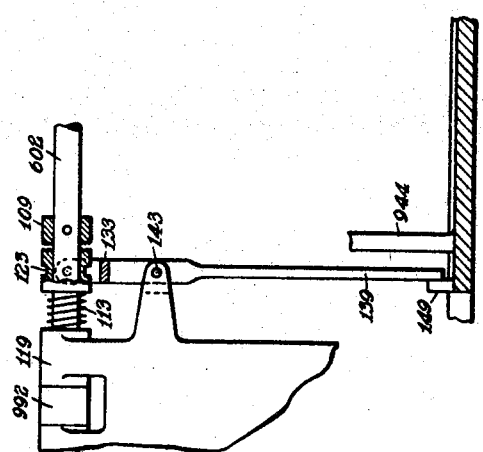
INVENTOR
Harry C. Jones
BY
Williams, Ruck & Turner
ATTORNEYS

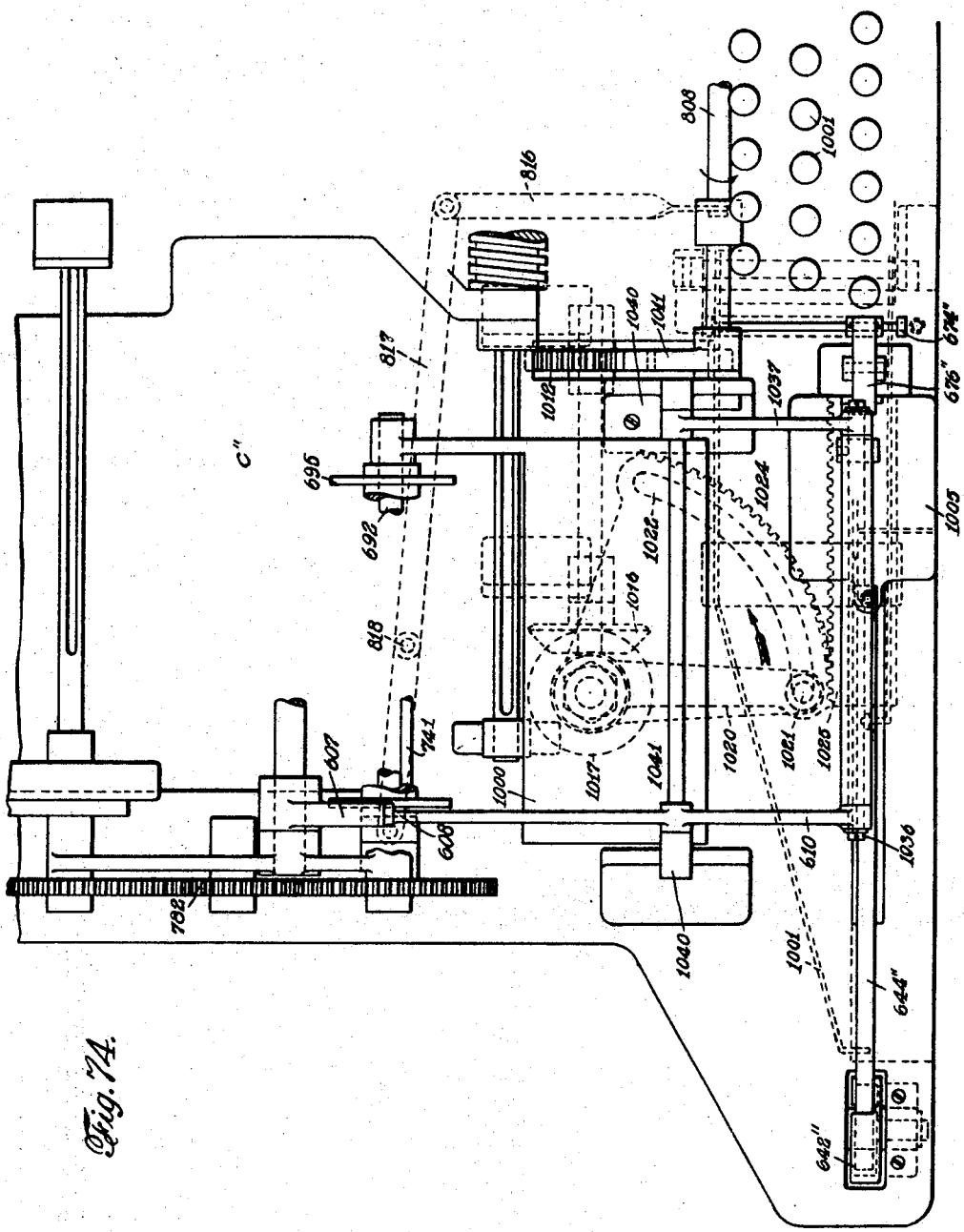

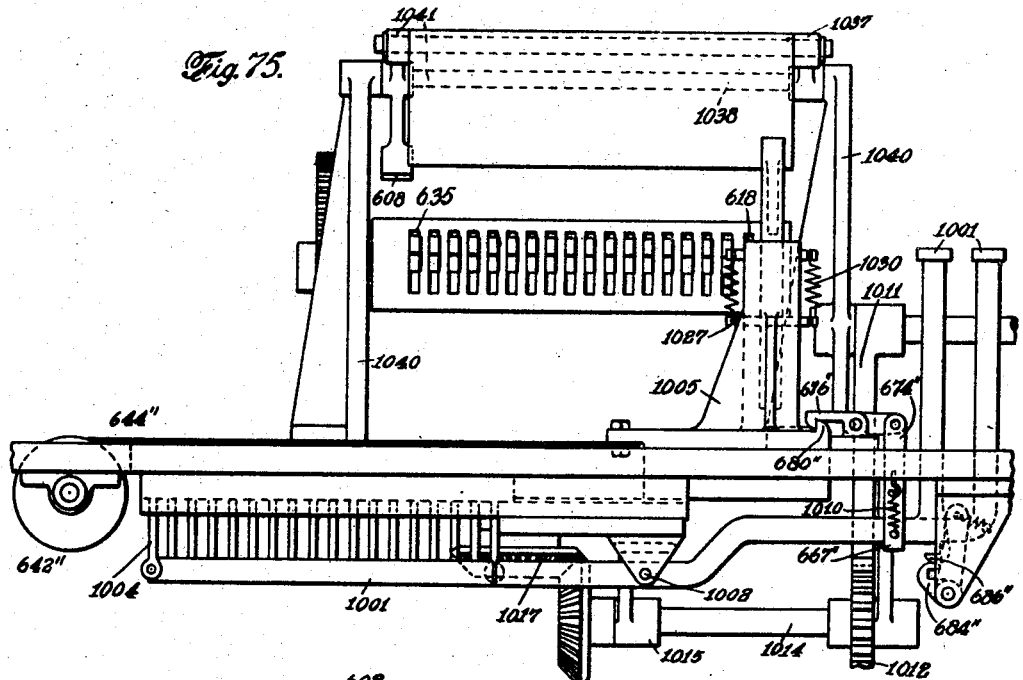

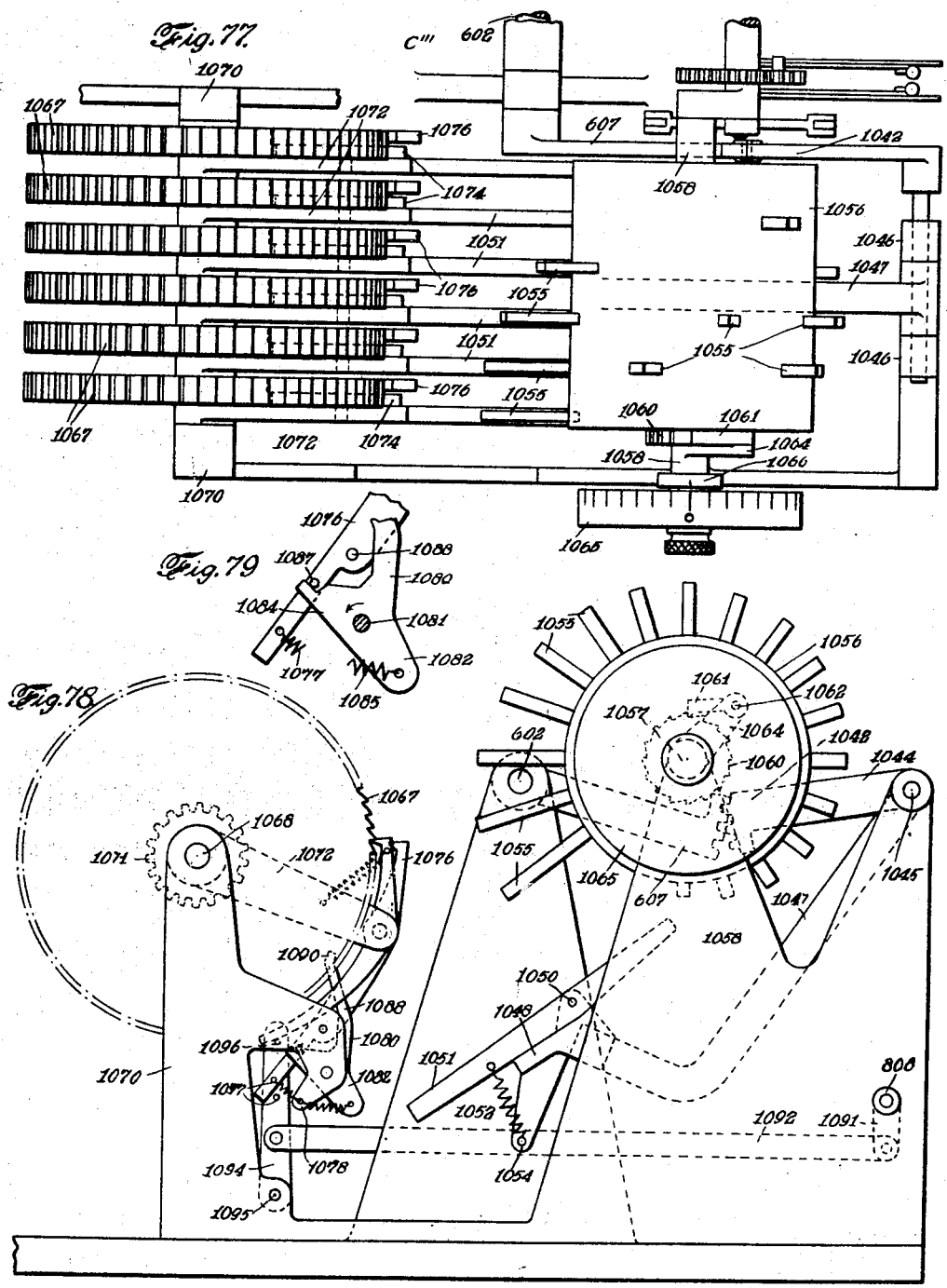

Patented May 21, 1940

2,201,776

UNITED STATES PATENT OFFICE 2,201,776

TYPING MACHINE

Harry C. Jones, New York, N. Y.

Application May 2, 1934, Serial No. 723,467

31 Claims. (Cl. 197—84)

This invention relates to machines for use in the graphic arts, and is herein illustrated as embodied in a typewriting machine.

An object of the invention is to provide improved means by which the extent of justification required for any proposed line of subject-matter, with relation to any given column-width, may be readily determined, and more particularly to provide means by which the extent of such justification may be recorded upon completion of each initial line typing operation and/or means by which the extent of such justification may be visibly announced upon the completition of each such line typing operation.

Another object of the invention is to provide improved means by which line justification for any proposed line of subject-matter may be effected by increasing the normal space between adjacent words and between adjacent letters of a word.

A further object of the invention is to provide improved means by which line justification for any proposed line of subject-matter may be effected by uniformly increasing the normal space between adjacent words of that line.

Although no attempt is herein made to enumerate all of the many fields in which the invention may be utilized, it may be well to call attention to the fact that, inasmuch as it offers a practicable solution to the problems of line justification in the typing of subject-matter, it may be employed to advantage whenever such justification may be regarded as desirable or necessary, as for example in letter writing, in the preparation of "originals" for use in mimeograph and similar work, and in the preparation of negatives such as are employed in the making of photomechanical printing plates adapted to be used, for example, in various lithographic processes including offset printing, it being understood that the term "negative" as herein employed is to be regarded as generic with respect to any transparent or translucent substance such as paper, textile fabrics, "celluloid" and analogous materials which, in themselves, are pervious to light or which, if impervious to light, may be so treated as to condition them for the passage of light therethrough.

Other objects and advantages of the invention, as well as other uses that may be made of the invention in the above-mentioned and other fields, will become apparent from the following description taken in connection with the accompanying drawings, wherein like reference characters are employed to indicate similar parts and in which—

Figure 4:
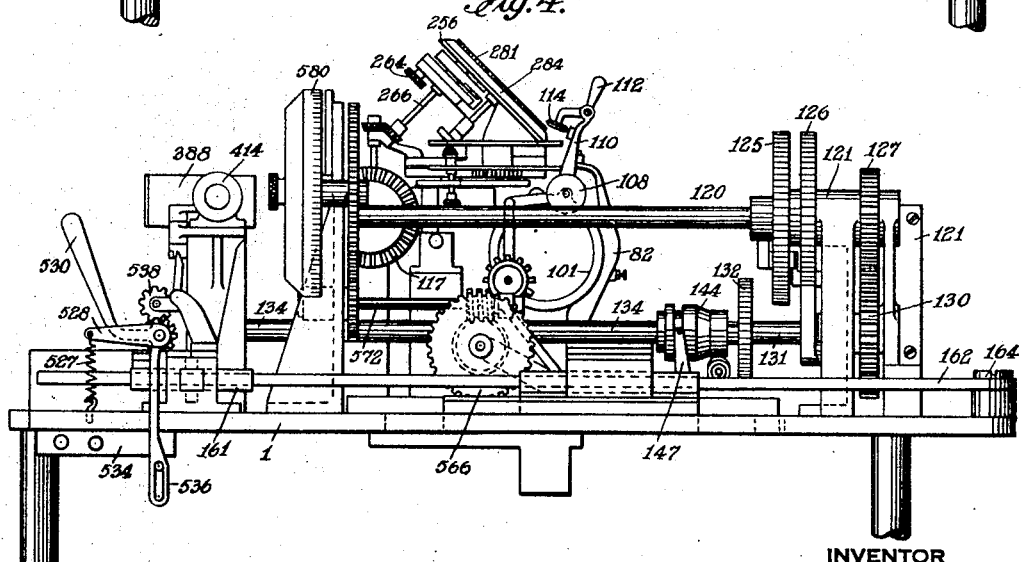
Figure 68:
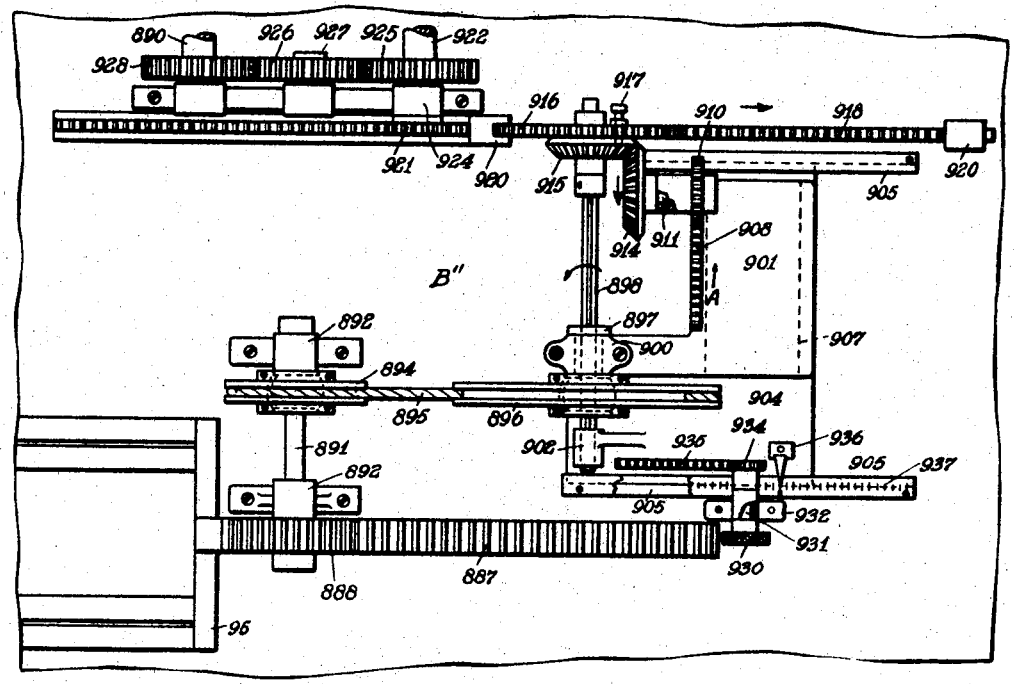
Figure 69:
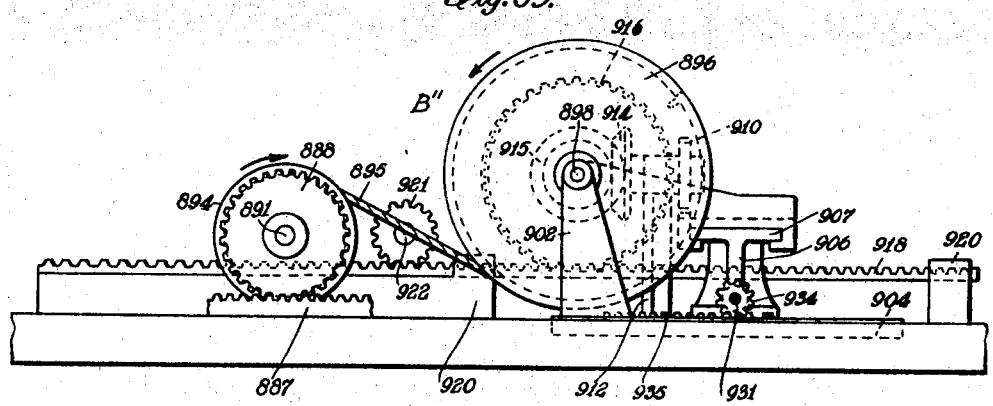

Fig. 1 is a plan view of a machine embodying a typewriter unit A and justifying units B and C; Fig. 2 is a front elevation of the machine; Fig. 3 is an end elevation of the machine as viewed from the left in Figures 1 and 2; Fig. 4 is an end elevation of the machine as viewed from the right in Figures 1 and 2; Fig. 5 is a front elevation of the left-hand end of the machine, the view terminating at the right of the bank of stop levers included in the justifying unit C; Fig. 6 is a fragmental sectional view taken on line 6—6 of Fig. 5; Fig. 7 is a similar view taken on line 7—7 of Fig. 5, certain elements of the assembly being shown in elevation in the background; Fig. 8 is a sectional view taken on line 8—8 of Fig. 5 and showing in detail the relation of certain differential levers to their associated ratchet wheels; Fig. 9 is a sectional view taken on line 9—9 of Fig. 5 and showing certain details of construction peculiar to the bank of stop levers referred to in connection with Fig. 5; Fig. 10 is a view in elevation of one of the ratchet wheels peculiar to the assembly appearing in Fig. 8; Fig. 11 is a fragmental view of the ratchet wheel of Fig. 10 showing the driving pawl for that wheel in advanced position; Fig. 12 is a view similar to Fig. 11 and showing another of the ratchet wheels peculiar to the assembly of Fig. 8; Fig. 13 is a plan view of the actuating means peculiar to the justifying unit C for moving the subsidiary carriage with reference to the main carriage in a justifying operation as carried out with the aid of that unit; Fig. 14 is a sectional view taken on line 14—14 of Fig. 13; Fig. 15 is a sectional view taken on line 15—15 of Fig. 13; Fig. 16 is a sectional view taken on line 16—16 of Fig. 13; Fig. 17 is a sectional view taken on line 17—17 of Fig. 13; Fig. 18 is a sectional view taken on line 18—18 of Fig. 13; Fig. 19 is a view similar to Fig. 13 and showing the control arm thereof positioned for a given justifying operation and showing the connector member as having moved from its normal position to an advanced position toward the front of the machine in response to space bar operations; Fig. 20 is a plan view of the left-hand portion of the typewriter unit A and of the right-hand portion of the justifying unit C; Fig. 20A is a sectional view taken on line 20A—20A of Fig. 20; Fig. 21 is a view similar to Fig. 20 and showing the right-hand portion of the typewriter unit A and the left-hand portion of the justifying unit B; Fig. 22 is a sectional view taken on line 22—22 of Fig. 20 and showing means for elevating the shuttle support of the typewriter unit A to facilitate type-shuttle removal or replacement; Fig. 23 is a sectional view taken on line 23—23 of Fig. 20 and showing means for moving the missing space printing dial of the typewriter unit A into printing position; Fig. 24 is a sectional view taken on line 24—24 of Fig. 20 and showing means for moving the word-space printing dial of the typewriter unit into printing position and for initiating operation of the striking hammer; Fig. 25 is a sectional view taken on line 25—25 and showing means for so moving the shuttle support as to position the row of figures for use in a typing operation; Fig. 26 is a sectional view taken on line 26—26 of Fig. 20 and showing means for so moving the shuttle support as to position the row of upper case letters for use in a typing operation; Fig. 27 is a sectional view taken on line 27—27 of Fig. 20 and showing means for actuating the main shaft of the machine in response to space bar operations; Fig. 27A is a detailed view showing equalizing means for facilitating return movement of the type shuttle support to its normal position pursuant to a shuttle support displacing operation as carried out by any one of the mechanisms shown in Figs. 22 to 26 inclusive; Fig. 28 is a central sectional view of the typewriter unit taken on line 28—28 of Fig. 21; Fig. 28A is a fragmental view showing in elevation one end of a paper feed roll associated with the typewriter carriage and its relation to a sheet of imprint-receiving material supported for use in a typing operation; Fig. 29 is a fragmental view in elevation showing the character key of Fig. 28 as having moved to an intermediate position in a typing operation and also showing the relation of its associated differential lever at that instant; Fig. 30 is a view similar to Fig. 29 and showing the character key as having completed its movement incident to the typing operation and the relation of the differential lever to such key at that instant; Fig. 31 is a view showing in elevation the differential shaft appearing in Figs. 28, 29 and 30; Fig. 32 is a plan view of the shuttle support and showing a shuttle and its associated actuating mechanism in neutral position; Fig. 33 is a sectional view taken on line 33—33 of Fig. 21 and showing particularly the actuating mechanism for the missing-space printing dial and the word-space printing dial of the typewriter unit as well as the paper feeding and the hammer actuating mechanisms; Fig. 34 is a sectional view taken on line 34—34 of Fig. 33 and showing certain details of construction peculiar to the missing-space printing dial of the typewriter unit; Fig. 35 is a perspective view showing certain details of the actuating mechanism for the missing-space printing dial of the typewriter unit; Fig. 36 is a sectional view taken on line 3—36 of Fig. 21 and showing means for actuating a word-space counter in response to space bar operations and for facilitating the return of that counter to its normal position pursuant to a line typing operation; Fig. 37 is a perspective view showing certain details of the actuating means for the word-space printing dial and for the word-space counter in association with means for facilitating the return of that dial and that counter to their normal positions; Fig. 38 is a sectional view taken on line 38—38 of Fig. 21 and showing in detail means for facilitating the return of the missing-space printing dial to its normal position; Fig. 39 is a view showing in plan the primary elements of the justifying unit B in their respective neutral positions; Fig. 40 is a fragmental view showing in elevation a pair of change gears in association with their respective shafts; Fig. 41 is a sectional view taken on line 41—41 of Fig. 40; Fig. 42 is a sectional view taken on line 42—42 of Fig. 40; Fig. 43 is a view similar to Fig. 39 and showing the control arm and its associated connector element as having moved toward the left as viewed in Fig. 1 in response to a line typing operation; Fig. 44 is a sectional view taken on line 44—44 of Fig. 39; Fig. 45 is a sectional view taken on line 45—45 of Fig. 39; Fig. 46 is a sectional view taken on line 46—46 of Fig. 39; Fig. 47 is a sectional view taken on line 47—47 of Fig. 39; Fig. 48 is a fragmental plan view showing the inking mechanism of the typewriter unit A; Fig. 49 is a front elevation of the inking mechanism; Fig. 50 is a sectional view taken on line 50—50 of Fig. 48 and showing escapement control means adapted for actuation in response to striking hammer operations; Figs. 51 and 52 are plan views collectively showing a reset mechanism, such portion of the mechanism as is shown in Fig. 51 being peculiar to the justifying unit B and such portion of the mechanism as is shown in Fig. 52 being peculiar to the justifying unit C; Fig. 53 is a front elevation of that part of the reset mechanism appearing in Fig. 51; Fig. 54 is an end elevation of the reset mechanism as viewed from the right in Fig. 53; Fig. 55 is a front elevation of that portion of the reset mechanism appearing in Fig. 52; Fig. 56 is an end elevation of the reset mechanism as viewed from the left in Fig. 52; Fig. 57 is a view in elevation showing a lockout mechanism for the striking hammer; Fig. 58 is a fragmental plan view showing in detail a connection between the lockout lever and the restraining arm appearing in Fig. 57; Fig. 59 is a view in elevation showing a modified form of the differential mechanism appearing in Fig. 28; Fig. 60 is a view similar to Fig. 59 and showing another modified form of differential mechanism; Fig. 61 is a view similar to Figs. 59 and 60 and showing another modified form of differential mechanism; Fig. 62 is a fragmental sectional view taken on line 62—62 of Fig. 61; Fig. 63 is a view similar to Figs. 59, 60 and 61 and showing another modified form of differential mechanism; Fig. 64 is a fragmental plan view of the control shaft appearing at the left in Fig. 63; Fig. 65 is a plan view showing an auxiliary or supplemental keyboard for use with the main keyboard of the typewriter unit as it appears in Fig. 1; Fig. 66 is a sectional view taken on line 66—66 of Fig. 65; Fig. 67 is a plan view of a modified form of justifying unit B; Fig. 68 is a plan view of another modified form of justifying unit B; Fig. 69 is a front elevation of the justifying unit appearing in Fig. 68; Fig. 70 is a plan view of a modified form of justifying unit C; Fig. 71 is a front elevation of the justifying unit appearing in Fig. 70; Fig. 72 is a fragmental view, partly in section and partly in elevation, showing control means for rendering the justifying unit of Figs. 70 and 71 inoperative under certain conditions; Fig. 73 is a plan view of the control means appearing in Fig. 72; Fig. 74 is a plan view showing another modified form of justifying unit C; Fig. 75 is a front elevation of the justifying unit appearing in Fig. 74; Fig. 76 is an end view, partly in elevation and partly in section, of the justifying unit as viewed from the left in Fig. 75; Fig. 77 is a plan view of another modified form of justifying unit C; Fig. 78 is an end view of the justifying unit appearing in Fig. 75

77, and Fig. 79 is a fragmental view showing in detail the relation of the holding pawl, appearing in Fig. 78, to its associated latch arm, also appearing in Fig. 78.

The machine herein shown and described as an embodiment of the invention, reference being had to Figs. 1 to 56, may be regarded as comprising three major entities, namely, a typewriter unit A; a line justifying unit B, under the control of word-spacing and character-spacing operations; and a line justifying unit C, under the control of word-spacing operations, all of which units are mounted on a suitable base 1.

TYPEWRITER UNIT A

The typewriter unit A, in the present embodiment of the invention is adapted to serve a three-fold purpose in that it may be employed to obtain a draft copy of subject-matter in line formation, for each line of which the extent of justification in relation to a definite column-width is to be determined, in that it may be employed to obtain either a record of or an announcement of the extent of justification required for each line of subject-matter with respect to a definite column-width, and in that it may be employed to obtain a final or justified copy of the drafted subject-matter when utilizing either the justifying unit B or the justifying unit C.

Although the typewriter unit A is adapted to function in the foregoing three-fold manner, it may be regarded as comprising primarily a typewriter 2, which, although fundamentally of a well known shuttle type, will be described with particularity because of the novel characteristic features which have been incorporated in it in order to adapt it to the particular office to which it is assigned in the general organization of elements, combination of elements and sub-combination of elements entering into the invention as a whole.

The typewriter 2 includes a keyboard 4, the respective character keys 5 of which are pivotally supported intermediate their ends and cooperate with companion levers 6 pivotally supported intermediate their ends. At the rear of the keyboard 4 is located a housing 7, as shown in Fig. 28, within which is mounted a vertically adjustable rod support 8, carrying at its upper end a rod 10, the upper end of which is slidable within a cover plate 11 supported by the housing 7. To the upper end of the rod 10 there is connected an annular shuttle support 12, the rim 14 of which is provided with a horizontal slot 15, through which is adapted to project a connecting lug 16, carried on the inner arcuate surface of a type shuttle 17, which is adapted to move in one direction or the other on the outer surface of the rim 14, the shuttle being provided with rows of various characters such for example as lower case letters 18, capitals 20 and figures 21. This shuttle is adapted to be placed on the shuttle support 12 and removed therefrom when that support is elevated with respect to its normal position of operation shown in Fig. 28, it being noted that one end of the slot 15 is sufficiently large, as shown at 22 in Fig. 2, to permit passage therethrough of the enlarged end of the lug 16. The shuttle 17 is slidably connected, through the medium of its lug 16, to a vertically disposed pin 24 carried by a shuttle actuating arm 25 secured to a hub 26 which is free to rotate on the rod 10. To the hub 26 there is connected an impedance arm 27, the outer end of which is free to move in a horizontal slot 28 formed in the upper end of the housing 7. By reason of the connection, just described, of the shuttle 17 with the hub 26, it will be apparent that when the hub is moved in one direction, the shuttle is similarly moved and that when the hub is moved in an opposite direction reverse movement is imparted to the shuttle. The means for actuating the hub 26, and in turn the shuttle 17, includes a pair of arms 30, 31 which are pivotally supported with respect to the housing 7, and the upper ends of which are adapted to normally assume their respective positions, shown in Figs. 28 and 32, adjacent a pair of shoulders 32, 34 formed on the hub 26, adjacent to which shoulders are provided arm-receiving slots 35, 36, adapted to respectively accommodate the upper ends of the arms 30, 31 under certain conditions of operation. Rearward movement of the arm 30 is effected to move the shuttle 17 in a clockwise direction, as viewed in Fig. 32, by reason of the fact that that arm is connected to an actuating segment 37, which overlies the inner ends of the levers 6 associated with the character keys 5 at the left of the keyboard, as viewed in Fig. 20; whereas rearward movement of the lever 31 is effected by reason of the fact that it is connected to an actuating segment 38 overlying the inner ends of the levers 6 associated with the character keys 5 at the right of the keyboard as viewed in Fig. 21.

In order to so limit the shuttle 17, in either of its movements, as to effect proper presentation, in the typewriting operation, of shuttle characters corresponding to any one of the character keys 5, there are provided a plurality of stop pins 40 mounted on the housing 7 for vertical movement, there being one stop pin for each lever 6 associated with the various character keys 5. It is to be noted that these stop pins are located in direct alignment with the rear ends of the respective levers 6 and are normally held in depressed position, as shown in Fig. 28, by their associated compression springs 41. From the relation of the stop pins to the respective levers 6, and the relation of such levers to the respective character keys 5, it will be understood that when a given character key is depressed its corresponding stop pin will be moved upwardly and into the path of movement of the impedance arm 28, so that the character on the shuttle 17 corresponding to the depressed character key will be properly positioned in the typing operation, it being noted that the group of stop pins appearing in Fig. 20 serve to limit the impediment arm 27 when it is moved in a clockwise direction, as viewed in Fig. 32, whereas the stop pins appearing in Fig. 21 serve to limit the impediment arm when it is moved in a counterclockwise direction as viewed in Fig. 32. It will be understood that the stop pins 40 function as described regardless of whether the writing operation is being carried out with respect to lower case letters, capital letters, or figures.

As will be appreciated from Fig. 28, the normal position of the shuttle support 12 is such as to render the upper row of characters, namely, the lower case letters, effective. If it is desired to so position the shuttle support 12 as to render the intermediate row of characters, namely, the caps 20, effective, it becomes necessary to slightly elevated the shuttle support, whereas if it is desired to render the lower row or characters, namely, the figures 21, effective, it is necessary to elevate the shuttle support to a somewhat greater extent.

Shuttle support elevating mechanism

Referring to Figs. 1 and 20, it will be noted that there are provided within easy reach of the operator a pair of shuttle-support elevating key levers 42 and 44, the former of which is labeled "Cap" and is operable to so elevate the shuttle support 12 as to render the row of capital letters 20 effective and the latter of which is labeled "Fig" and is operable to so elevate the shuttle support as to render the row of figures 21 effective. As shown in Fig. 26, the lever 42 is pivotally connected intermediate its ends to a suitable support, as shown at 45, and is provided with a latch 46 by which it may be held in a depressed condition, the latch 46 being adapted to interlock with a cooperating hook 47 suitably supported in a fixed position. The forward end of the key lever 42 is pivotally and slidably connected, as shown at 48, to the upturned portion of a fulcrum arm 50 which is pivotally connected intermediate its ends to a suitable support, as shown at 51, the rear end of the arm being pivotally and slidably connected, as shown at 52, to a crank arm 53, having a hub 54 loosely mounted on a horizontally disposed shaft 55, journalled at its ends in bearings 56 and 57, as shown respectively in Figs. 20 and 21. The hub 54 is provided internally with a recess 58, adapted to accommodate a driving lug 60, provided on the shaft 55 and cooperating with an abutment 61, formed internally of the hub adjacent the recess thereof. In order that the fulcrum arm 50 may be limited in its downward movement and thus limit rotation of the shaft 55 in a counterclockwise direction as viewed in Fig. 26, there is provided a suitably supported stop lug 62, which is disposed in such a relation to the fulcrum arm as to permit the latch 46 to be moved into locking engagement with its associated hook 47 at or about the instant the fulcrum arm reaches its limit of downward movement. As shown in Fig. 25, the key lever 44 is pivotally connected intermediate its ends to a suitable support, as at 64, and is provided with a latch 65 by which the lever may be held in a depressed condition, the latch 65 being adapted to interlock with a cooperating hook 66 suitably supported in a fixed position. The key lever 44 is slidably and pivotally connected, as at 67, to the upturned portion of a fulcrum arm 68, which is pivotally connected intermediate its ends to a suitable support, as at 70, the rear end of the arm being pivotally and slidably connected as at 71 to a crank arm 72, having a hub 74 loosely mounted on the shaft 55. The hub 74 is provided with a recess 75, adapted to accommodate a driving lug 76, provided on the shaft 55 and cooperating with an abutment 77 formed internally of the hub adjacent the recess thereof. In order that the fulcrum arm 68 may be limited in its downward movement, thus limiting rotation of the shaft 55 in a counterclockwise direction as viewed in Fig. 25, there is provided a stop lug 78, which is suitably supported in such a relation to the fulcrum arm 68 as to permit the latch 65 to be moved into locking engagement with its associated keeper 66 at or about the instant the fulcrum arm reaches its lowermost position. Carried by the shaft 55, as shown in Figs. 20, 21 and 28, are a pair of cams 80, each of which is maintained in engagement with a pair of cooperating lugs 81 carried by the vertically adjusting rod support 8.

From the foregoing description of the shuttle support elevating mechanism, it will be apparent that if the key lever 42 is depressed a sufficient distance to move the fulcrum arm 50 into engagement with the stop lug 62 and to permit the latch 46 to move into locking engagement with its associated keeper 47, the shaft 55 will be rotated a sufficient distance in a counterclockwise direction as viewed in Fig. 28, to cause the row of capitals 20 carried by the shuttle 17 to assume a position for use in the typing operation, such positioning of the capitals being effected by reason of the fact that the rod support 8, together with the rod 10 and its associated shuttle support, are moved in response to the action of the cams 80 on the lugs 81 carried by the rod support. Moreover, it will be understood that correct positioning of the capitals is insured by reason of the presence of the stop lug 62, Fig. 26, which definitely limits the movement of the fulcrum lever 50 in a downward direction. When the key lever 42 is depressed, the key lever 44, Fig. 25, remains unaffected by reason of the fact that the driving lug 76 is permitted to move away from the abutment 61 of the hub 74 to which the key lever 44 is connected. As to the key lever 44, it will be understood that when it is depressed a sufficient distance to engage the stop lug 78, Fig. 25, and permit the latch 65 to move into locking engagement with its associated keeper 66, the shaft 55 will be rotated a sufficient distance in a counterclockwise direction, as viewed in Fig. 28, to cause the row of figures 21 carried by the shuttle 17 to assume a position for use in the typing operation. Here it is to be noted also that proper positioning of the row of figures 21 is assured by reason of the presence of the stop lug 78, Fig. 25, which limits the downward movement of the key lever 44; and that when the key lever 44 is depressed, the key lever 42 remains unaffected due to the fact that the lug 60 carried by the shaft is permitted to move within the recess 58 of the hub 54 to which the key lever 42 is connected.

Striking hammer actuating means

It will be understood that each time a character is brought into typing position, it is necessary to impart an impact to the face of that character through the medium of suitable character-imprint receiving material, such as paper, and through the further medium of a ribbon-like material, provided with a printing material and hereinafter more particularly described. To this end a striking hammer 82 is provided, such hammer being carried, as shown in Figs. 28 and 33, by a horizontal shaft 94 suitably supported with reference to the base of the machine and near the rear thereof, as shown in Figs. 20 and 21. The striking hammer 82 is adapted to be moved in a clockwise direction, as viewed in Fig. 28, when released from its normal position shown therein, under the influence of suitable tension means, not shown, such as a torsion spring carried within a suitable housing 85 appearing in Fig. 33. The hammer 82 is normally held latched in its retracted position, shown in Fig. 28, by a pivotally supported spring pressed holding pawl 86, adapted to engage a shoulder or detent 87 formed in the lower end of the hammer.

The tripping mechanism for the striking hammer 82 includes a bell-crank lever 88, carried by a horizontally disposed shaft 90 journalled in the housing 7 and having an arm 3 adapted to be moved downwardly into engagement with the pawl 86 to release the hammer, pursuant to which that arm is moved upwardly into engagement with a reset lug 91 carried by the hammer at the lower end thereof. The bell crank-lever 88 is connected to an arcuate segment 92, Fig. 28, which is so curved as to overlie the rear ends of the levers 6 associated with the respective character keys 5. It will be understood that when a given character key 5 is depressed it will so act on its associated companion lever 6 as to move the arcuate segment 92 upwardly, thereby moving the arm 3 of the bell crank lever downwardly to disengage the pawl 86 from the detent 87 of the striking arm. Upon releasing the pawl 86 the actuating spring, above mentioned as carried within the housing 85, will swing the striking hammer in a clockwise direction as viewed in Fig. 28, thus delivering an impact to the face of the character corresponding to the character key which has been depressed. Upon release of the character key, the arm 3 of the bell-crank lever 88 is moved into engagement with the reset lug 91 of the hammer by a return spring 163 connected to the segment 92, thereby retracting the hammer to its normal position, as shown in Fig. 28, and allow the pawl 86 to enter the detent 87 preparatory to the next hammer striking operation.

Paper carriage unit

Suitably supported on the base 1 for translatory movement in a horizontal direction intermediate a pair of guides 94, is a main carriage 95, which, as shown in Fig. 28, is provided with a depending web 96 operating within a depending guide channel 97. Mounted on the main carriage 95 for movement longitudinally of that carriage intermediate a pair of guides 98 is a subsidiary or supplemental carriage 99, the base 100 of which is provided at opposite ends with a pair of vertically disposed magazine supports 101, by which is carried a substantially cylindrical magazine 102, of suitable material such as wire mesh, adapted for the reception of an imprint-receiving material, such as paper, on which the typing operation may be carried out. This magazine is provided with a longitudinal opening 104 extending throughout its length, through which the paper may be fed into the magazine to load it and through which the paper may be intermittently moved to line printing position by the gripping action of a pair of feed rollers 105 and 106 journalled in the supports 101, and to the shaft 107 of the latter of which rollers is connected a hand wheel 108 by which that roller may be manually operated. It will be understood that when loading the magazine in the manner described, the paper will, upon entering the magazine, coil itself up in the magazine and thus permit a relatively large supply to be introduced. The magazine may also be supplied with paper in the form of a roll by introducing such roll at one end of the magazine, it being noted that the magazine supports 101 are provided with openings which register with the magazine and are sufficiently large to permit the introduction of a relatively large roll of paper. If the magazine is loaded in this manner, it will be understood that the end of the paper roll, pursuant to loading, will be initially threaded, so to speak, between the rollers 105 and 106 in order to condition it for proper feeding operation when typing line after line. Associated with the magazine supports 101, are a pair of upstanding arms 110, carrying at their upper ends a horizontally disposed rod 111, on which is mounted for longitudinal movement thereon a paper cutter 112, having a cutting wheel 114 adapted to be manually moved across the width of the paper in order to sever it transversely at a point somewhat remote to the rollers 105, 106.

Paper carriage unit translating mechanism

In order that the carriage may be moved during the typing operation (regardless of whether that operation is to be carried out with the view to determining the extent of justification required between a given line of subject-matter and a definite column-width, or to effect justification by either the justifying unit B or the justifying unit C—all in the manner hereinafter more particularly described), there is provided a main drive shaft 115 which is disposed longitudinally of the machine at the rear of the keyboard and is journalled at one end in a bearing 116, Fig. 1, and is supported for rotation at its other end in a manner hereinafter more particularly described. This shaft is adapted for step-by-step rotation during the typing operation, through the instrumentality of means hereinafter more particularly described, and is provided at one end with a bevel gear 117, meshing with a similar gear 118 carried by a horizontally disposed shaft 120 mounted in bearings 121. To one end of this shaft, at the rear of the machine, there is connected a pawl-carrying arm 122, Figs. 3 and 40, carrying a pin 9, on which is pivotally supported a spring-tensioned pawl 124, adapted to cooperate with a driving ratchet wheel 125. This ratchet wheel is loose on the shaft 120 and is connected to a holding ratchet wheel 126, which is also loose on the shaft 120, and the hub portion of which is connected to a spur gear 127, adapted to move with the ratchet wheel 126 and in relation to the shaft 120. It is to be noted that the pawl 124 is such that when the arm 122 is moved against the action of its associated return spring 169 in a clockwise direction, as viewed in Figs. 40 and 41, the pawl 124 will ride over the teeth of the ratchet wheel 125, but will engage one of the teeth of that wheel on reverse movement of the arm and thus effect rotation of that ratchet wheel, the ratchet wheel 126 and the spur gear 127. In order that the spur gear 127 may be held against rotation, under the influence of momentum, at the time the shaft 120 completes its return movement, there is associated with the ratchet wheel 126 a holding pawl 128. This holding pawl 128 is carried by a shank 13, slidably mounted within a barrel 19 pivotally connected to the bearings 121 by a shaft 23 to which is secured a trigger lever 29. Surrounding the pawl shank 13 is a compression spring 33, which serves to urge the pawl upwardly, and secured to the lower end of the barrel 19 is a tension spring 39 which tends to move the barrel in a counter-clockwise direction about its pivot as viewed in Fig. 41. The trigger lever 29 is normally engaged by the pin 9, carried by the arm 122, so that the pawl 128 is held in engagement with its associated ratchet wheel 126. As the arm 122 is moved in a counterclockwise direction, however, the pawl 128 is moved into engagement with the ratchet wheel 126 against the influence of the tension spring 39. From the foregoing description of the pawl 128 and its associated elements, it is obvious that as the arm 122 completes its return movement the pawl 128 will be moved into engagement with its associated ratchet wheel 126. Should the momentum of the carriage 95, to which the gear 127 is operatively connected, as will hereinafter more clearly appear, slightly overrun its intended extent of movement upon completion of the return movement of the arm 122, the spring 39, associated with the pawl 128, will serve as a buffer for the pawl which is then in engagement with one of the teeth of its associated ratchet wheel 126 and will return that wheel to such a position as to effect an abutting relation between the pawl 124 and the particular tooth of the ratchet wheel 126 with which that pawl cooperated during the return movement of the arm 122. Meshing with the spur gear 127, is a similar gear 130, carried by a shaft 131, journalled directly beneath shaft 120. The shaft 131 carries a ratchet wheel 132 rigid thereon and is disposed in alignment with a drive shaft 134, to which is rigidly connected an arm 135, having journalled in its outer end a pin 136, to which is secured a driving pawl 138 and a trip arm 140, the pawl being normally held in engagement with the ratchet wheel 132 by suitable means such as a tension spring 141. The trip arm 140 is provided at its outer end with a roller 142, which is adapted to cooperate with the inclined face of a cone-like cam 144, splined to the shaft 134 for longitudinal movement thereon and provided with an annular groove 145, adapted to receive a pair of pins 146, carried by a yoke-like actuating element 147, secured to a shaft 148, journalled in a bearing 150, which is mounted on the base of the machine and is provided at its outer end with an arm 151, the function of which will hereinafter more clearly appear. As shown in Fig. 47, the shaft 134 is provided at its forward end with a pinion 152, which is adapted to mesh with a rack 154, mounted for horizontal movement within a pair of guides 155 and 156 supported on the base of the machine, the side walls of the latter of which guides are slotted as at 153. That end of the rack 154 which is most remote from the pinion 152 is secured to and supported by a guide block 158, mounted for horizontal movement within the guide 156. The rack 154 and guide block 158 are connected by a pair of pins 160 to a sheath-like slide 161, one of which is journalled in the rack 154 and the other of which is journalled in the guide block 158 so as to permit the slide 161 to oscillate to a slight extent under certain conditions of operation, as will hereinafter become apparent. The slide 161 is adapted to slidably receive one end of a translating arm 162, which is pivotally connected to the base of the machine as shown at 164, and is adapted to move in a horizontal plane in order to move the carriage step-by-step during the typing operation. The arm 162 is connected to the main carriage 95 through the medium of a tongue-like connector element 165, which at one end is provided with a yoke 166, the arms 167 of which carry a pin 168, to which is connected a lug 170, attached to the carriage 95. it being noted that the arms 167 of the yoke are separated from each other a sufficient distance to permit the connector element 165 to be moved transversely of the carriage to various positions of adjustment. The connector element 165 is mounted for longitudinal movement within a trough-like guide 171 the side walls of which are slotted as shown at 159, and to the bottom wall of which are connected a pair of transversely extending wings 172, carrying an elongated rib 174 adapted for movement in an elongated slot 175, formed in the base of the machine, the rib 174, in cooperation with the longitudinal walls of the slot 175, serving to insure a straight-line adjustment of the trough-like guide 171 when it is moved transversely of the connector 165 to its various positions of adjustment, as and for the purpose hereinafter more particularly described. The trough-like guide 171 is held on the base of the machine by a pair of gibs 176, secured to the base and overlying the marginal portions of a pair of depending rib-like extensions 177, carried by the trough-like guide 171 at opposite ends thereof and projecting into slots 178 formed in the base. In order that the connector 165 may be moved transversely while maintaining a cooperative relation to the arm 162, the connection afforded between the connector 165 and arm 162 is similar to the connection between that arm and the rack 154 in that it includes a guide 180 provided with a pair of pins 181, one of which is journalled in a connector and the other of which is journalled in a keeper plate 182 carried thereby.

*Control means for the carriage unit translating mechanism*

The control means for the carriage-unit translating mechanism includes the character keys 5, hereinbefore described, and a U-shaped space bar 184, Figs. 20 and 21, which is arranged within easy reach of the operator and the side arms 185 and 186 of which are pivotally supported as at 187 and 188. To the end of the arm 185 there is pivotally connected a link 190, which, as shown in Fig. 27, is pivotally connected at its upper end to a pin 191, carried by a guide block 192, disposed intermediate a pair of lever arms 194, having slots 195 formed therein, within which the pin 191 is adapted to be adjusted to various distances from the center of a hub 196, which is mounted on the shaft 115 and to which the arms 194 are connected. The means for adjusting a pin 191 within the slots 195 includes an adjusting screw 197, associated with the arms 194 and having a swivel connection with the block 192, one of the arms 194 being provided with a scale, as shown, to facilitate desired adjustments. By varying the position of the pin 191 with respect to the axis of the shaft 115, the extent of movement of that shaft in response to space bar operations may be varied, as for example for various sizes of type, although the space bar 184 is limited in each of its downward movements by a suitable stop or abutment 198. The hub 196 carried by the shaft 115 is provided internally with a recess 200, adapted to accommodate a driving lug 201, provided on the shaft 115 and adapted for engagement with an abutment 202 provided adjacent the recess 200. It will be understood that when the space bar 184 is depressed, the hub 196 will be moved in a counterclockwise direction as viewed in Fig. 20A and Fig. 27, with the result that the shaft 115 is similarly moved; and it will also be understood, due to the presence of the recess 200 in the hub 196, that the shaft 115 may be moved without disturbing the normal position of the space bar through the shaft-actuating means associated with the character keys and hereinafter more particularly described.

The character-key controlled actuating means for the shaft 115 are adapted to impart differential movements to that shaft and include a plurality of driving hubs 204, which, as shown in Figs. 28, 29 and 30, are mounted for individual movement on the shaft. These hubs correspond in number to the number of character keys 5, and each is provided internally with a recess 205, accommodating a driving lug 206, carried by the shaft and adapted to engage an abutment 207, provided adjacent the recess. An arm 208 is carried by each hub 204, and is adapted to cooperate with a bell-crank lever 210, pivotally connected to its associated character key 5, as shown at 211. Each of these bell-crank levers is held in its normal position as shown in Fig. 28 by a spring pressed pin 212, slidably supported in the rear end of its associated character key 5, the pin 212 being disposed directly beneath one arm 214 of the bell-crank lever, whereas the other arm 215 of that lever is disposed directly beneath a removably supported abutment shaft 216 disposed above the keyboard. This shaft is journalled at one end in a removable bearing 217, as shown in Fig. 31, and is provided at its other end with a square stub 218, adapted to be introduced into and readily removed from a square socket 220, carried by a rotatable hub 221, journalled in a suitable bearing 222 and provided with a driving gear 224, the function of which will hereinafter more clearly appear. The shaft 216 is provided with a series of lower-case letter lugs 225, a series of capital-letter lugs 226, and a series of figure lugs 227, it being noted that the lugs 225 differ in length, that the lugs 226 differ in length, and that the lugs 227 differ in length. The lugs 225 correspond in number to the number of lower-case letters provided on the shuttle 17, and the lugs 226 correspond to the number of capital letters provided on the shuttle, and the number of lugs 227 correspond to the number of figures provided on the shuttle. As will hereinafter more clearly appear, the shaft 216 is automatically positioned to render either the lower-case letter lugs 225, or the capital-letter lugs 226, or the figure lugs 227 effective with respect to the bell-crank lever 210, depending upon whether a character key 5 is actuated with respect to the lower-case letters or with respect to the capital letters or with respect to the figures provided on the shuttle 17. Assuming the shaft 216 occupies its normal position shown in Figs. 28, 29 and 30, and the character keys 5 are being operated, the operation of any given key will move the shaft 115 to an extent proportional to the length of the lug 225 corresponding to that key. In this connection, it is to be noted that as the key is depressed the bell-crank lever 210 will swing in a counterclockwise direction, as viewed in Figs. 28, 29 and 30, without moving the shaft 115, until such time as the arm 215 of the bell-crank lever engages its corresponding lug 225, as shown in Fig. 29, whereupon further movement of the key will raise the pivot 211 of the bell-crank lever while the right end of the arm 215 thereof becomes fixed by the stop 225 thus causing the bell-crank lever to move in a clockwise direction at the same time that it is moved upwardly in its entirety about the point of its fixed engagement with the stop 225, with the result that the left end of the arm 210 of said bell-crank lever engages the arm 208 and moves said arm so that the shaft 115 will be moved to a definite extent, as shown in Fig. 30. It will be appreciated that by the novel means herein employed for transmitting motion to the shaft 115 through the medium of the character keys 5, the extent of the rotation of the shaft 115 may be made to correspond to the width of the character peculiar to the character key by proportioning the length of the lugs 225, 226 and 227 according to the width of the characters to which those lugs and the respective character keys correspond. For example, upon striking the character key corresponding to the letter $i$, the shaft 115 will be rotated a definite distance, whereas if the character key corresponding to the letter $m$ is actuated the shaft 115 will be moved a greater distance pursuant to the hammer actuating operation, with the result that the carriage 85 will, as will hereinafter more clearly appear, be advanced a greater distance with respect to the letter $m$ than with respect to the letter $i$, thus making it possible to obtain character spacing proportional to character widths. Although the foregoing example has been cited in connection with lower-case letters, it will be understood that the same principle governing differential movements of the carriage holds true with respect to capital letters, figures and such punctuating or other characters as may be provided on the shuttle 17 and there grouped as desired.

In order that the shaft 216 may be rotated in a clockwise direction as viewed in Fig. 29 when the typing operation is to be carried out with respect to capital letters, there is provided a positioning gear 228, Fig. 26, which meshes with the gear 224 and which is carried by a shaft 230 suitably supported directly beneath the shaft 216. The gear 228 is provided at one side with a pin 231, into engagement with which the rear end of the key lever 42 is adapted to move when that lever is depressed to elevate the shuttle support to operating position with regard to the row of capital letters 20. It will be understood that as the key lever 42 is depressed, the gear 228 is rotated in a counterclockwise direction as viewed in Fig. 26, thereby moving the abutment shaft 216, through the driving gear 224, in a clockwise direction as viewed in Figs. 28 to 30, the shaft 216 being brought to rest, by means hereinafter more particularly described, as the capital-letter lugs 226 assume a vertical position. In order that the shaft 216 may be rotated in a counterclockwise direction as viewed in Figs. 28 to 30 when the typing operation is to be carried out with respect to the row of figures 21 provided on the shuttle 17, the gear 228 is provided with a pin 234 arranged diametrically opposite the pin 231 and on the opposite side of the gear, the pin 234 being adapted to cooperate with the rear end of the key lever 44, as shown in Fig. 25, when that lever is depressed to so elevate the shuttle as to position the row of figures 21 for operation. As the key lever 44 is depressed, the gear 228 is moved in a clockwise direction as viewed in Fig. 25 with the result that the shaft 216 is rotated in a counterclockwise direction, thus vertically positioning the figure lugs 227, the shaft 216 being limited in its counterclockwise movement as one of the arms 237 moves into engagement with a stop lug 235 suitably supported in the path of travel of that arm and corresponding to a similar stop lug 49 positioned in the path of travel of the other arm 237 to limit the shaft 216 in its movement in a clockwise direction, as when the capital-letter lugs 226 are being moved into vertical position as previously described. Upon the release of either the key lever 42 or the key lever 44, the gear 228 is returned to its normal position, shown in Figs. 25 and 26, by reason of the fact that the shaft 230 to which that gear is connected carries a hub 236 having a pair of diametrically opposed arms 237 which are normally held in horizontal position by a pair of springs 238, carried by a pair of rods 240, pivotally connected to the arms 237 and slidable within openings 241 formed in the base of the machine, the springs 238 being confined intermediate such base and the upper shouldered ends of their associated rods. In order to lend stability to the gears 224 and 228 and to the shaft 216 when that shaft is normally positioned as shown in Figs. 28 to 30, the hub 236, to which the arms 237 are connected, is provided with a detent 242 adapted to receive the upper pointed end of a detent plunger 244, carried within a suitable housing 245 and yieldably supported by a compression spring 246.

From the foregoing description of the character key actuated means and the space bar actuated means, both with reference to the main drive shaft 115, it will be understood that that shaft is moved in a counterclockwise direction as viewed in Figs. 27 to 30 once for each character key operation and once for each space bar operation, and is returned pursuant to each operation to its normal position by the return spring 169, connected to the pawl-carrying arm 122 of the shaft 120, which is moved in accordance with the shaft 115, the spring 169 serving on the return movement of the arm 122 to impart rotation, through the pawl 124 and its cooperatively associated ratchet wheel 125 to the carriage-actuating pinion 152.

Here it may be well to remark that although only one abutment shaft 216 is herein shown, it is obvious that for this shaft other similar shafts may be substituted according to the nature of the character spacing required, in which cases the length of the respective lugs 225, 226 and 227 would be proportioned according to the spacing desired with reference to the characters corresponding to those lugs. To illustrate in this connection, it will be assumed that the abutment shaft 216 herein shown and described is such that a given carriage movement is produced with respect to the letter *i* and that a greater carriage movement is effected with regard to the letter *m*, and that it is desired to change the character spacing so as to obtain, for example, a greater carriage movement with regard to the letter *i* and a correspondingly greater carriage movement with relation to the letter *m*. Such a requirement could be satisfied by substituting for the differential shaft 216 a similar shaft, on which the lug controlling the carriage movement individual to the letter *i* is longer and on which the lug controlling the carriage movement peculiar to the letter *m* is correspondingly longer.

*Means for recording the required extent of justification for a given line of subject-matter, and for recording the number of word-spaces in such line*

Associated with the shuttle support 12 is a bearing bracket 248, as shown in Fig. 33, in one arm 250 of which is journalled the hub portion 251 of a disc 252, the upper end of the hub portion being provided with a spur gear 254, meshing with a similar gear 255, which, as shown in Fig. 28, is carried by a rotatable missing-space printing dial 256, journalled on a stub shaft 43, suitably supported by the bracket 248. The peripheral edge of the dial 256 is bevelled, as shown at 257, and is there provided with suitable characters, not shown, such as raised numerals employed to record the extent of justification required of a given line of subject-matter with respect to a definite column-width. Preferably, the numerals provided on the bevelled margin of the dial 256 range from zero to 100, each numeral indicating, for example, $\frac{1}{18}$ em, regardless of size, in points, of the characters provided on the shuttle 17. The disc 252 carries at its outer margin an annular channel 258, within the bottom wall of which is formed an annular slot 260. Within the channel 258 there is mounted for rotation a ring 261, carrying a pin 262, which projects through the slot 260 and is provided at its screw-threaded end with a thumb nut 264, the screw-threaded end of the pin extending through a driving disc 265, connected to a shaft 266, the upper end of which is journalled in the hub portion 251 of the disc 252 and to the lower end of which is connected a bevelled gear 267. It will be understood that when the thumb nut 264 is run up into firm engagement with the driving disc 265, the ring 261 is locked against movement with relation to the channel 258 so that a driving connection is afforded between the shaft 266 and the gear 254. The bevelled gear 267 meshes with a similar gear 268 secured to a vertical shaft 270, journalled at its upper end in a bracket 271, which also serves as a journal for the lower end of the shaft 266. The shaft 270 is journalled in a bearing 272, supported by the housing 7 and is splined to a bevelled gear 274, meshing with a similar gear 275, carried by a motor shaft 276, with which is associated an electric motor 277, suitably supported with relation to the base of the machine. Journaled in the bracket 248, is a shaft 278 to the upper end of which is connected a spur gear 280, meshing with a similar gear 281, carried by a word-space printing dial 282, mounted on the stub shaft 43 for rotation relatively to the dial 256. The periphery of the dial 282 is bevelled, as shown at 284, and is there provided with suitable indicia, not shown, such as raised numerals employed to record the number of word-spaces contained in a given line of subject-matter which is to be justified with respect to a given column-width. To the lower end of the shaft 278, there is connected a crown gear 285, which meshes with a companion gear 286, carried by a shaft 287, journalled in the bracket 248 and splined to a bevel gear 288, which meshes with a smaller gear 290 carried by a drive shaft 291.

Inasmuch as the printing dial 256 is adapted for use in recording the extent of justification required between a given line of subject-matter and a definite column-width, it becomes necessary to operate that dial once for each character key operation and once for each space bar operation, and to that end the main drive shaft 115 may be employed, inasmuch as that shaft is moved in response to each character key operation and in response to each space bar operation. As shown most clearly in Figs. 21, 33 and 35, the main drive shaft 115 is provided with a loosely mounted ratchet wheel 292, to which is connected a spur gear 294, meshing with a similar gear 295, carried by the motor shaft 276. Adjacent the ratchet wheel 292, there is secured to the shaft 115 an arm 296, within the outer end of which is journalled a pin-like shaft 298, carrying a pawl 300, adapted to cooperate with the ratchet wheel 292, the opposite end of the shaft 298 being secured to a release lever 301.

From the foregoing it will be understood that each time the main shaft 115 is advanced in response to a character key operation or in response to the operation of the spacer bar, the ratchet wheel 292 and its associated gear 294 will be correspondingly moved, thereby rotating the gear 295 and the motor shaft 275 and advancing the dial 256 a distance corresponding to the extent of movement of the main shaft 115, the ratchet wheel 292 and the various elements in liaison therewith being permitted to remain at rest as the shaft 152 returns to its normal position carrying with it the pawl 300. It will also be understood from the foregoing that since the extent of each movement of the main shaft 115, as effected by the operation of the character keys and the operation of the spacer bar, corresponds to a definite value measured in terms of column-width measuring units, namely, 1/18 em, and since the printing dial 256 is graduated in 1/18 em, that dial offers a practicable means for determining the extent of justification required between a given line of subject-matter and a definite column-width, as for example a column-width equal to 828 1/18 em. In this connection, it is to be noted that when conditioning the machine for line typing with respect to a definite column-width, such for example as is represented by 828 1/18 em, with the view to determining the extent of justification required between each line and that column-width, the thumb nut 264 is released to permit the dial 256 to be set with its mark indicative of 28 1/18 em in printing position, it being noted that when the thumb nut 264 is released the dial 256 may be set in any position without disturbing the normal position of the driving disc 265, namely, the position to which the driving disc is moved when resetting the printing dial 256 in a manner hereinafter more particularly described. When the driving disc 265 is in its normal position, as shown in Fig. 34, it is permitted to rotate in the direction of the arrow shown thereon but is held against reverse movement when in a normal position by a spring pressed pawl 302, the holding end of which is adapted to be accommodated by a detent 304 provided in the disc. After setting the dial 256, as previously described, the thumb nut 264 is screwed down into engagement with the driving disc 265 so as to operatively connect the dial 256 in liaison with the shaft 266. As the typing operation proceeds, the dial 256 will move from its initial position, indicative of 28 1/18 em, toward its zero-graduation, which of course is coincident with the 100-graduation, and will continue to rotate until the typing operation is complete. Upon completion of the typing operation the missing spaces, that is, the difference, as measured in terms of 1/18 em, between the typed line and the column-width will be in accord with the printing-dial numeral then in printing position.

Inasmuch as the printing-dial 282 is adapted for use in determining the number of word-spaces in a given line of subject-matter, it becomes necessary to effect operation of that dial through the medium of the space bar 184, and to this end the arm 188 of the space bar is pivotally and slidably connected at its rear end, as shown at 305 in Fig. 33, to an actuating lever 306, pivotally supported at its rear end as shown at 307. To the actuating lever 306, intermediate its ends as shown in Fig. 37, there is connected a link 308, which at its upper end is pivotally connected to an arm 310 loosely supported on the shaft 291 and carrying a pivotally supported pawl 311 adapted to cooperate with a ratchet wheel 312 carried by the shaft 291. From the foregoing, it will be understood that as the spacing bar 184 is depressed, the arm 310 will be moved upwardly, thereby rotating the ratchet wheel 312 and its associated shaft 291 in a clockwise direction, as viewed in Fig. 33, against the influence of a suitable tension spring 314, Fig. 21, connected to the shaft 291 and adapted to operate, under conditions hereinafter more particularly described, to return that shaft, together with the dial 282 connected in liaison therewith to its normal position. In order that the ratchet wheel 312 may be held in definite positions when advanced through the medium of its coacting pawl 311, there is provided a holding pawl 315 pivotally supported on an arm 316 fixed to the base of the machine. It will be understood that the throw of the arm 310 and its associated pawl 311 is sufficient for each operation of the spacing bar 184 to so advance the shaft 291 as to move the dial 282 through an angle of rotation equal to the distance from the center line of one of its printing characters to the center line of another of its characters. It will also be understood that the printing dial is provided with an adequate number of characters, indicative of word-spaces, to take care of the maximum number of word-spaces that would occur in any given line of typewritten subject-matter, and that the printing-dial is advanced in response to space bar operation in such a direction that its characters are presented in printing position in a consecutive order beginning with the zero setting of the dial at the outset of the typing operation.

In order that the required extent of justification and the number of word-spaces may be recorded, as at the end of each line, upon completion of the line typing operation, it becomes necessary to lower the printing-dials 256 and 282 to their respective typing positions with relation to the striking hammer 82 and to this end a pair of keys 317 and 318, Fig. 20, are provided, the former of which is adapted for operation in moving the dial 256 into typing position and the latter of which is adapted for operation in bringing a dial 282 into typing position. It is to be noted, however, that before either of the keys 317 and 318 is operated, it is necessary to render the operating means for the dials 256 and 282 inoperative, and to this end a release key 320 is provided as shown in Fig. 21.

The release key, as shown particularly in Fig. 36, is pivotally supported as at 321 and is provided with a locking hook 322, adapted to move past and into locking engagement with a spring pressed keeper 324, secured to a shaft 325, hereinafter more particularly described. The rear end of the release key 320 is pivotally and slidably connected, as at 326, to a crank arm 327, secured to a release shaft 328, the release shaft being mounted in suitable bearings, one of which is indicated at 330 in Fig. 36. To the shaft 328, there is connected a trip arm 331 which, as shown in Fig. 33, is provided at its upper end with a pin 332, accommodated within an elongated slot 334, provided in a connector link 335, the slot 334 being adapted to also accommodate a pin 336, carried by an arm 337, secured to a hub 338 loose on the shaft 115. The hub 338 is provided with a release arm 340, disposed oppositely to the arm 337, the outer end of which is adapted to be moved into engagement with the trip arm 331 to move the pawl 300 out of engagement with its associated ratchet wheel 292.

It will be appreciated from the foregoing that when the release key 320 is depressed, the release arm 340 will be moved in a counterclockwise direction, as viewed in that Fig. 33, a sufficient distance to move the pawl 300 out of engagement with its associated ratchet wheel 292, thereby severing the driving connection afforded between the main shaft 115 and the dial 256 by way of the motor shaft 276 and its associated elements. As shown most clearly in Fig. 37, the shaft 328 carries a trip arm 341 which, when the release key 320 is depressed, is adapted to be moved a sufficient distance to engage the depending portion of the pawl 311 and move that pawl out of engagement with its associated ratchet wheel 312, thus rendering the space bar ineffective with respect to the shaft 291 and consequently ineffective with respect to the printing-dial 282.

Referring to the details of the missing-space key 317, as shown in Fig. 23, it will be noted that this key is pivotally supported as at 342, and is provided at its rear end with a bell-crank actuating lug 344 and a rack 345. The lug 344 is adapted, when the key 317 is depressed, to cooperate with one end of a T-piece 346, carried by one arm 347 of a bell-crank lever 348, the other arm 350 of which is adapted to cooperate with one end of a supporting lever 351 pivoted to a base for horizontal movement, the other end of the lever 351 being normally held by a tension spring 352 in rod-supporting position beneath a shoulder 354, formed in the rod support 8, with which the shuttle support 12 is associated. Pivotally connected to the rear end of the key 317, is a link 355, which in turn is pivotally connected to an arm 356, secured to one end of a horizontally disposed shaft 357, to the opposite end of which shaft, as shown in Fig. 24, is connected a lever 358. This lever is pivotally connected to one arm 360 of a bell-crank lever 361, pivotally supported, as at 362, the other arm 364 of the bell-crank lever being provided with a pin 365, disposed beneath the forwardly extending arm of the bell-crank lever 88, hereinbefore described as effective to release the spring pressed pawl 86 from the detent 87 formed in the lower end of the hammer 82.

Carried by the shaft 55, hereinbefore described as constituting an element of the means for so moving the shuttle support upwardly as to bring the row of capitals 20 and the row of figures 21 into printing position, is a hub 366, having formed interiorly thereof a recess 367, which accommodates a driving lug 368, adapted to cooperate with a shoulder 370, located within the hub adjacent the recess thereof. On the hub 366 is carried a pinion 371, which meshes with the rack 345 and is adapted to be so moved as to rotate the shaft 55 in a clockwise direction, as viewed in Fig. 23, and similarly move the cams 80, which, as heretofore stated, are carried by the shaft 55 and are disposed intermediate the lugs 81 associated with the rod support 8.

From the foregoing description, it will be understood that when the key 317 is depressed, the bell-crank lever 348 is so moved in a counterclockwise direction, as viewed in Fig. 23, as to retract the lever 351 from beneath the shoulder 354, thus conditioning the rod support 8 for downward movement in a manner hereinafter more particularly described. During such movement of the key 317 as is required to release the rod support 8, the pinion 371 is rotated a sufficient distance to move its shoulder 370 into engagement with the driving lug 368 of the shaft 55. Upon continued movement of the key 317, the shaft 55 is rotated in a clockwise direction, as viewed in Fig. 23, with the result that the shuttle support is lowered a sufficient distance to bring the indicia of the printing-dial 256 into printing position with respect to the striking hammer 82, the key 317 being limited in its downward movement by a stop-lug 374 positioned directly beneath the same, as shown at the right in Fig. 23. At or about the time the key 317 completes its downward movement, the striking hammer 82 is released by the bell-crank 88, in the manner hereinbefore described, with the result that a printing impact is delivered to the particular character of the printing-dial 256, which is indicative of the extent of justification required in a given line of subject-matter.

As to the key 318, which is adapted for operation in moving the dial 282 into typing position, it will be noted, as shown in Fig. 24, that this key is pivotally supported, as at 375, and is provided at its rear end with a bell-crank actuating lug 376 and a rack 377, the lug 376 being adapted, when the key 318 is depressed, to cooperate with one end of the T-piece 346, which, as heretofore explained, is carried by the arm 347 of the bell-crank lever 348. Pivotally connected to the rear end of the key 318, is a link 378, which in turn is pivotally connected to an arm 380, secured to the shaft 357, which, as hereinbefore described, is adapted to so move the levers 358 and 361 as to release the hammer. Carried by the shaft 55, hereinbefore described as constituting an element of the means for so moving the shuttle support upwardly as to bring the row of capitals 20 and the row of figures 21 into printing position, is a hub 381 having formed interiorly thereof a recess 382, accommodating a driving lug 384, adapted to cooperate with a shoulder 385, formed in the hub adjacent the recess thereof. On the hub 381 is carried a pinion 386, which meshes with the rack 377 and is adapted to be so moved as to rotate the shaft 55 in a clockwise direction, as viewed in Fig. 24, thus similarly moving the cams 80 hereinbefore described.

From the foregoing description, it will be understood that when the key 318 is depressed, the bell-crank lever 348 is so moved in a counterclockwise direction, as viewed in Fig. 24, as to retract the lever 351 from beneath the shoulder 354 provided on the rod support 8, thus conditioning that support for downward movement. During such movement of the key 318, as is required to release the rod support 8, the pinion 386 is rotated a sufficient distance to move its shoulder 385 into engagement with the driving lug 384 of the shaft 55. Upon continued movement of the key 318, the shaft 55 is rotated in a clockwise direction, as viewed in Fig. 24, with the result that the shuttle support is lowered a sufficient distance to bring into printing position the indicia provided on the inclined peripheral surface of the printing dial 282, the key 318 being limited in its downward movement by a stop lug 387 positioned directly beneath the same, as shown at the right in Fig. 24. At or about the time the key 318 reaches the limit of its downward movement, the striking hammer 82 is released by the bell-crank 88, in the manner hereinbefore described, so that that hammer will deliver a printing impact to the numeral on the printing dial 282 with respect to which the wordspace printing operation is to be carried out.

When considering the operation of the keys 317 and 318, it is to be noted that the key 317, due to the presence of the recess 382 in the hub 381, corresponding to the key 318, may be depressed without disturbing the normal position of the key 318 as shown in Fig. 24. Similarly, it is to be noted that the key 318, due to the presence of the recess 367 provided in the hub 366, corresponding to the key 317, may be depressed without disturbing the normal position of the key 317 shown in Fig. 23.

*Indicator means for announcing the required extent of justification for a given line of subject-matter and for indicating the number of word-spaces in such line.*

The above means includes a pair of indicators 388 and 390, shown in Fig. 1, the former of which is adapted to indicate the extent of justification of a given line of subject-matter with respect to a definite column-width and will hereinafter be referred to as a missing-space counter, and the latter of which is adapted to indicate the number of word-spaces in said line and will hereinafter be referred to as a word-space counter.

Inasmuch as the missing-space counter is adapted for use in indicating the extent of justification required for a given line of subject-matter with respect to a definite column-width, it becomes necessary to operate the counter once for each character key operation and once for each space bar operation, and to that end the main shaft 115 is provided, as shown in Figs. 21 and 38, with an arm 391, carrying at its outer end a pin 392, which is normally positioned within a detent 394, formed in a horizontally disposed link 395, adjacent one end of an elongated slot 396 also provided in that link. In order that the link 395 may be held in its normal position with relation to the pin 392, a tension spring 397 is provided, one end of which is connected to the link, as shown at 398, and the other end of which is suitably anchored to the base of the machine as shown at 400. The forward end of the link 395 is pivotally connected to an arm 401, loosely supported on a worm shaft 402, journalled in bearings 404, mounted on the base of the machine. The arm 401 carries at its end a pawl 405, adapted to cooperate with a ratchet wheel 406 secured to one end of the shaft 402. Meshing with the worm of the shaft 402 is a worm gear 407, which is connected to a shaft 408, journalled in suitable bearings and provided with a bevel gear 410, which meshes with a similar gear 411, carried by a shaft 412, which constitutes an element of the missing-space counter 388 and is connected to an electric reset motor 414, the function of which will hereinafter more clearly appear.

Although the missing-space counter 388, herein shown, is of a well-known commercial type, it may be well to mention the fact that it includes, as shown in Figs. 1 and 51, a plurality of discs 415, 416, 417 and 418, which are associated with the shaft 412 and are adapted to so move as to indicate the total extent of movement of the carriage as effected in response to character key operation and in response to space bearing operation. These discs are adapted to be returned to their zero positions, pursuant to each line typing operation, by a reset mechanism hereinafter more particularly described. With the discs 415, 416, 417 and 418 are respectively associated companion discs 420, 421, 422 and 424, which are adapted to be set, as when the discs 415, 416, 417 and 418 are in zero position, to indicate a definite column-width as 828 1/18 em. It will be understood that the respective pairs of discs 415—420, 416—421, 417—422 and 418—424 are adapted to be moved together in response to movements of the shaft 412, and that as the discs 415, 416, 417 and 418 function to indicate the total movement of the carriage, whereas their companion discs 420, 421, 422 and 424 function to subtract the total extent of movement of the carriage from the column-width as represented by them initially. It will be appreciated, therefore, that if the discs 420, 421, 422 and 424 are set to indicate a column-width of, for example, 828 1/18 em at the beginning of a line typing operation, and upon the completion of that operation indicate, for example, a reading of 28, it immediately becomes apparent that the extent of justification required for that line with respect to the given column-width is 28 1/18 em. Incidentally, the discs 415, 416, 417 and 418, upon completion of the line typing operation, will present a reading of 800, which is indicative of the fact that the typed line is of a length equal to 800 1/18 em, it being noted that, upon completion of the line typing operation, the sum of the readings, as represented by the first group of discs and by the second group of discs, is equal to the initial reading of the second group of discs, which initial reading is representative of column-width and is, in the example given, 828 1/18 em. Although the missing-space counter 388 is herein shown and described as of a standard commercial form, it will be understood of course that for this instrument other types of counters may be employed such, for example, as one embodying the principle of the printing dial 256 hereinbefore described.

Inasmuch as the word-space counter 390 is adapted for use in indicating the number of spaces occurring between words in a given line of subject-matter, it becomes necessary to operate that counter in response to space bar operation only, and to that end the arm 186 of the space bar is pivotally and slidably connected at its rear end, as shown at 425 in Figs. 21 and 36, to an actuating lever 426 which is pivotally supported at its rear end, as at 427 in Fig. 36, and is pivotally connected intermediate its ends to an operating link 428, shown most clearly in Figs. 36 and 37. This operating link is provided intermediate its ends with an elongated slot 430, adapted to accommodate a guide pin 431 secured to the pawl 434, and is pivotally connected, as at 432, to an actuating pawl 440, adapted to cooperate with a ratchet wheel 435, secured to a horizontal shaft 436 which is journalled as at 437. The connecting pin 432 passes through a suitable slot in the pawl 434. The shaft 436 is operatively connected at one end to the word-space counter 390, and is adapted to be moved in a clockwise direction as viewed in Fig. 36 against the influence of a suitable torsion spring 438, connected to the shaft and adapted to operate under conditions, hereinafter more particularly described, to return that shaft and the indicia bearing discs of the counter to their normal positions. In order that the ratchet wheel 435 may be held in definite positions when advanced through the medium of its coacting pawl 440, there is provided a holding pawl 434, pivotally supported as on the pin 431 in a cooperative relation to its associated pawl. It will be understood that the throw of the pawl 440 is sufficient for each operation of the spacing bar 184 to so advance the shaft 436 as to effect a complete unit operation of the word-space counter 390.

As previously explained, there is provided a release key 320 by which the printing dials 256 and 282 are rendered inoperative before either of the keys 317 and 318 is operated to record the missing spaces and the number of word-spaces following the completion of a given line typing operation. The release key 320 is also adapted to be utilized to render the missing-space counter 388 and the word-space counter 390 inoperative, as for example when the readings of these counters are to be recorded by ordinary typing operations, and to that end the shaft 328 is provided with an arm 442, which, as shown in Fig. 38, is pivotally and slidably connected, as shown at 444, to the depending arm 445 of a bell-crank lever 446, journalled on the shaft 115, the other arm 447 of the bell-crank lever being provided with a roller 448 positioned beneath the rear end of the link 395. From the foregoing, it is obvious that when the release key 320 is depressed and the shaft 328 is rotated in a clockwise direction as viewed in Fig. 38, the bell-crank lever 446 will be so moved that its associated roller 448 will lift the link 395 a sufficient distance to free the pin 392 from the detent 394 provided in the link 395. So long as the bell-crank lever 446 is maintained in link releasing position, the arm 391, which is secured to the shaft 115, is free to operate without imparting motion to the link 395 and consequently without operating the missing-space counter 388. As shown most clearly in Fig. 37, the shaft 328 is provided with a trip arm 450, which is adapted to engage the depending portion of the actuating pawl 440, associated with the ratchet wheel 435 which is carried by the shaft 436 and functions to operate the word-space counter 390. It will also be appreciated that so long as the release key 320 is maintained depressed, the pawl 440 is maintained out of engagement with its associated ratchet wheel 435, thus maintaining the word-space counter 390 inoperative.

*Line spacing mechanism*

In order that the character-imprint receiving material, which is illustrated in Fig. 28a as a coil of paper 451, may be held against creeping with respect to the feed roller 106 and thus insure accuracy in line spacing, each longitudinal marginal area of the paper is provided with a series of perforations, as shown at 452 in Fig. 28a, which are adapted to accommodate teeth-like projections 454 provided on the feed roller at opposite ends thereof. This feed roller is automatically actuated by a stall motor 455 pursuant to each line typing operation, in a manner hereinafter more particularly described, to rotate the feed roller, in a counter clockwise direction as viewed in Fig. 28, a predetermined distance corresponding to the space desired between the respective typed lines of subject matter. The motor 455 is suitably supported at the rear of the machine base and is connected to a shaft 456, journalled in bearings 457 and having throughout the greater portion of its length a groove 458 by the aid of which an actuating arm 460 is splined to the shaft. The arm 460 is carried by the shaft 456 intermediate a pair of guide brackets 461, mounted on the subsidiary carriage 100 for movement along the shaft 456. The forward end of the arm 460 is pivotally connected to a vertical link 462, which is provided intermediate its ends with a stop pin 464 and is pivotally connected at its upper end to an arm 465, which carries a spring pressed pawl 466 and is mounted for movement on the feed roller shaft 107 adjacent a ratchet wheel 467 which is secured to that shaft and with which the pawl 466 is adapted to cooperate. Suitably supported with respect to the carriage 100, is a stop wheel 468, which is adapted to be moved with that carriage and which is provided with a plurality of abutment pins 470, the abutment pins being of different lengths, as shown, and adapted to be selectively positioned to engage the pin 464 carried by the link 462 and thereby limit the upward movement of that link and consequently the extent of rotation of the feed roller 106 according to the space desired between typewritten lines of subject matter. From the foregoing, it will be understood that each time the motor 455 is operated, the feed roller 106 will be advanced according to the setting of the stop wheel 468, the motor being brought to a stall the instant the pin 464 carried by the link 462 moves into engagement with one of the abutment pins 470.

*Inking mechanism*

In order that the characters provided on the shuttle 17 as well as those provided on the printing dials 256 and 282 may be rendered effective with respect to the character-imprint receiving material, such as the paper 451 which is supported for translation by the main and subsidiary carriages 95 and 100, provision is made for feeding a suitable ribbon-like inking tape past the type-carrying shuttle where it is impinged between the paper and a selected character each time the hammer 82 is operated, it being understood that the term "ink" is used in a generic sense and therefore includes any suitable printing material, other than ordinary typewriter ribbon ink, such for example as carbon or the like.

As shown in Figs. 21 and 49, the base 1 of the machine carries a pair of posts 471, which, at their upper ends support a platform 472, provided with a pair of vertical stub shafts 474, on which are journalled tubular shafts 475 and 476, respectively provided at their lower ends with escapement wheels 477 and 478. The tubular shafts 475 and 476 are adapted to removably receive a pair of supply reels 480 and 481, the hub portions of which may be keyed to the tubular shafts 475 and 476, respectively, or otherwise suitably held against rotation with respect thereto. Pivotally connected to the platform 472 adjacent the escapement wheels 477 and 478, are a pair of escapement ratchets 482 and 484, which are adapted to cooperate with the escapement wheels 477 and 478, and thereby control the intermittent feeding movement of the reels 480, 481, the escapement ratchets 482, 484 being provided with arms 485 which are connected together by a link 486 having an operating arm 487 by which the reels 480, 481 may be manually controlled. The escapement ratchet 482 is provided with a trip arm 488, connected, as shown in Fig. 50, to the platform 472 by a tension spring 490, the outer end of which arm is provided with a depending lug 491, adapted to cooperate with an actuating finger 492, pivotally connected, as at 494, to the upper end of an oscillating arm 495, secured to one end of the horizontally disposed shaft 84 to which the striking hammer 82, hereinbefore described, is connected. It is to be noted that the actuating finger 492 is yieldably held in its position shown in Fig. 50 by a pair of flat springs 496, secured to the upper end of the oscillating arm 495. From the foregoing, it will be understood that upon release of the striking hammer 82, in the manner hereinbefore particularly described, the oscillating arm 495 will be moved forwardly, carrying with it the actuating finger 492, which, upon engagement with the depending lug 491 carried by the trip arm 488, rides over that lug to a position at the right thereof, particular reference being had to Fig. 50, without disturbing the normal position of the escapement ratchets 482 and 484. As the striking hammer returns to its normal position, in the manner hereinbefore described, the actuating finger 492 will engage the lug 491, carried by the trip arm 488, and will serve to move the escapement ratchets 482, 484 in a clockwise direction as viewed in Fig. 48, thus permitting the reels 480, 481 to rotate in a counter clockwise direction to a slight extent under the influence of ribbon-tensioning means, hereinafter more particularly described. As the escapement ratchets 482, 484 come to a position of rest, when moved in a clockwise direction as just described, the actuating finger 492 will ride over the lug 491, thus permitting the oscillating arm 495 to assume its normal position corresponding to the normal position of the striking hammer 82. Upon release of the actuating finger 492 from the depending lug 491, carried by the actuating arm 488, the escapement ratchets 482 and 484 will be moved to their normal positions under the influence of the tension spring 490, it being noted that movement of the reels 480, 481 is permitted only during the returned movement of the striking hammer.

Carried by the base of the machine and in alignment with the post 471, are a pair of similar posts 497, to the upper ends of which is secured a platform 498, on which are supported a pair of stub shafts 500, to which are journalled tubular shafts 501, 502 provided, respectively, with spur gears 504, 505. The tubular shafts 501 and 502 are adapted to removably receive a pair of take-up reels 506, and 507, which may be keyed to the shafts or otherwise held against rotation thereon and which are adapted to receive from the reels 480 and 481, respectively, an ink-carrying medium, of suitable material, such as a strip of thin paper 508, of proper texture, which is supported at opposite sides of the path of movement of the striking hammer 82 by a pair of U-shaped guides, intermediate the upstanding arms of which the ink-carrying medium is adapted to travel, one of such guides being indicated by the numeral 510 in Fig. 28. Disposed between the U-shaped guides 510, is a guard or shield, as shown at 511 in Fig. 33, the shield being positioned intermediate the striking end of the hammer and the ink-carrying medium and provided with an opening 512 through which the force of an impact delivered by the hammer 82 to the rear of the imprint-receiving material may be imparted to the faces of the type of the shuttle 17 or of the printing dial 256 or of the printing dial 282, as the case may be, by way of the ink-carrying medium, it being understood that the opening 512 is sufficiently large to permit the paper to impinge on the ink-carrying medium and that the guard in itself serves to prevent undue surface contact between the imprint-receiving material and the ink-carrying medium in the vicinity surrounding the opening 512.

As shown in Fig. 49, the gears 504 and 505 mesh with a driving gear 514 carried by the shaft 515 of a suitable motor 516 supported by the platform 498. Secured to the shaft 515, is a friction disc 517, which is adapted to cooperate with a pair of brake shoes 518, carried at the outer ends of a U-shaped spring support 520 secured to an arm 521 which at one end embraces the shaft 515 and at its other end is connected to an adjusting screw 522, having screw-thread connection with the platform 498 and provided at its upper end with a thumb wheel 524, by which the screw may be readily rotated to increase or decrease the braking action of the brake shoes 518 on the friction disc 517 and thus vary the effective torque of the motor on the reels 506 and 507 according to the degree of tension desired in the ink-carrying medium.

By the use of a pair of supply reels 480 and 481 and a pair of take-up reels 506 and 507, but little time is required of the operator to condition the machine for operation when one of the supply reels becomes exhausted. To illustrate, let it be assumed that the paper 508 is being wound onto the reel 506 from the reel 480 and that the reel 481 carries a full supply to be wound onto the reel 507 when the reel 480 becomes depleted. When the operator observes, under such conditions, that the reel 480 is about to become exhausted, the paper is severed at a point in proximity to the reel 506 and attached to the reel 507, whereupon the outer end of the paper carried by the reel 481 is attached, as by adhesion, to the straight-away length of paper issuing from the reel 480, which straight-away length is then severed at a point intermediate the reel 480 and its point of connection with the new supply, so that the paper translating operation may be continued as between the supply reel 481 and the take-up reel 507, thus permitting an operator, at his or her convenience, to remove the exhausted reel 480 and the filled reel 506 and substitute for these reels, respectively, a new supply reel and a new take-up reel.

*Reset mechanism*

Upon completion of each line typing operation in making a preliminary copy, or in making a justified copy, with the aid of either the justifying unit B or the justifying unit C and in the manner hereinafter more particularly described, it becomes necessary to condition or reset certain mechanisms of the machine preparatory to initiating the next line typing operation, and to this end there is provided a reset shaft 525 which is journalled in bearings 526, as shown in Figs. 1 and 53. This shaft 525 is held in a normal position by a tension spring 527, one end of which is attached, as shown in Fig. 53, to the base of the machine and the other end of which is attached to an arm 528 secured to the shaft. Splined to the shaft 525, is an operating handle 530, the hub portion of which is confined intermediate the forked end 531 of an arm 532, which is secured to the rack 154 and adapted for movement therewith, the forked end of the arm being slidable on the shaft 525. Disposed beneath the base of the machine, is a normally open switch 534, having an actuating lever 535, with which is adapted to cooperate a depending arm 536, secured to the shaft 525 which is normally positioned to hold the switch arm 535 in open-circuit position. Secured to the shaft 525, is a spur gear 537, meshing with a similar gear 538, secured to a shaft 540, which is journalled at one end in one of the bearings 526 and at its other end in a bearing 541, adjacent to which the shaft 540 is provided with an actuating arm 542, adapted to cooperate with one arm 544 of a bell-crank lever 545 which is pivotally supported as at 546, the other arm 547 of the bell crank lever 545 being adapted to engage a disc 548, secured to the shaft 412 of the motor 414, by which the counter 388 is adapted to be reset when the circuit of that motor is closed through the switch 534 and when the shaft 412 is moved to the right as viewed in Fig. 53 by the thrust of the bell-crank lever arm 547 on a reset disc 548 carried by that shaft. Secured to the end of the shaft 525, is an arm 550, to which, as shown in Fig. 51, is connected a link 551, pivotally connected to an arm 552, secured to the shaft 325 hereinbefore described as carrying a latch 324 by which the released key 320 is held in a depressed condition. The arm 550 is also pivotally connected to a link 554, which in turn is pivotally connected to an arm 555, secured to a shaft 556, which is journalled in the bearings 330 hereinbefore mentioned. As shown in Fig. 33, the shaft 556 is secured to a release arm 557, the upper end of which is provided with a pin 558, disposed within an elongated opening 560, provided in the link 335, hereinbefore described. To the shaft 556 is also secured an arm 561 which, as shown particularly in Fig. 37, carries at its upper end a release rod 562, overlying the depending ends of the pawls 311 and 315 associated with the ratchet wheel 312, and the pawls 434 and 440 associated with the ratchet wheel 435. As shown most clearly in Figs. 21 and 51, the link 554 extends beyond its point of connection with the arm 555 of the shaft 556 and is pivotally connected as shown at 564, to the arm 151 hereinbefore described as associated with the shaft 148 to which, as shown in Fig. 40, is connected the cam-actuating element 147.

From the foregoing description, it will be understood that upon the completion of a line typing operation, the handle 530 is moved in a clockwise direction as viewed in Fig. 54, with the result that the switch 534 is closed, thereby closing the circuit of the motor 414 so that it may be utilized, as its shaft 412 is shifted to the right as viewed in Fig. 53, to return the missing space counter 388 to its initial setting. The switch 534 is also employed at that time to close the circuit of, and thereby energize the motor 277, Fig. 21, whereby the printing dial 256, Fig. 28, is returned to its initial position. It is to be noted, in this connection, as will be appreciated from Fig. 33, that the motor 277 is free to so operate as to return the printing dial 256 to its initial position the instant the pawl 300 is released from driving engagement with its associated ratchet wheel 292. The pawl 300 is released from driving engagement with the ratchet wheel 292 as the reset shaft 525 is rotated in a clockwise direction, as viewed in Fig. 58, due to the fact that, under such conditions, the shaft 556, which is operatively connected to the reset shaft 525 by the link 554, is rotated in a clockwise direction as viewed in Fig. 33, it being understood that such rotation of the shaft 556 will, as hereinbefore explained, cause the release arm 340 to move into pawl-releasing engagement with the trip arm 301. The switch 534 is also employed on the reset operation of the handle 530 to close the circuit of, and thereby energize the motor 455, shown in Figs. 1 and 20, whereupon the shaft 456 of that motor is moved in a clockwise direction, as viewed in Fig. 33, to move the actuating link 462 and thereby rotate the feed roller 106 a distance corresponding to the position of the stop wheel 468, which determines the extent of line spacing movement of the roller 106.

Incident to energization of the motors 414, 277 and 455, all of which are of the "stall" type, the pawls 311 and 315 associated with the ratchet wheel 312, and the pawls 434 and 440 associated with the ratchet wheel 435 (Fig. 37) are moved out of engagement with the ratchet wheels 312 and 435, respectively, with the result that the spring 314, Fig. 21, is permitted to so move its associated shaft 291 as to return the printing dial 282 to its initial position and with the result that the spring 438, Fig. 21, is permitted to so move its associated shaft 436 as to return the word-space counter to its initial position. It will be understood that the pawls 311 and 315 and 434 and 440 are moved out of engagement with their associated ratchet wheels 312 and 435 by reason of the fact that the shaft 556 (Fig. 37), which is operatively connected to the shaft 525 by the link 554, is rotated in such a direction, as the operating handle 530 is moved in a clockwise direction as viewed in Fig. 54, as to move the release rod 562, carried by the arm 561, into pawl-releasing position.

Simultaneously, or substantially simultaneously, with the release of the pawls 311—315 and 434—440 from their respectively associated ratchet wheels 312 and 435, the driving connection between the shafts 131 and 134, Fig. 40, is severed. Such interruption of the driving connection between these shafts is accomplished by reason of the fact that as the link 554 is moved to rotate the shaft 556 in a clockwise direction, as viewed in Fig. 37, the shaft 148 which is connected to that link by way of the arm 151 is rotated in a counterclockwise direction as viewed in Fig. 40, thereby moving the cone-like cam 144 over the face of the roller 142, carried by the arm 140, and thus causing that arm to so move together with its associated shaft 136 as to release the pawl 138 from driving engagement with its associated ratchet wheel 132, which is carried by the shaft 131. It will be appreciated that re-conditioning or re-setting of the mechanisms in the manner hereinbefore described takes place expeditiously upon rotating the handle 530 in a clockwise direction as viewed in Fig. 54, this allowing ample time for the resetting operations to be carried out before the paper carriage is returned to its original or starting position, it being understood that the handle 530 may be employed to facilitate return movement of the carriage inasmuch as it is confined, as shown in Fig. 51, intermediate the yokelike end of the bracket 531, secured to the rack 154, which yoke-like end of the bracket 531, as hereinbefore explained, embraces the shaft 525 to which the handle 530 is splined. It will also be understood that so long as the handle 530 is maintained in resetting position, which is to the right of its position shown in Fig. 54, unobstructed return movement of the carriage is permitted inasmuch as the shafts 131 and 134 are then maintained out of operative connection with each other. Upon release of the handle 530, the shaft 525 is returned to its normal position, as shown in Fig. 54, under the influence of its associated spring 527, with the result that the circuits of the motors 414, 277 and 455 are opened, and with the further result that the shafts 131 and 134 are operatively connected to each other preparatory to the carrying out of the next line typing operation.

JUSTIFYING UNIT B

From the description of the invention thus far, it will be understood that a draft copy may be made initially, and that upon the completion of each line typing operation, the operator is advised, in terms of 1/18 em, as to the extent of justification required with respect to a given column-width. This information is utilized when it is desired to effect justification by adding an increment to each character movement and to each word-space movement of the carriage by the justifying unit B, which includes means for setting or adjusting the connector element 165, Figs. 39, 43 and 46, at the beginning of each line typing operation according to the extent of justification required for each line, the connector element 165 being shown for example in Figs. 1 and 39 in a normal position of adjustment, that is to say in a position such that the carriage is translated a normal distance for a given movement of the arm 162, as when the typing operation is being carried out to determine the extent of justification required with respect to a definite column-width. The adjusting means for the connector element 165 comprises a rack 565, secured, as shown in Figs. 39 and 43, to the base of the machine and adapted to cooperate with a spur gear 566, secured to a shaft 567, journalled in a bracket 568, secured to a side wall of the trough-like guide 171, within which the connector element 165 is adapted to be moved longitudinally to advance the carriage during the typing operation. Secured to the base of the machine in proximity to the rack 565, is a bracket 570, within which is journalled a hub 571, to which is splined a shaft 572, provided at one end with a worm 574, meshing with a worm gear 575, carried by the shaft 567, the shaft 572 being held against longitudinal movement with relation to the bracket 568 within which it is journalled and adapted for sliding movement within the hub 571 to which it is splined. Carried by the hub 571 is a spur gear 576, meshing with a similar gear 577, carried by a shaft 578, journalled in the upper end of the bracket 570 and adapted for the reception of any one of a plurality of graduated dials, one of which is shown in Figs. 1, 39 and 43 and is there indicated by the numeral 580, the dials being graduated, for reasons hereinafter more apparent, in terms of 1/18 em, and according to the column-width, measured in terms of 1/18 em, with respect to which line justification is to be carried out and being adapted to cooperate with a suitably supported index bearing element 581, by which accuracy may be promoted when setting the dial according to the extent of justification required.

From the foregoing, it will be understood that when the dial 580 is rotated, for example from its zero position shown in Fig. 39 in the direction of the arrow shown thereon, the trough-like guide 171, within which the connector element 165 is mounted for longitudinal movement, will be moved toward the front of the machine from its neutral or zero position shown in Fig. 39, thereby increasing the length of the fulcrum between the pivotal connection of the lever 162 with the base of the machine and the pivotal connection of that lever with the connector element 165, the connector element being permitted to move transversely of the carriage 95 due to the space afforded between the arms 167, which support the pin 168 for slidable connection with the lug 170 attached to the carriage 95.

Operation of the justifying unit B

In describing the operation of the justifying unit B, it will be assumed, for example, that the column-width with respect to which line justification is to be effected is equal to 828 1/18 em, and that the typing operation is to be carried out for example with 6-point type. Under the foregoing assumed conditions, care is exercised to see that the ratio between the gears 127 and 130 is of a proper value with respect to the afore-mentioned size of type—it being noted, as hereinbefore pointed out, that these gears are readily removable to permit substitutions when changing from one size type to another—to obtain the proper gear ratios; and care is also exercised to see that there is employed a dial 580 appropriate to the column-width with respect to which justification is to be effected, as for example a column-width of 828 1/18 em. With the proper gears 127 and 130 in position and with the proper dial 580 provided, line justification may be effected with ease and precision in carrying out each line typing operation with respect to which the extent of justification has been determined, as for example, by either the printing dial 256 or the missing space counter 388 in terms of 1/18 em. To that end, the operator before beginning a line typing operation sets the dial 580 to a position corresponding to the extent of justification required for that line, it being noted that when the dial 580 is so set the carriage is moved, for each character key operation and each spacing bar operation a distance equal to its normal extent of movement plus an increment, the total summation of which increments equals, upon the completion of the line typing operation, the extent of justification required. In the foregoing example, where the column-width is 828 1/18 em and the extent of justification required for a given line with relation to that column-width is 28 1/18 em, a fractional part of that missing space value is added to each movement of the carriage, the summation of which fractional parts equals, upon the completion of the line typing operation, 28 1/18 em.

In further describing the operation of the justifying unit B, it will be assumed, for example, that it is desired to change from 6-point type to 12-point type, but that the column-width with respect to which justification is to be effected is to remain equal to 828 1/18 em. To make the desired type change, it is necessary to remove from the shuttle support the 6-point type shuttle and substitute a 12-point type shuttle. To facilitate the removal of one shuttle, preparatory to the substitution of another, there is provided a shuttle release key lever 582, appearing in Figs. 20 and 22 and which, as shown in the latter, is pivotally supported intermediate its ends, as at 583. The rear end of this lever is pivotally and slidably connected, as shown at 584, to an arm 585 secured to a hub 586, mounted for limited rotation on the shaft 55. The hub 586 is provided internally with a recess 587, adapted to accommodate a driving lug 588, provided on the shaft 55 and cooperating with an abutment 590, formed internally of the hub adjacent the recess thereof, the recess being adapted to permit rotation of the shaft 55 under the influence of the hereinbefore described levers 42, 44, 317 and 318 without disturbing the normal position, shown in Fig. 22, of the shuttle release key lever. It will be appreciated that when the key lever 582 is depressed, the shaft 55 will be rotated in a counter clockwise direction, as viewed in Fig. 22, with the result that the shuttle support 12 is elevated by the cams 80 a sufficient distance, as determined by a stop lug 591 positioned in the path of movement of the key lever, to free the shuttle lug 16 from the vertically disposed pin 24 carried by the shuttle actuating arm 25. Upon release of the lug 16 from the pin 24, the shuttle may be so moved on its support 12 as to permit the enlarged end of that lug to pass through the enlarged end 22, Fig. 2, of the slot 15 which normally accommodates the shuttle lug for movement in one direction or the other according to the movement of the shuttle during the typing operation. It will be understood, of course, that the substitute shuttle may be readily mounted on the shuttle support, while that support is in its elevated position, and so positioned thereon that, as the support is lowered by gradually releasing the key 582, an operative connection is established between the shuttle lug 16 and the vertically disposed pin 24 carried by the shuttle actuating arm 25.

In order to facilitate return movement of the shuttle support 12 to its normal position upon releasing the key 582, there is provided a compression spring 592, which, as shown in Fig. 27, is carried by a guide rod 594, supported at its opposite ends in the outwardly extending arms 595 and 596 of a bracket 597, pivotally connected intermediate its ends to the upper end of a suitable support 598. The spring 592 is confined intermediate the arm 595 of the bracket 597 and the outer end of an arm 600 secured to the shaft 55, the arm 600 being slidable on the rod 594. It will be understood from the foregoing that when the key lever 582 is depressed, the arm 600, moving in a counter clockwise direction as viewed in Fig. 27, will compress the spring 592 as the bracket 597 moves in a counterclockwise direction about its pivotal connection with its support 598, the spring 592 being utilized to insure return of the shuttle support 12 to its normal position. It is to be herein noted that the spring 592 also serves to insure return of the shuttle support to its normal position upon release of the key levers 42 and 44, hereinbefore described as operable to so elevate the shuttle support as to respectively position the row of capitals 20 and the row of figures 21 for cooperation with the striking hammer 82 in the typing operation. Associated with the rod 594, is a second spring 601, which is confined intermediate the arm 596 of the bracket 597 and the arm 600 carried by the shaft 55, the spring 601 being utilized to insure return movement of the shuttle support to its normal position when the arm 600 is moved in a counterclockwise direction in response to operation of the keys 317 and 318, hereinbefore described in connection with the mechanism employed to move the printing dials 256 and 282 into printing position.

Pursuant to making the shuttle change, in the manner above described, the change gears 127 and 130, previously used in carrying out the typing operation with 6-point type, are removed, and for them are substituted other gears having a proper gear ratio for use in connection with the 12-point type, namely, a ratio twice that of the change gears employed in carrying out the typing operation with 6-point type. In effecting justification when using 12-point type, where, as assumed, the column-width remains the same, namely, 828 1/18 em, no change of the dial 580 is required for the reason that the factor, namely, the column-width which determines the character of the dial to be employed remains the same as in the example where the use of 6-point type was assumed.

Aside from the foregoing assumed examples employed in the description of the operation of the justifying unit B, it may be well, for the sake of clarity to assume a further example, wherein the column-width is, say, 414 1/18 em, and wherein the typing operation is to be carried out with the same size type, namely, 12-point, employed in the second of the foregoing examples, it being noted that in the present instance the column-width of 414 1/18 em (23 em) is one-half, when measured in terms of em, the column-width of 828 1/18 em (46 em) employed in each of the foregoing examples. In the present instance the same size gears 127 and 130 are employed which were used in the second of the foregoing examples, inasmuch as the present illustration assumes that the typing operation is to be carried out with the same size type, measured in points, as were assumed in the second illustration. Due, however, to the fact that the column-width in the present instance differs from the column-width previously assumed, it becomes necessary to substitute for the previously employed dial 580 another of such dials which is graduated according to the column-width, 414 1/18 em, in order to effect the desired justification betwen a given line of subject-matter and that column-width.

Although only three definite examples are herein assumed for the purpose of illustration, it will be understood that the machine may be conditioned for use in the justifying operation regardless of the size, measured in points, of type to be used in producing justified copy, and regardless of the column-width, measured in terms of em, by the use of a proper gear ratio, corresponding to the desired type measured in points, between the change gears 127 and 130 and by the use of a proper dial 580, corresponding to the desired column-width. It will be understood, of course, that the gear ratio between the change gears 127 and 130 bears no relation to the column-width, inasmuch as these gears are depended on to effect movement of the carriage in accordance with the size, measured in points, of the particular type employed in the justifying operation. For example, if 6-point type is to be employed, the gear ratio between the change gears is of necessity one-half the gear ratio required when 12-point type is employed in the justifying operation. It will also be understood that the dial 580 bears no relation to the size, measured in points, of type employed in the justifying operation, but that it does bear a definite relation to the column-width, measured in terms of em, with respect to which justification is desired. For example, if the dial is provided with 72 graduations, each representing 1/18 em, such graduations will be spread out over a definite arcuate length on a given size dial where the column-width is 828 1/18 em (46 em), whereas if the column-width is 414 1/18 em (23 em), the 72 graduations, each representing 1/18 em, will be spread out over a greater arcuate length on the same size dial. The reason for the greater arcuate length over which the graduations extend on the dial employed in connection with the column-width of 414 1/18 em (23 em), will be readily understood when it is taken into account that where the missing space is equal, for example, to 4 em, that value represents a greater proportion of the column-width, 23 em, than is represented by the relation of that missing space to a column-width of 46 em, with the consequence that the compensating movement of the carriage, in terms of em, must be greater with relation to the column-width of 23 em than the compensating movement, in terms of em, with relation to the column-width of 46 em. That greater compensating movement is effected, under the conditions just named, by reason of the fact that when the dial 580 is set to compensate for a 4 em missing space in a column-width of 23 em, the connector element 165 is positioned closer to the front of the machine than when the dial is set to compensate for a missing space of 4 em in a column-width of 46 em, such difference in the positions of the connector element 165 being accounted for by reason of the fact that the 72 graduations on the dial employed in the first instance are spaced farther apart than are the 72 graduations on the dial employed in the second instance. As to the number of graduations, namely, 72, just mentioned by way of example, it may be well to point out that any number of graduations may be employed, so long as each represents ⅛ em, but it is believed that 72 such graduations are ample, inasmuch as they represent missing spaces to the value of 4 em, it being observed that the extent of justification required as between a given line and a definite column-width is unlikely under any conditions to exceed a value equal to 4 em.

It is to be noted that the dials 580 are graduated in opposite directions from the zero point, thus making possible justification with the unit B by either adding increments to the character and word-spaces, as when a given line of subject-matter falls short of the column-width, or by subtracting from the character movements and the word-space movements of the carriage fractional portions thereof, as when a given line of subject-matter overruns the column-width; it being understood that when justification is to be effected by subtraction, the dial is set at the minus side of the zero point according to the extent of negative justification required or, in other words, according to the extent to which the line of subject-matter to be justified exceeds the column-width with respect to which justification is to be effected.

JUSTIFYING UNIT C

When it is desired to effect justification of a given line of subject-matter with respect to a given column-width by adding an increment to each word-space, the information derived from the printing dials 256 and 282 or by the missing-space counter 388 and the word-space counter 390, at the time of making the draft copy, is utilized by the justifying unit C. Inasmuch as the justifying unit C is operable to effect justification by adding an increment to each word-space only, it becomes necessary to so control that unit that it will respond in its operation to each space bar operation to the exclusion of all character key operations, and to that end there is provided a control shaft 602 which, as shown in Fig. 20, is disposed in alignment with the main shaft 115, hereinbefore described. This shaft 602 is journalled in suitable bearings 604 and 605, Figs. 1 and 20, and is, at its end adjacent the bearing 605, secured by a pin 606 to the hub 196, Figs. 20 and 20A, to which the side arm 185 of the space bar 184 is connected as shown in Fig. 27. Inasmuch as the hub 196 is secured to the shaft 602, and is, therefore, adequately supported, it is adapted to serve in itself, when the main shaft 115 is rotated in response to character key operation, as a bearing for the main shaft at a point remote to the main shaft bearing 116, Fig. 21, whereas, when the shaft 115 is rotated in response to a spacing bar operation, the bearing 605 serves, in effect, as a journal for the shaft 115 at a point remote to the bearing 116 since these shafts then rotate in unison. To the end of the shaft 602, there is connected a segmental gear 607, Fig. 8, which is adapted to cooperate with a similar gear 608, carried at one end of a rocker arm 610, pivotally connected, as at 611, to a supporting bracket 612 and pivotally connected at its other end, as shown at 614, to a vertically movable actuating arm 615. This actuating arm is pivotally and slidably connected, as shown at 616, to the supporting bracket 612 and is provided intermediate its ends with a contact lug 617, adapted to cooperate, in a manner hereinafter more particularly described, with the outer end of any predetermined one of 18 differential levers, 618 to 635 inclusive. These differential levers are pivotally supported intermediate their ends, as at 636, on a lever translating carriage 637 mounted on the T-piece 638 of a carriage support 640, which T-piece serves as a guide or track for the carriage, which is held against removal by a pair of shims 641, secured to the carriage and overlying the lower outer margins of the T-piece. The carriage 637 is adapted to be moved from its normal position, shown in Fig. 5, to any one of 18 positions, corresponding to the levers 618 to 635 inclusive, under the influence of a spring actuated drum 642, carrying a suitable tape 644, which is connected to the carriage, as at 645, and is accommodated in a longitudinal groove 646, formed in the T-piece 638. Pivotally supported, as at 647, are a plurality of stop levers 648 to 665 inclusive, which correspond in number to the number of differential levers 618 to 635 inclusive, and which carry at their upturned ends keys bearing indicia 1 to 18 inclusive. Disposed beneath these keys, is a release bar 667, which is held in its normal position by a pair of compression springs 668, carried by guide rods 670, secured to the release bar and adapted for vertical movement within guide openings 671, formed in the base of the machine, the springs 668 being confined intermediate that base and a pair of abutments 672 carried by the guide rods. One end of the release bar 667 carries an upwardly extending arm 674, which is pivotally and slidably connected, as at 675, to a latch 676, pivotally supported, as at 677, by a stationary arm 678, the latch 676 being normally held by the compression spring 608 in latching engagement with a lug 680 provided on the carriage 637.

It is apparent from the foregoing that when any one of the stop levers 648 to 665 inclusive is depressed, the release bar 667 will be correspondingly moved, with the result that the latch 676 will be swung about its pivotal connection in a clockwise direction, as viewed in Fig. 5, to release the carriage 637, so that it may be moved to a definite position under the influence of the spring drum 642. The position to which the carriage is moved is determined by one of a plurality of stop lugs 681, carried by the respective stop levers 648 to 665 inclusive, which lugs are adapted to be projected upwardly through a plurality of openings 682, provided in the T-piece 638 in the path of travel of the carriage 637 and in an offset relation to the carriage actuating tape 644, as shown most clearly in Fig. 6. From the foregoing, it will be apparent that if the stop lever 654, bearing the numeral 7 on its key, is depressed, its corresponding stop lug 681 will be projected into the path of travel of the carriage 637, with the result that that carriage will be brought to rest in such a position that the differential lever 624, corresponding to the stop lever 654 will be positioned directly beneath the contact lug 617 carried by the actuating arm 615.

In order to insure the carriage 637 against undue movement under the influence of the spring drum 642 after it has moved into a predetermined position in response to the operation of one of the stop levers as described, means are provided for latching the selected lever in its depressed position. This latching means includes a horizontally disposed latch bar 684, which is pivotally supported as at 685 and is of sufficient length to accommodate all of a plurality of latch lugs 686, carried by the stop levers 648 to 665 inclusive and disposed in alignment parallel to the latch bar with which they are adapted to cooperate. The latch bar 684 is normally held in its position, shown in Fig. 5, by a compression spring 689, confined intermediate the base of the machine and the outer end of an arm 688 connected to the latch lever at one end thereof, the movement of the latch lever in a clockwise direction past its normal position being prevented by a stop lug 690, carried thereby and adapted to abut an adjacent area of the base of the machine or other suitable fixed stop. Journalled in a bearing support 691, Fig. 5, and in the bearing 605, Figs. 1 and 20, is a ratchet drive shaft 692, which at its left-hand end is provided, as shown in Figs. 1 and 20, with a spur gear 694. Splined to the shaft 692 and slidable longitudinally thereon, are a plurality of ratchet wheels 695 to 712 inclusive, corresponding to the differential levers 618 to 635 inclusive and to the stop levers 648 to 665 inclusive. These ratchet wheels 695 to 712 inclusive are held in a grouped relation for longitudinal movement on the shaft 692, by reason of the fact that they are confined intermediate a pair of arms 714, carried by the carriage 637, which is mounted for horizontal movement on the T-piece 638 of the carriage support 640, it being noted that the arms 714 embrace the ratchet shaft 692 on which the ratchet wheels are splined. Mounted for rotation on the shaft 692 adjacent the ratchet wheels 695 to 712 inclusive, are a plurality of pawl-carrying arms 715 to 732 inclusive, to the outer ends of which are pivotally connected spring tension pawls 734, adapted to cooperate with the teeth 735 provided on the periphery of the respective ratchet wheels. The pawls 734 are provided with tail pieces 736, which, as the arms 715 to 732 inclusive are returned to their normal position shown in Fig. 8, under the influence of return springs 737, supported by the carriage 637 in a cooperative relation to the respective differential levers 618 to 635 inclusive, are adapted to engage and move over the inclined surface of a longitudinally extending release cam 738, which is supported by the arms 714 of the carriage 637 for movement therewith, it being understood that as any one of the tail pieces 736 rides over the cam 738 its associated pawl 734 will be disengaged from its corresponding ratchet wheel. Such disengagement, however, does not in itself permit return movement of the shaft 692 inasmuch as there is associated with each of the ratchet wheels 695 to 712 inclusive a holding pawl 740, carried by a horizontally disposed shaft 741, which extends through and is journalled in the arms 714 of the carriage 637 and which is held against longitudinal movement by reason of its connection with the bearing support 691, the shaft being connected, by means hereinafter more particularly described, to the reset shaft 525 so that the holding pawls 740 may be moved out of engagement with their associated ratchet wheels against the influence of the pawl-actuating springs 747, which are carried by a spring support 748, extending longitudinally of the shaft 741 and connected to the arm 714 of the carriage 637.

Referring particularly to the ratchet wheels 695 to 712 inclusive, it is to be noted that although they are similar to each other, their respective numbers of teeth vary and that the throw of their respectively associated pawl-carrying arms 715 to 732 inclusive, which are pivotally and slidably connected, as shown at 750, to the differential levers 618 to 635 inclusive, is so determined by the fulcrum lengths of those differential levers that the number of lever actuations required to move the shaft 692 a predetermined distance corresponds to the indicia provided on the keys of the stop levers 648 to 665 inclusive which correspond to the differential levers 618 to 635 inclusive. For example, one operation of the differential lever 618, associated with the ratchet wheel 695, is sufficient to move that ratchet wheel, together with its associated shaft 692 through 72 degrees, whereas 18 operations of the differential lever 635, associated with the ratchet wheel 712, are required to move that ratchet wheel and the shaft 692 through 72 degrees, it being noted, as will readily appear from Fig. 10, that the pawl-carrying arms 715 to 732 inclusive are required to move a slight distance before their respective pawls 734 move into driving engagement with the ratchet wheels, as will be readily understood when it is taken into account that a slight movement of the pawl-carrying arms is required to permit the tail pieces 736 of the pawls to disengage the pawl-releasing cam 738, shown in Fig. 8.

Before proceeding with the description of the subsidiary carriage actuating mechanism next to be described, it may be well to bear in mind that the number of operations of the shaft 692 for a given line of subject-matter is determined by the number of word-spaces contained in that line, as recorded by the printing dial 282 or as indicated by the word-space counter 390 upon completion of the initial line typing operation of the subject-matter to be justified by the addition of increments to the word-space carriage movements when employing the justifying unit C; and it may be well to further note that the number of operations of the shaft 692 during the typing operation of a given line is controlled by depressing whichever one of the stop levers 648 to 665 inclusive corresponds to the number of word-spaces in that line.

The means for effecting justifying movement of the subsidiary carriage 100 includes a control arm 751, shown in Figs. 13 and 19, the rear end of which, as shown in Fig. 16, is provided with a depending leg 752, carrying at its lower end a connector lug 754, provided with a lag screw 755, by which the control arm is pivotally connected to a carriage supported table 756, connected to the main carriage 95 for movement in a horizontal plane. The control arm 751 is adapted to be moved, by means hereinafter more particularly described, from its normal position shown in Figs. 13 and 20 to various positions of adjustment, one of which is shown in Fig. 19. Supported by the table 756 for movement transversely of the machine is a sliding connector member 757, which is adapted to move within a channel 758, formed in the table 756, the connector member being retained within that channel by suitable shims 760, carried by the table and overlying the margins of the connector member. The sliding connector member 757 is provided at one of its margins with an upstanding flange 761, carrying a horizontally disposed wing 762, having provided therein an elongated opening 764, which registers with a similar opening 765, formed in the connector member 757, as shown most clearly in Fig. 18. These openings are adapted to slidably and pivotally receive a pair of aligned trunnions 766, carried by a sleeve 767, slidably mounted on the control arm 751, the trunnions being adapted to traverse a pair of aligned elongated slots 768, formed in a pair of connector wings 770 which are disposed intermediate the connector member 757 and the wing 762 associated therewith and are carried by a horizontally disposed arm 771, which constitutes an extension of the base of the subsidiary carriage 100 hereinbefore described.

Carried by the connector member 757, is a rack 772, which is adapted to cooperate with a pinion 774, having a hub 775, journalled in and adapted to move with a bearing 776, carried by the table 756, the hub 775 being splined to a shaft 777, supported at one end in the bearing 56 as shown in Fig. 20, and at its other end in a bearing 778 mounted on the base of the machine. The shaft 777 is provided with a reset spring, not shown, carried within a suitable housing 780 adjacent the bearing 778, and is provided at its outer end with a gear 781, meshing with an intermediate gear 782, supported as at 784 and meshing with the gear 694 hereinbefore described as connected to the shaft 692, which is adapted to respond to operation of the differential levers 618 to 635 inclusive, hereinbefore described. The forward end of the control arm 751 is pivotally and slidably connected, as shown at 785, in Fig. 13, to a connector lug 786, carried by a screw-threaded follower 787, embracing a worm 788, splined to a horizontally disposed control shaft 790, the worm 788 being provided at one end with a groove 791, adapted to receive the yoke-like end 792 of an arm 794, carried by the table 756, the arm 794 being adapted to insure movement of the worm 788 longitudinally on the shaft 790 so as to maintain the control arm 751 in any given position of adjustment as the table 756 is translated in unison with the main carriage 95 to which that table is connected. The shaft 790 is supported at opposite ends in suitable bearings 795 mounted on the base of the machine, one of which is shown in Fig. 3 and the other of which is shown in Figs. 13, and 15, the shaft being provided at its right-hand end, as viewed in Figs. 1, 13, and 15, with a bevelled gear 796, meshing with a similar gear 797, carried by a vertical shaft 798, journalled in a bracket 800 fixed to the base of the machine. The upper end of the shaft 798 carries a pinion 801, meshing with a spur gear 802, carried by a shaft 804, Fig. 16, supported in a bracket 805, fixed to the base of the machine, the upper end of the shaft 804 being adapted for the reception of a plurality of removable dials, one of which is shown in Figs. 1, 16 and 20 and is there indicated by the numeral 806, there being provided adjacent the dial an index pointer 807, Fig. 20, by which correct dial settings may be facilitated in the justifying operation of the unit C.

From the foregoing, it will be understood that as the shaft 692 is rotated, under the influence of any one of the differential levers 618 to 635 inclusive, in a clockwise direction, as viewed in Fig. 10, the shaft 777, to which the gear 774 is splined, is rotated in the direction of the arrow shown thereon in Figs. 19 and 20, with the result that the connector member 757, is moved from its normal position shown in Fig. 13 toward the front of the machine. Moreover, it will be understood that the extent to which the connector member 757 is moved during all line typing operations, where justification is required, will be the same inasmuch as the extent of rotation of the shaft 692 is the same for all line typing operations, as hereinbefore explained. Thus, it will be apparent that the extent to which the subsidiary carriage 100 is moved with relation to the main carriage 95 during a line typing operation is dependent upon the angle to which the control arm 751 is adjusted with relation to its normal position, shown in Fig. 13, it being understood that as the connector member 757 is gradually advanced forwardly from its normal position in response to repeated space bar operation the trunnions 766, as they are moved along the control arm 751 in response to movement of the connector member 757 toward the front of the machine, will impart translatory movement to the subsidiary carriage in a direction at right angles to the movement of the connector member.

In a machine here shown as embodying the present invention the extent to which the connector member 757 is moved and the extent to which the control arm 751 may be adjusted are such that the subsidiary carriage 100 may be moved relatively to the main carriage a distance of one inch, it being understood, however, that such value has been arbitrarily selected and is mentioned primarily to facilitate one's appreciation of the factors necessitating the use of differently graduated dials 806 under varying conditions.

Inasmuch as the justifying unit C is employed for effecting justification by modifying each normal word-space movement of the carriage rather than each normal character-movement and each normal word-spacing movement of the carriage as in the case of the justifying unit B, the dial 806 is graduated according to the size of type, measured in points, to be employed in the justifying operation. To illustrate, let it be assumed that one typing operation is to be carried out with 12-point type and that another typing operation is to be carried out with 6-point type. In the first instance, a dial is employed which is provided at its peripheral margin with graduations equi-distantly spaced from each other and collectively representing the maximum movement of the subsidiary carriage 100 with relation to the main carriage 95, the distance between adjacent graduations representing a linear movement of the carriage equal to $\frac{1}{18}$ em based on 12-point type; whereas in the second instance a dial is employed which is provided at its peripheral margin with graduations equi-distantly spaced from each other and collectively representing the maximum movement of the subsidiary carriage 100 with relation to the main carriage 95, the distance between adjacent graduations, which is of course only one-half the distance between corresponding graduations of the dial in the first instance, representing a linear movement of the carriage equal to $\frac{1}{18}$ em based on 6-point type. From the foregoing, it will be appreciated that if the extent of justification required for a given line is, for example 28 $\frac{1}{18}$ em, as determined by the printing dial 256 or the missing-space counter 388 upon completion of the initial typing, the dial 806, when set at 28 preparatory to carrying out a line typing operation with 12-point type will give an angular adjustment of the control arm 751 twice as great as would be obtained by the corresponding setting of a dial graduated in accordance with 6-point type. It follows, therefore, that the extent of movement of the subsidiary carriage 100 in the justifying operation, when employing 12-point type, would be twice as great, in terms of linear measure, for any line of subject-matter as the extent of justifying movement of the subsidiary carriage when carrying out a line typing operation with 6-point type, despite the fact that the extent of movement of the subsidiary carriage in both instances would be the same in terms of ⅛ em. Although only two examples are herein given in illustrating the underlying principles necessitating different dials 806 for use with different size type, it is deemed unnecessary to elaborate further on the factors which determine the respective characteristics of the dial graduations other than to mention the fact that a dial properly graduated with respect to any given size type, measured in points, may be produced with accuracy when it is borne in mind that the arcuate extent of the graduations bears a definite relation to the linear justifying movement of the supplemental carriage and that such graduations are separated from each other a distance representing a linear movement of the supplemental carriage equal to ⅛ em based on a given size type measured in points.

When carrying out the line justifying operation with the use of the justifying unit C, it is of course necessary to recondition the machine for use pursuant to each line typing operation, and to that end the reset handle 530, employed in resetting the justifying unit B in the manner described, is utilized. Upon moving that handle in a clockwise direction as viewed in Fig. 54, the shaft 525 is similarly moved with the result that an auxiliary reset shaft 808 is rotated in the direction of the arrow shown in Fig. 53, the shaft 808 being operatively connected to the shaft 525 by a pair of spur gears 810 and 811, carried respectively by those shafts. The auxiliary reset shaft 808 is journalled at one end in a bearing 812, Fig. 53, and at its other end in a bearing 814, Fig. 55, and is provided adjacent the latter bearing with a depending arm 815, which is connected by a link 816 to a horizontally disposed release arm 817, pivotally connected to the base of the machine as at 818, the arm 817 being adapted to cooperate with a depending arm 820 carried by the shaft 741, whereby that shaft is rotated in a counterclockwise direction as viewed in Fig. 10 when the reset handle 530 is operated to return the carriage to its normal position. As the shaft 741 is thus actuated, its associated pawls 740 are released from holding engagement with the ratchet wheels 695 to 712 inclusive, thus permitting the ratchet wheels to be returned to their normal positions under the action of the return spring, not shown, which is associated with the shaft 777 and is confined within the drum or housing 780 shown in Fig. 1 and hereinbefore described. Coincident with the release of the pawls 740, the latch bar 684 is moved in a counterclockwise direction, as viewed in Fig. 5, by reason of the fact that it is connected to a release arm 821, carrying at its outer end a pin 822, positioned within an elongated slot 824, formed in a depending actuating link 825, pivotally connected at its upper end, as shown in Fig. 52, to an arm 826, secured to the auxiliary reset shaft 808, it being noted that the slot 824 is of sufficient length to permit the pin 822 to move such distance as is required when the latch bar 684 is cammed about its pivot point by any one of the latch lugs 686 carried by the stop levers 648 to 665 inclusive when conditioning the machine for a line typing operation. Upon release of the latch bar 684 from engagement with the latch lug 686 holding one of the stop levers 648 to 665 inclusive in controlling position, that lever is permitted to return to its normal position under the influence of the return springs 668 associated with the release bar 667, and the latch 676 is at the same time moved under the action of the spring 663 into latching position so as to engage the lugs 680 provided on the carriage 637. In order that the carriage 637 may be returned to its normal position, there is provided an electric motor 827, Figs. 2 and 56, to the shaft of which is connected a pinion 828, meshing with a rack 830 carried by a depending portion of the carriage. The circuit of this motor is under the control of the switch 534, hereinbefore described, with the result that when that switch is closed upon movement of the reset handle 530 in a clockwise direction, as viewed in Fig. 54, the motor becomes effective to return the carriage to its normal position, it being understood that the motor, like the motors 227, 414 and 455, is of the "stall" type, each of the motors being adapted to carry out their respective functions in a relatively short period, with the result that ample time is allowed for them to perform their respective operations before the reset handle 530 is returned to its normal position.

*Operation of justifying unit C*

In carrying out a line justifying operation by the aid of the justifying unit C, the machine is initially conditioned for operation by providing change-gears 127 and 130 of a proper ratio with relation to the size type, measured in points, to be employed (and by providing a dial 806 graduated in accordance with the size of type to be employed. With the connector element 165 set at its neutral or zero position, as shown in Figs. 1 and 39, which position may be determined by the dial 580, hereinbefore described, the dial 806 employed in connection with the justifying unit C is set preparatory to each line typing operation according to the extent of justification required for that line as previously determined by either the printing dial 256 or the missing space counter 388; and one of the stop levers 648 to 665 inclusive is depressed, the stop lever selected being in accordance with the number of word-spaces as determined by either the printing dial 282 or the word-space counter 390 at the time of initially typing the line of subject-matter to be justified by the justifying unit C. Upon depressing the selected stop lever, the carriage 637 is released and is moved under the action of its associated spring actuated tape 644 into engagement with the stop lug 682 moved into the path of travel of the carriage in response to the stop lever operation. Thus, one of the differential levers 618 to 635 inclusive, corresponding to the depressed stop lever is moved into a cooperative relation to the lug 617 carried by the actuating arm 615. As the space bar 184 is actuated, the shaft 602 is rotated, imparting motion to the arm 610 through the gear segments 607 and 608, the arm 610 serving, as hereinbefore described, to impart, through one of the differential levers 618 to 635 inclusive, rotation to the shaft 692. As the shaft 692 is rotated, the connector member 757 is moved in response to the rotation of the shaft 777, in a manner hereinbefore described, from its normal position shown in Fig. 13 toward the front of the machine, with the result that for each word-spacing movement of the connector member the subsidiary carriage 100 is moved relatively to the main carriage 95 a definite distance depending upon the angular position of the control arm 751, as determined by the setting of the dial 806 preparatory to the line typing operation, the movement of the subsidiary carriage, as effected by the justifying unit C, being additional to such movement as is imparted to it by reason of its being mounted on the main carriage 95, and the connection of said main carriage with the intermittently actuated shaft 134 by way of the pinion 152, its associated rack 154, the control arm 162 and its associated connector element 165. In the event it so happens that no justification is required for a given line of subject-matter, the carriage 637 is permitted to remain in its normal or retracted position in which case the differential levers 618 to 635 inclusive remain inactive, due to the fact that each of them is then positioned out of the path of travel of the contact lug 617 of the actuating arm 615, with the result that the space bar operations may be carried out without displacing the connector member 757 and consequently without effecting movement of the subsidiary carriage 100 relatively to the main carriage 95 regardless of what may then be the position of the dial 806. It is to be noted that inasmuch as the dial 806 is graduated in opposite directions from the zero point, as explained in connection with the dials 580, it is possible to not only effect justification by adding increments to each normal word-space movement of the carriage, as when a given line of subject-matter falls short of the column-width with respect to which justification is to be effected, but it is also possible to effect justification, as when a given line of subject-matter exceeds the column-width with which justification is to be effected, by subtracting from the normal word-space movement of the carriage fractional portions thereof, it being understood that when justification is to be effected by subtraction the dial 806 is set at the minus side of the zero point according to the extent of negative justification required, or, in other words, according to the extent to which the line of subject-matter to be justified exceeds the column-width with respect to which justification is to be effected. It is to be further noted that if the stop lever bearing numeral 1, and corresponding to the ratchet wheel 695, is employed, as when the line of subject-matter to be typed contains only one word space, the entire justification to which the dial 806 is set, and regardless of whether such justification is of a positive or a negative character, is effected in response to one space bar operation, whereas two space bar operations are required when stop lever No. 2 is employed, and so on up to 18 space bar operations, as when stop stop lever No. 18 corresponding to the ratchet wheel 712, is employed.

Upon completing each line typing operation, when employing the justifying unit C, the reset handle 530, which is employed to return the carriage to its starting position, is rotated in a clockwise direction, as viewed in Fig. 54, with the results, as previously described and here summarized, that the imprint-receiving material, such as paper supported by the carriage is advanced to receive the next line of subject-matter to be typed, that the printing dials 256 and 282 are returned to their normal positions, that the missing space counter 388 and the word-space counter 390 are reset, that the previously employed stop lever is returned to its normal position, that the connector member 757 is returned to its normal position, and that the carriage 637 is returned to and latched in its normal position, it being understood that when the reset handle 530 is released the switch 534 is operated to open the circuit to the motors 277, 414, 454 and 827 following such time as these motors have completed their respective functions in the resetting operation.

Although it has been pointed out that when the justifying unit C is being employed, the connector element 165 is maintained in a neutral or zero position of adjustment, as shown in Figure 39, with the result that all carriage movements effected by that element are then of a "normal" character, it should be noted that when the justifying unit B is being employed the connector member 757 is maintained in its neutral or zero position of adjustment, as determined by the dial 860 and as shown in Fig. 13, with the result that the subsidiary carriage is maintained stationary with relation to the main carriage 95 at all times.

STRIKING HAMMER LOCKOUT MECHANISM

Inasmuch as one of the primary purposes of the typewriter unit A is to enable one to determine the extent of justification required for a given line of subject matter and/or the number of word-spaces contained in that line, and inasmuch as there may be times when no need would exist for an initial copy, means are herein provided for rendering the striking hammer 82 inoperative without otherwise altering the typing operation. To that end there is provided, as shown in Figs. 57 and 58, a hammer lockout key lever 831, which may be placed at a convenient location with respect to the typewriter keyboard and which is adapted to be held in a depressed position, against the influence of a return spring 832, by a latch 834, pivotally connected to the lever and adapted to assume locking engagement with a fixed latch member 835, suitably supported on the base of the machine. The lever 831 is connected to a shaft 836, which is journalled, as at 837, and is provided with an arm 838, the upturned end of which is pivotally and slidably connected, as shown at 840, to a lever 841, pivotally supported, as at 842, and carrying a restraining arm 844, which, when the lever 831 is depressed, is adapted to move into locking position beneath the reset lug 91 of a striking hammer 82, which, except for the hammer lockout feature associated therewith, is the same as the striking hammer hereinbefore described. From the foregoing, it will be understood that the hammer 82, even if its associated holding pawl 86 is disengaged therefrom, cannot be moved out of its normal or retracted position so long as the key 831 is maintained in a depressed position; and it will be further understood that under such conditions the typing operation may be carried out for the purpose of determining the extent of justification required of a given line of subject matter and the number of word spaces contained therein without producing character-imprints.

MODIFIED MEANS FOR EFFECTING DIFFERENTIAL MOVEMENT OF MAIN SHAFT

Instead of employing the particular actuating means herein described for imparting differential movement to the main shaft 115, any one of the modified forms of actuating means shown in Figs. 59 to 64 inclusive may be employed.

Referring to Fig. 59, it will be observed that each of the character keys 5a may be provided at its rear end with a cam block 845, which is slidably supported on the character key intermediate a pair of guides carried by that key, one of such guides being indicated by the numeral 846. Each of the cam blocks is held against undue displacement by a pin 847, carried thereby and adapted to operate within a pair of registering slots formed in the guides 846, one of which slots is herein shown and is indicated by the numeral 848. Normally, the cam block is held in a retracted position against a suitable stop 850 by a tension spring 851, one end of which is connected to the cam block and the other end of which is anchored to the character key. From the foregoing, it will be appreciated that when the character key is depressed, the cam block 845 will cooperate with the arm 208', carried by the driving hub 204', and will thus serve to rotate the shaft 115 in a counterclockwise direction a definite distance during that portion of the key movement which is required to establish contact between the inclined surface 852 of the cam block and either the lower case letter lug 225 or capital letter lug 226 or figure lug 227 carried by the abutment shaft 216, the shaft 216 being shown in the present instance so set as to present the lug 225 for engagement with the cam block 845. As the cam block 845 moves into engagement with the lug 225, it is moved from a position of engagement with the stop 850 toward the shaft 115, with the result that such shaft is then rotated not only in response to the upward movement of the cam block but also in response to the camming action that is then set up between its inclined surface 854 and the arm 208', carried by the driving hub 204' which is adapted to be returned to its normal position by a tension spring 855, one end of which may be suitably anchored to an appropriate part of the machine and the other end of which is connected to a return arm 856 carried by the driving hub.

Considering Fig. 60, it will be noted that each character key 5b may be provided at its rear end with a lever 857, disposed intermediate and pivotally connected, as shown at 858, to a pair of ears, carried by the character key and one of which is indicated by the numeral 860. It will be observed, in the present instance, that when the character key 5b is depressed, the lever 857, which engages the arm 208' of the driving hub 204', will serve to rotate the shaft 115 in a counterclockwise direction due to the fact that the lever 857 is caused, by reason of its engagement with the lug 225, to move in a clockwise direction about its point of pivotal connection with the character key.

Referring to Figs. 61 and 62, the character key 5c is relatively short in length as compared with the character keys hereinbefore described, and is adapted to cooperate at its rear end with a lever 861, carrying intermediate its ends a pair of lugs 862, mounted for pivotal and sliding movement within adjacent guide members 864 of a series of such members, which are adapted to be supported in a proper relation to the several character keys, as by a pair of bearing supports, within which the abutment shaft 216 is journalled, one of such supports being indicated by the numeral 865. Each of the levers 861 is adapted to cooperate with a lever 866, carried by a driving hub 204a substantially identical to each of the driving hubs 204 hereinbefore described. It is to be noted, however, that the hub 204a is so mounted on a shaft 867 as to drive that shaft in a clockwise direction. The shaft 867 may, of course, be journalled in the bearing support by which its companion shaft 868 is journalled, as will be readily understood when it is taken into account that the shaft 868 corresponds to the main shaft 115, hereinbefore described. Inasmuch as the shaft 868 corresponds to the main shaft 115, its direction of rotation shall be the same as the main shaft, and to that end the shafts 867 and 868 are operatively connected by a pair of spur gears 870 and 871 respectively carried thereby.

From the foregoing, it will be appreciated that when the character key 5c is depressed, the lever 861 will be moved into engagement with the lug 225 and arrested, whereupon the lever in response to further movement of the character key will be moved in a counterclockwise direction, thereby rotating the shaft 867 in a clockwise direction, as a result of which the shaft 868 corresponding to the main shaft 115 is rotated in a counterclockwise direction.

Considering Fig. 63, it will be noted that the character key lever 5d is adapted to engage, at its rear end, a lug 872, carried by a control shaft 874, which is adapted to be suitably journalled at its opposite ends, as for example in the bearing supports hereinbefore described for the main shaft 115, which, as shown in the present instance, is located directly above the control shaft 874. The shaft 874 is adapted to be moved longitudinally to one of three positions, as determined by a detent pin 875 radially supported with relation to the shaft 874, and adapted to cooperate with one of a plurality of grooves 876, 877 and 878 provided in one of the bearing ends of the control shaft, the notches being adapted, in cooperation with the detent pin 875, to facilitate longitudinal adjustment of the shaft to one of three positions without impeding rotation thereof. Each of the lugs 872 is stepped so as to provide lever-engaging shoulders 880, 881 and 882, corresponding respectively to the notches 876, 877 and 878. Pivotally supported in a fixed position, as at 884, is an actuating lever 885, the free end of which overlies its corresponding lug 872 provided on the control shaft 874.

From the foregoing, it will be understood that when the character key 5d is depressed the control shaft 874 will be rotated in a counterclockwise direction, with the result that the actuating lever 885 will be moved in a clockwise direction, thereby effecting, due to its engagement with the arm 208 of its associated driving hub 204, rotation of the main shaft 115 in a counterclockwise direction. The extent of rotation of the shaft 115 is dependent, of course, upon the position of the control shaft 874, as determined by the detent pin 875. For example, if the detent pin is positioned in the groove 878, as shown, the shoulder 882 will cooperate with the actuating lever 885 and impart to that lever a greater throw than if the control shaft 874 were otherwise positioned, it being noted that a change in position of the shaft 874 correspondingly changes the effective fulcrum length of the actuating lever 885, inasmuch as the shoulders 880, 881 and 882 engage that lever at different fulcrum lengths from its pivot point. Such change in effective fulcrum length of the actuating lever of necessity changes the extent of rotation of the shaft 115, as will be readily appreciated when it is taken into account that the extent of movement of the control shaft 874 is always the same regardless of its longitudinal position of adjustment.

MODIFICATIONS OF THE JUSTIFYING UNIT B

With the form of justifying unit B' shown in Fig. 67, it is unnecessary to provide a different set of change gears 127—130 for each size of type, and for that reason the shafts 120 and 131 may be permanently connected at all times by a pair of fixed gears, one of which is shown in association with the shaft 131 and is indicated by the numeral 886. In the present instance the connector element 165 is adjusted to a proper position, as determined by the size of type to be employed in the justifying operation and by the column-width with respect to which justification is to be effected. In order to facilitate such adjustments, a series of properly graduated dials are provided, one of which is indicated by the numeral 580'.

For the purpose of illustrating the principles underlying the connector element adjustments, let it be assumed (a) that justification is to be effected with respect to a column-width of 828 1/18 em when employing 12-point type, (b) that the dial 580', herein shown, is graduated according to that size type and that column-width, (c) that the extent of justification required for a given line is 28 1/18 em as determined by either the printing dial 256 or the missing space counter 388 at the time of making the initial copy, and (d) that the position in which the connector element 165 is shown represents the zero position of the dial as when no justification is required. Under such conditions, the dial 580', which bears graduations indicative of carriage movements measured in 1/18 em with respect to 12-point type is set in accordance with the extent of justification required, namely, 28 1/18 em. When so setting the dial 580', the connector element 165 is moved a sufficient distance forward, with respect to its position shown, to effect carriage justifying movement of 28 1/18 em during the line typing operation.

Although further examples are believed unnecessary to a complete understanding of the principle involved in effecting proper adjustments of the connector element 165 to meet various requirements, it may be well to point out the fact that in the event a smaller type, for example 6 point, is to be employed when the justifying operation is to be carried out with respect to the aforementioned column-width, the connector element will, of course, assume a position of adjustment at the rear of its position shown, whereas if a larger type, say, 18 point is to be employed, when the justifying operation is to be carried out with respect to that column-width, the connector element will obviously assume a position in front of its shown position.

It is to be noted that the dials 580', like the dials 580 hereinbefore described, are graduated in opposite directions from the zero point, thus making possible justification with the unit B' by either adding increments to the character and word-spaces, as when a given line of subject-matter falls short of the column-width, or by subtracting from the character movements and the word-space movements of the carriage fractional portions thereof, as when a given line of subject-matter overruns the column-width.

If the justifying unit B' is employed in lieu of the justifying unit B, and justification is to be effected by the justifying unit C, the dial 580', corresponding, of course, to the size of type employed, is set at its zero position, inasmuch as justification is effected when employing the unit C by adding increments to only the word-space movements of the carriage.

Referring to Figs. 68 and 69, wherein is shown another modified form of justifying unit B'', it will be noted that translatory movement is imparted to the main carriage 95 through the medium of a rack 887, connected directly thereto and meshing with a driving pinion 888, which is indirectly connected, through means hereinafter more particularly described, to a drive shaft 890, corresponding to the drive shaft 134, hereinbefore described. The pinion 888 is carried by a shaft 891, journalled in bearings 892, supported on the base of the machine, the shaft 891 being provided with a sheave 894, which is keyed to the shaft 891 for universal movement thereon, so that it may be moved at an angle to the axis of its associated shaft. To the sheave 894, is anchored a cable 895, which in turn is anchored to a similar sheave 896, keyed to and mounted for universal movement on a tubular shaft 897, splined to a transverse shaft 898, the tubular shaft being journalled in and held against longitudinal movement with respect to a bearing 900, carried by a movable carriage 901, whereas the shaft 898 is journalled at one end in and held against longitudinal movement by a bearing 902, supported by a carriage 904, which is movable at right angles to the carriage 901. The carriage 904 is slidably held on the base of the machine by a pair of shims 905, the movement of the carriage being parallel to the direction of movement of the rack 887. Mounted on the carriage 904, is a support 906, the T-piece 907 of which serves as a track on which the carriage 901 is held for movement in a direction at right angles to the path of movement of the carriage 904. Provided on the carriage 901, is a rack 908 which meshes with a pinion 910, carried by a shaft 911, journalled in a bearing 912, supported on the carriage 904 for movement therewith. To one end of the shaft 911, there is connected a bevel gear 914, meshing with a similar gear 915, loosely mounted on the shaft 898, but held against longitudinal movement thereon. Secured to the shaft 898, adjacent the gear 915, is a pinion 916, to which, under conditions hereinafter more particularly described, the bevel gear 915 is locked and unlocked by a detent pin 917 or other suitable means. Disposed beneath the pinion 916 and meshing therewith, is a rack 918, which is held for longitudinal movement by a pair of yoke-like guides 920 and which is maintained in driving engagement with a pinion 921, carried by a shaft 922, journalled in a bearing support 924, within which the shaft 890 is also journalled. Carried by the shaft 922 is a drive gear 925, meshing with an idler 926, supported on a stub shaft 927, carried by the bearing support 924, the idler being in mesh with a driving gear 928, secured to the drive shaft 890.

From the foregoing, it will be appreciated that when the shaft 890 is rotated through the change gears 127 and 130, hereinbefore described, during a typing operation, the shaft 898 will be rotated in the direction of the arrow shown thereon in Fig. 68 through the medium of the pinion 921, the rack 918, and the pinion 916 to which the gear 915 is locked by the detent pin 917. As the shaft 898 is rotated, the cable 895 will be wound onto the sheave 896 as it is unwound from the sheave 894, thereby imparting movement to the pinion 888 in a clockwise direction, as viewed in Fig. 69, thus causing the carriage 95 to move toward the left as viewed in Fig. 68. As the shaft 898 rotates, the shaft 911 is rotated in such a direction as to cause its associated pinion 910, meshing with the rack 908, to move the carriage 901 in the direction of the arrow A shown thereon. As the carriage 901 is thus displaced, the sheave 896 is carried with it, thereby augmenting such movement of the pinion 888 as is imparted to it by reason of the rotative movement of the sheave 896, it being noted that as the sheave 896 is displaced in accordance with the movement of the carriage 901 that sheave and the sheave 894 are permitted to assume corresponding angular relations to their respective shafts 898 and 891.

In order that the carriage 904 may be adjusted to various positions according to the extent of justification required for a definite column-width, there is provided a thumb wheel 930, carried by a shaft 931, mounted in a bearing 932, secured to the base of the machine, the shaft 931 being provided with a pinion 934, meshing with a rack 935, secured to the carriage 904. By turning the thumb wheel 930 in one direction or the other, the carriage 904 may be moved, assuming the pinion 916 to be disengaged from the bevel gear 915, either to the right or to the left as viewed in Fig. 68, it being noted that as the carriage 904 is adjusted in one direction or the other the cable 885 will be maintained taut, due to the fact that the pitch diameter of the pinion 916 is equal to the effective drum diameter of the sheave 896. Mounted on the carriage 904, is a fixed pointer 936, which is adapted to cooperate with a scale 937, which is graduated in opposite directions from its zero point which is shown in registration with the pointer. For the purpose of facilitating an explanation of the operation of the present justifying unit, it will be assumed that the scale is graduated according to a column-width of 828 ⅛ em, the graduations being spaced from each other a distance corresponding to ⅛ em, as hereinbefore explained in connection with the dial 580. It will, of course, be understood that the scale 937 is removably supported, as on one of the shims 905, so as to readily permit substitution of other scales, graduated according to column-widths other than the one herein mentioned by way of illustration.

From the foregoing, it will be understood that if a line of subject-matter to be typed in final form within a column-width of 828 ⅛ em requires no justification, the carriage 904 is so set that the pointer 936 registers with the zero mark on the scale 937. During the typing operation the carriage 95 will be moved as a result of rotation of the sheave 896 and as a result of movement of that sheave along the shaft 898 toward the rear of the machine, the extent of movement of the carriage 95 being equal to a column-width of 828 ⅛ em. If, however, the typing operation is to be carried out with respect to a line of subject-matter which falls short of the column-width by, say, 28 ⅛ em, the carriage 904 is moved to the left, as viewed in Fig. 68, to such a position that the pointer 936 will register with the graduation corresponding to 28 ⅛ em on the scale 937, it being noted that preparatory to making that adjustment the bevel gear 915 is unlocked from the pinion 916 so as to permit the sheave 896 to remain in its neutral position on the shaft 898, as shown in Fig. 68. Upon making the necessary adjustment of the carriage 904, the pinion 916 is locked to the gear 915, thus conditioning the unit for the justifying operation. As the justifying operation is carried out, the carriage 95 will be moved in response to rotation of the sheave 896 and in response to the longitudinal movement of that sheave on the shaft 898, but the total extend of movement of the carriage will be in excess of that which is effected when the pointer is set in its zero position, and the difference in extent of carriage movement will represent the extent of justification required. The differential in carriage movement just mentioned is readily accounted for when it is taken into account that when the carriage is adjusted from its zero position toward the left as shown in Fig. 8, the distance between the sheaves 894 and 896 is shortened, and consequently the longitudinal movement of the sheave 896 on the shaft 898 in the latter instance, although equal to the corresponding movement in the former instance, will effect a slightly greater extent of rotation of the sheave 894 and its associated pinion 888 than when no justification is required. From the foregoing description of the principle of operation of the justifying unit, it will be readily appreciated that where negative justifiction is required as, for example, when a line of subject-matter exceeds a definite column-width with respect to which justification is to be effected, the justifying unit may be conditioned to effect that justification by moving the carriage 904 to the right from its zero position, as viewed in Fig. 68, a sufficient distance to bring the pointer 936 into registration with the graduation representing the difference, in terms of ⅛ em, between the column-width and the line of subject-matter to be justified. As to the resetting of the mechanism just described, it will be understood that this is accomplished through the resetting mechanism, hereinbefore described, upon the operation of which the shaft 890 is disconnected from the shaft 131, thus permitting the carriage 95 to be returned to its normal position, the return movement of the carriage being utilized to rotate the sheave 896 to its normal position on the shaft 898 by reason of the driving connection between that shaft and the carriage 901, and to return the carriage 904 to its former position of adjustment preparatory to the making of such adjustment, if any, as is required for the next typing operation.

MODIFICATIONS OF JUSTIFYING UNIT C

In the form of justifying unit C' shown in Figs. 70 to 73, the stop levers indicated in a group by the numeral 938, which correspond to the stop levers 648 to 665 inclusive hereinbefore described, are pivotally suspended, as at 940, from the base of the machine, and are adapted to move their respective stop pins 681 upwardly through the base of the machine and into the path of travel of a cam carriage 941, mounted on the base for horizontal movement intermediate a pair of shims or guides 942, the carriage being provided with upstanding arms 944, which at their outer ends slidably embrace a horizontally disposed shaft 945 and between which are located a plurality of cams 946 to 963 inclusive, splined to that shaft and corresponding respectively to the stop levers 938 bearing identification numerals 1 to 18 inclusive indicative of possible word spaces. The shaft 945 is journalled in suitable bearings 964 and 965, and is provided at one of its ends with a bevel gear 966, meshing with a smiliar gear 967, carried by a shaft 968, journalled in the bearing 965 and adapted for the removable reception of a dial 806', corresponding to the dial 806, hereinbefore described in connection with the justifying unit C. The carriage 941 is held in its retracted position as shown by a latch 676', which is adapted to be released from a carriage-supported latch lug 680' when any one of the stop levers 938 is depressed, as will be readily understood when it is taken into account that the latch is connected by a link 674' to a release bar 667', which may be normally held in its position shown in Fig. 71 by a suitable spring or springs, not shown, such as those indicated by the numeral 668 and hereinbefore described. As will be observed, the stop levers 938 may be latched in their respective depressed positions by a spring tensioned latch bar 684', adapted to cooperate with the latch lug 686', carried by the respective stop levers, which latch bar may be connected to the auxiliary reset shaft 808 through suitable means such as are described in connection with the latch bar 684 of the justifying unit C so that any depressed stop lever may be released when resetting the unit for operation.

The means for moving the carriage 941 to a predetermined position, as determined by one of the stop lugs 681 when starting the typing operation, comprises a spring actuated drum 642', carrying a suitable tape 644', connected to the carriage, whereas the means for returning the carriage to its normal position in response to closing the switch 534, hereinbefore described, by the resetting mechanism, also hereinbefore described, includes an electric motor 672', the shaft of which is provided with a pinion 828', meshing with a rack 830' provided on that carriage. The present form of justifying unit C' is adapted to effect translatory movement of the subsidiary carriage 100 through the medium of a rack 970, secured to that carriage and meshing with a pinion 971, which is journalled on a bearing support 639 and which meshes with a gear 642, carried by a shaft 972, journalled at one end in the bearing support 699 and at its other end in a bearing 974. To the shaft 972 there is connected a ratchet wheel 975, with which a spring pressed holding pawl 976 is adapted to cooperate, the pawl being pivotally connected, as at 977, to the bearing 974, and carrying an arm 978, pivotally and slidably connected, as at 980, to a link 981, pivotally connected to an arm 982, secured to a shaft 984, which may, of course, be so connected to the reset shaft 808 as to release the holding pawl 978 in response to the resetting operation when the operating handle 530, hereinbefore described, is rotated in a clockwise direction as viewed in Fig. 54. Also secured to the shaft 972, is a driving disc 985, the peripheral margin of which is positioned intermediate a pair of spring pressed gripper plates 986, carried at one end of an actuating lever 987, which is pivotally supported, as at 988, and which is pivotally connected, as at 990, to a link 991, pivotally connected to an arm 992 carried by a hub 103, which is mounted on the control shaft 602 and with relation to which, under certain conditions as will hereinafter more clearly appear, that shaft is adapted to rotate. Secured to the shaft 602, is a driving collar 109 into driving engagement with which the hub is adapted to be moved by a compression spring 113 disposed intermediate that hub and a fixed abutment, such as a bearing support 119 for the shaft 602, the engaging faces of the hub 103 and the collar 109 being of such a nature as to insure an effective driving connection between the shaft and the hub when the hub is moved into intimate engagement with the driving collar under the action of the compression spring. The hub 103 is provided with a circumferential groove 123, adapted to accommodate a pair of pins 129, secured to a pair of yoke arms 133, carried by a release lever 139, which is pivotally connected, as at 143, to the bearing support 119, the lower end of the arm 139 being disposed in the path of a lug 149 on the carriage 941.

From the foregoing, it will be understood that so long as the carriage 941 is maintained in its retracted position, shown in Figs. 70 and 71, the hub 103 will be maintained out of engagement with the driving collar 109, thus permitting the shaft 602 to operate without displacing the actuating lever 987. When the carriage 941 is released from its retracted position, the lug 149 will so move with the carriage 941 as to permit the spring 113 to move the hub 103 into driving engagement with the collar 109 preparatory to a line typing operation, thereby conditioning the actuating lever 987 for operation in response to such space bar operations as are to be carried out during the line typing operation.

Pivotally supported at 988, is a release lever 994, which at one end is provided with a wedge 995, adapted, under certain conditions hereinafter more particularly described, to move the gripper plates 986 out of gripping engagement with the driving disc 985; and which under other conditions is adapted to permit such plates to be moved into gripping engagement with that disc. The lever 994 extends past the rear end of the lever 987 and is adapted there to engage one or another of the cams 946 to 963, according to the position of the carriage 941, as determined by one or another of the stop levers 938.

From the foregoing, it will be understood that when one of the levers 938 is depressed in accordance with the number of spaces contained in a given line of subject-matter to be typed, the carriage 941 will be released from its position shown, and will be moved under the action of the spring drum 642' to a position of engagement with one of the stop lugs 681 corresponding to the depressed lever, which is automatically locked in controlling position by the latch bar 684'. Thus it will be seen that one of the cams 946 to 963, corresponding to the depressed stop lever, will be positioned for cooperation with the lever 994. Assuming that the dial 806', which, as explained in connection with the dial 806, is graduated according to the size of type, measured in points, to be employed in the justifying operation, has been set according to the extent of justification required for the line of subject-matter about to be typed, the position of one of the cams 946 to 963, with which the lever 994 is to cooperate, will be such as to permit that lever to move only a definite distance in response to word-spacing operations of the shaft 602, the lever 994 thus serving, as will hereinafter more clearly appear, to determine the extent of movement of the driving disc 985 and consequently the extent of movement of the subsidiary carriage 100 with relation to the main carriage 95. Inasmuch as the gripper plates 986, which act under the influence of their associated compression springs 996, are in gripping engagement with the driving disc 985 at the beginning of the space bar operation of the shaft 602, the actuating lever 987, when moving in a clockwise direction, as viewed in Fig. 71, in response to the operation of the shaft 602, will rotate the driving disc in a counterclockwise direction. As the actuating lever 987 is thus moved, the gripper plates 986 will move into engagement with opposite side faces of the wedge 995, whereupon continued movement of the lever 987 will carry the release lever 994 with it until such time as the release lever engages the particular cam 946 to 963 with which it is to cooperate. Upon engagement of that cam by the lever 994, movement of that lever is halted, with the result that as the actuating lever 987 continues to move the wedge 995 will so coact with the gripper plates 986 as to move them out of gripping engagement with the driving disc 985, thus permitting the lever 987 to move in response to continued movement of the shaft 602 without imparting further rotation to the driving disc 985, the driving disc being held by the pawl 976 against the action of a return spring, not shown, which is associated with the shaft 972 and housed within the spring drum 997. Upon the return movement of the shaft 602, pursuant to completion of the space bar operation, the actuating lever 987 is moved toward its normal position, shown in Fig. 71, carrying with it the release lever 994 until such time as that lever engages a suitably supported stop 998, whereupon the release lever is halted, with the result that continued movement of the actuating lever moves the gripper plates 986 out of engagement with the wedge 995, thus permitting the springs 996 to urge such plates into gripping engagement with the driving disc 985 preparatory to the next word-spacing operation.

It is to be noted in the present instance that when the cam 946 corresponding to the stop lever 938 and bearing the numeral 1 is employed, the entire justification required is effected as a result of one space bar operation, whereas two space bar operations are required for cam 947 corresponding to No. 2 stop lever, and so on up to 18 space bar operations for the cam 963 corresponding to the stop lever No. 18. Moreover, it will be understood that the cams 946 to 963 are correspondingly positioned on the shaft 945, and that each cam is developed to so control the extent of effective movement of the actuating lever 987 during a line typing operation that a justifying movement of from 1/18 em to say 4 em, depending on the setting of the dial 806', can be imparted to the subsidiary carriage. In the event it so happens that no justification is required for a given line of subject-matter, the carriage 941 is permitted to remain in its normal or retracted position, in which case the actuating lever 987 remains inactive, due to the fact that the hub 103, by which the arm 992 is carried, is maintained out of engagement with the driving collar 109, with the result that space bar operations may be carried out without displacing the actuating lever 987, and, of course, without moving the subsidiary carriage 100 relatively to the main carriage 95.

In the form of justifying unit C" shown in Figs. 74 to 76, the differential levers 618 to 635 inclusive are supported in a fixed housing 1000, instead of in a carriage as described in connection with the justifying unit C, and the ratchet wheels 695 to 712 inclusive are held in a fixed relation to the shaft 692, instead of supported thereon for longitudinal movement as in the previously described justifying unit.

In the present instance the stop levers, which are indicated en group by the numeral 1001 and correspond to the stop levers 648 to 665 inclusive, are pivotally suspended, as at 1002, from the base of the machine and are adapted to move their respective stop pins 1004 upwardly and into the path of travel of a slide translating carriage 1005, mounted on the base of the machine for horizontal movement, the carriage being provided with a depending tongue 1006, operating within a slot 1007 and provided at its lower end with a T-piece 1008, by which the carriage is held against undue displacement. The carriage 1005 is held in its retracted position shown by a latch 676", which is adapted to be released from a carriage-supported latch lug 680" when any one of the levers 1001 is depressed, as will be readily understood when it is taken into account that the latch is connected by a link 674" to a release bar 667" which is held in its normal position by a tension spring 1010, connected at one end to the base of the machine and at its other end to the link 667". As will be observed, the stop levers 1001 may be latched in their respective positions by a spring tensioned latch bar 684", adapted to cooperate with the latch lugs 686" carried by the respective stop levers, which latch bar may be connected to the auxiliary reset shaft 808 through suitable means, such as are described in connection with the latch bar 684 of the justifying unit C, so that any depressed stop lever may be released when resetting the unit for operation. The means for moving the carriage 1005 to a predetermined position, as determined by any one of the stop lugs 1004 when starting the typing operation, comprises a spring actuated drum 642", carrying a suitable tape 644", connected to the carriage.

In the present form of justifying unit C", the carriage 1005 is manually returned to its normal position, and to that end the auxiliary reset shaft 808 is provided at one end with a segmental gear 1011, which meshes with a pinion 1012, secured to a shaft 1014 and journalled in bearings 1015, depending from the base of the machine. Also secured to the shaft 1014, is a bevel gear 1016, meshing with a similar gear 1017, which is journalled on a stub shaft 1018, suspended from the base of the machine and which is connected to a reset arm 1020, carrying at its outer end a pin 1021, which is accommodated by an arcuate slot 1022, formed in a segmental gear 1024, journalled on the stub shaft 1018. The segmental gear 1024 is maintained at all times in mesh with a rack 1025, carried by the T-piece 1008 associated with the slide translating carriage 1005.

From the foregoing, it will be appreciated, inasmuch as the arcuate slot 1022 represents the extent of movement of the reset arm 1020 in response to a resetting operation of the auxiliary reset shaft 808, that when the carriage 1005 is in its normally retracted position, the resetting arm is free to move independently of the gear 1020 without disturbing the position of the carriage. On the other hand, it will be appreciated that if the carriage is located during a typing operation at any position determined by one of the stop levers 1001, the arm 1020, in response to the resetting operation of the shaft 808, will so cooperate with the segmental gear 1024 as to move that gear, and consequently the carriage 1005, to their normal positions, whereupon the carriage is latched, as shown in Fig. 75, thus permitting the arm 1020 to return to its normal position shown in Fig. 74, leaving the gear 1024 in its reset position.

Mounted for vertical movement within the carriage 1005, is a slide 1026, from the tongue portion of which project a pair of pins 1027, which are accommodated within elongated slots 1028, formed in the carriage, the pins 1027 being connected to a pair of tension springs 1030, which are in turn anchored, as at 1031, to the carriage so that the slide is normally held in its position shown in Figs. 75 and 76. The slide 1026 is provided with a lug 1032, which is adapted to cooperate with one of the plurality of differential levers 618 to 635 inclusive, depending upon the position of the carriage 1005, as determined by one of the stop levers 1001, and is further provided at its upper end with a notch 1034, within which the lower end of a relatively wide depressor foot 1035 is positioned. This depressor foot is pivotally connected at one end, as shown at 1036, to an arm 1037, secured to a horizontally disposed shaft 1038, mounted at opposite ends in bearing supports 1040, mounted on the base of the machine. The other end of the depressor foot 1035 is pivotally connected, as at 1041, to one end of the rocker arm 610, hereinbefore described. Inasmuch as the rocker arm 610 is connected to the control shaft 602, it follows that, when the carriage 1005 is positioned according to whichever one of the stop levers 1001 is depressed, the lug 1003 will cooperate with one of the differential levers 618 to 635 inclusive, corresponding to the depressed stop lever, to rotate the shaft 692 and in turn move the connector member 757 toward the front of the machine, so as to effect justification to the required extent, as determined by the setting of the dial 806 and regardless of whether such justification is of a positive or of a negative character.

In view of the foregoing, no further description of the operation of the present form of justifying unit is believed necessary, except possibly to point out that the means which is brought into operation for releasing the ratchet wheels 695 to 712 inclusive, coincident to the return of the carriage 1005 to its latched position, are the same as and function in the manner hereinbefore described in connection with the justifying unit C.

In the form of justifying unit C''', shown in Figs. 77 to 79, the segmental gear 607, carried by the control shaft 602, meshes with a similar gear 1042, carried by an arm 1044, secured to a shaft 1045, journalled in suitable bearings 1046. The shaft 1045 is provided with a depending arm 1047, to the free end of which is connected an elongated T-piece 1048, to which are pivotally connected, as at 1050, a plurality of differential levers 1051. The levers 1051 are adapted to be held in their normal positions on the T-piece 1048 by tension springs 1052, connected at their lower ends to lugs 1054, carried by the T-piece, and connected at their upper ends to the respective levers 1051. The levers 1051 are adapted to cooperate with a plurality of stop lugs 1055, projecting radially from the peripheral surface of a drum 1056, carried by a shaft 1057, journalled at opposite ends in bearing supports 1058, mounted on the base of the machine, the shaft being provided at one end with a ratchet wheel 1060, cooperating with a holding pawl 1061, pivotally connected, as at 1062, to an arm 1064, carried by one of the bearing supports 1058. The end of the shaft 1057 is adapted for the reception of a dial 1065, which is provided with a zero position and which is graduated to represent 18 word spaces, the zero marking and the various graduation marks being adapted for selective registration with an index mark 1066, provided on a stationary part of the machine adjacent the dial as shown in Fig. 77.

Disposed in a proper relation to the drum 1056, are a plurality of ratchet wheels 1067, which are secured to a shaft 1068, corresponding to the shaft 692 hereinbefore described in connection with the justifying unit C, the shaft 1068 being journalled in bearing supports 1070 and provided at one end with a gear 1071, which corresponds to the gear 694 hereinbefore described in connection with the justifying unit C and which is adapted to be connected in liaison with the connector member 757 through the medium of the gears 781, 782, the shaft 777, the pinion 774, and its cooperating rack 772. Carried by the shaft 1068, adjacent each ratchet wheel 1067, is an actuating arm 1072, to the outer end of which is pivotally connected a spring tensioned driving pawl 1074. Adjacent the driving pawl 1074 there is pivotally supported, as at 1075, a holding pawl 1076, to the lower end of which one end of a tension spring 1077 is connected, the opposite end of the spring being anchored to a depending ear 1078, which is supported by the bearing support 1070. The holding pawl 1076 is normally held out of engagement with its associated ratchet wheel 1067 by a latch bar 1080, which is pivotally supported as at 1081, the latch bar being provided with a pair of arms 1082 and 1084, the former of which is connected by a tension spring 1085 to the depending ear 1078 and the latter of which is provided with a detent 1086, within which is normally held a latch pin 1087, carried by the holding pawl 1076. The latch arm 1080 includes a trip arm 1088, the upper end of which is disposed beneath the arm 1072 and is there provided with a shoulder 1090, with which one of the differential levers 1051 is adapted to cooperate under conditions hereinafter more particularly described.

From the foregoing, it will be understood that as the control shaft 602 responds to space bar operations, the arm 1047 will be moved in a clockwise direction, as viewed in Fig. 79. In the event the dial 1065 is set at its zero point, as when no justification is required, the arm 1047, together with its associated differential levers 1051, is permitted to move unobstructedly, with the result that the actuating arms 1072 are permitted to remain in their normal positions, shown in Fig. 79, and with the result, of course, that the ratchet wheels 1067 remain idle. Should the dial 1065 be so set as to position one of the stop lugs 1055 in the path of movement of one of the differential levers 1051, that lever will be moved in a clockwise direction about its pivot point as the arm 1047 is moved in response to the control shaft 602, in which case the lower end of the differential lever will swing into engagement with the shoulder 1090 of the trip arm 1088 and so move the arm 1084 of the latch 1080 as to free the pin 1087 from the detent 1086 of that arm, whereupon the holding pawl 1076 is moved into engagement with its associated ratchet wheel 1067 under the action of its associated spring

1077. Pursuant to engagement of the shoulder 1090 by the differential lever 1051, that lever upon continued movement engages the outer end of its corresponding arm 1072 and so moves that arm, together with its associated pawl, as to rotate its associated ratchet wheel 1067 in a counterclockwise direction, as viewed in Fig. 79, thus causing the connector member 757 to move toward the front of the machine as described in connection with the justifying unit C.

It is to be noted that the stop lugs 1055 are so distributed and bear such a relation to the differential levers 1051 that they may be selectively positioned with the aid of the dial 1065 for cooperation with the differential levers 1051, and are of such lengths as to obtain different extents of movements of the shaft 1068. For example, if the longest of the stop lugs 1055 is positioned for cooperation with one of the differential levers 1051, the extent of rotation of the shaft 1068 for one space bar operation will be, say, 72 degrees, whereas if the shortest of the stop lugs is positioned for cooperation with one of the differential levers 18 space bar operations are required to effect movement of the shaft 1068 to the same extent.

It is to be noted in the present instance that when the dial 1065 is set in its No. 1 position, as when the line of subject-matter to be typed contains only one word space, the entire extent of justification (either positive or negative and in accordance with which the dial 806 is set at the beginning of a line typing operation) is effected as a result of one space bar operation, whereas two space bar operations are required when the dial is set in position No. 2, and so on up to 18 space bar operations, as when the shortest of the stop lugs is positioned for cooperation with one of the differential levers. In order that the ratchet wheels 1067, together with the connector member 757, may be returned to their normal positions under the influence of the spring drum 780 upon the completion of a line typing operation, the auxiliary reset shaft 808 is provided with an arm 1091, pivotally connected to a link 1092, which in turn is pivotally connected to a reset lever 1094, the reset lever being pivotally supported, as at 1095, and provided at its upper ends with a pair of pins 1096 and 1097, which are positioned respectively for engagement with the depending end portions of the pawls 1074 and 1076. It will become apparent from the foregoing that when the reset shaft 808 is rotated in a clockwise direction, coincident to the resetting operation, the reset lever 1094 will move the pins 1096 and 1097 into engagement with the pawls 1074 and 1076 and will so rotate those pawls as to move them out of engagement with their associated ratchet wheels 1067, thus permitting the spring 780 to return the ratchet wheels and the connector member 757 to their normal positions. As the pawl 1076 is moved out of engagement with its associated ratchet wheel 1067, the spring 1085 serves to move the latch 1080 into holding engagement with the pin 1087. Upon movement of the auxiliary reset shaft 808 in a counterclockwise direction, incident to the completion of the reset operation, the reset lever 1094 will assume its normal position, thus permitting the driving pawl 1074 to move into engagement with its associated ratchet wheel 1067, the holding pawl 1076 being then locked out of engagement with its associated ratchet wheel, in which position it is held until released by one of the differential levers 1051 in the manner hereinbefore described.

MODIFICATION OF KEYBOARD

In order that the typewriter unit A may be adapted for use in typing languages other than, for example, English, there may be provided as many auxiliary keyboards as are deemed necessary to meet varying circumstances, one of which keyboards is illustrated in Figs. 65 and 66 and is there indicated as a whole by the numeral 1098. This auxiliary keyboard includes a frame 1100, which is supported by a plurality of columns 1101 and which is formed with a series of steps 1102, having a plurality of openings 1104 provided therein and corresponding in number to the number of character keys 5. Within each opening 1104 there is disposed for vertical movement a cap 1105, the lower margin of which is provided with a flange 1106 by which undue upward displacement of the cap is prevented. The caps 1105 of the various auxiliary keyboards are provided with indicia corresponding, of course, to the characters of the respective type shuttles and embrace the finger pieces of the several character keys 5, and are provided with spacers 1107, by which the caps are held sufficiently elevated to enable the respective keys to be fully depressed, the ends of the caps normally projecting above the respective steps being of a length somewhat greater than the extent to which the finger pieces are moved downwardly in the typing operation.

Although the present invention offers a practicable solution to many problems wherein line justification is either desirable or necessary, the fact to be especially noted in that connection is that negatives may be produced for use in, for example, the making of photomechanical printing plates, adapted to be employed in various lithographic processes, including offset printing, by carrying out the line justifying operations on a suitable transparent or translucent substance such as paper, textile fabrics, "Celluloid" and analogous materials which, in themselves are pervious to light, but which, if impervious to light, may be so treated as to condition them for the passage of light therethrough, the negatives thus produced being complete in themselves and ready for use, thus obviating the necessity for various expensive processes and operations such as are at present employed, for example, in the making of printing plates for use in newspaper and other similar work.

Aside from the modifications herein shown and described, it is obvious that various other changes may be made and other adaptations resorted to without departing from the spirit of the invention or the scope of the following claims.

What is claimed is:

1. In a machine of the character described, a carriage, key levers and differential spacing means for moving the carriage different distances on the operation of different key levers corresponding to characters of different width including a differential lever pivoted to and shorter than each key lever, means for swinging the differential lever through a predetermined angle on the depression of the corresponding key lever.

2. In a machine of the character described, a carriage, means for moving said carriage including a main shaft, and means for turning said shaft different distances for characters of different widths including a ratchet wheel, a pawl for operating said wheel, an arm carrying said pawl, means for moving said arm and said pawl out of an initial position thereof and in a direction to cause no rotation of said wheel and different distances for characers of different widths, means for operatively connecting the wheel and the carriage, an extensible spring acting on said arm to return the arm to the initial position thereof after said arm has been moved and thereby to cause rotation of the wheel, character key levers, a differential lever pivoted to each of the character levers to operate the main shaft and a relatively fixed stop in the path of each of said differential levers and determining the extent of movement of the differential lever on a full stroke of its key lever.

3. In a machine of the character described, a carriage, and means for moving said carriage different distances for characters of different widths, comprising a carriage-operating member, a plurality of character levers, a differential lever pivoted to each of the character levers, and means interposed in the path of the pivoted lever and operative on the operation of a character lever through a full stroke for controlling the extent of the movement of the pivoted lever, said carriage-operating member being also arranged in the path of the pivoted lever.

4. In a machine for imprinting in line formation on character-imprint receiving material a series of characters of various widths, a carriage for the reception of character-imprint receiving material, means for effecting differential character-spacing movement of the carriage according to the width of a selected character including a series of character levers, a shaft adapted to be rotated by any selected lever of the series, means operatively connecting the shaft to the carriage to move the carriage on the rotation of the shaft, and means including relatively fixed stops responsive to the operation of a selected lever for controlling the angle of rotation of the shaft.

5. In a machine for imprinting in line formation on character-imprint receiving material a series of characters of various widths, a carriage adapted for the reception of character-imprint receiving material, means to effect character-spacing movement of the carriage, and to limit each character-spacing movement of the carriage according to the width of the corresponding character including a series of character levers, a differential lever pivoted to each of the character levers, a shaft rotatable by each of the differential levers on operation of the corresponding character lever, and means for determining the swing of the differential levers and the consequent angle of rotation of the shaft.

6. In a machine of the character described, a carriage, and means to effect a differential spacing movement of the carriage including a carriage operating lever, a differential lever pivoted intermediate its ends to the operating lever, a shaft operatively connected to the carriage, a projection on said shaft engageable and rotatable by said pivoted lever, and means for determining the swing of the pivoted lever and the consequent angle of rotation of the shaft.

7. In a machine of the character described, a carriage, and means for effecting differential spacing movement of the carriage including a carriage operating lever, a shaft adapted to be rotated by the lever, a projection on said shaft, means operatively connecting the shaft to the carriage to move the carriage on the rotation of the shaft, and means responsive to the operation of the lever for controlling the angle of rotation of the shaft including a differential lever pivoted intermediate its ends to the operating lever, and a relatively fixed stop in the path of one end of the differential lever, the other end thereof being arranged to engage said projection.

8. In a machine of the character described, a carriage, a stop member rotatable into a stop-adjusting position thereof, a plurality of stops on said member, said stops varying in size in accordance with different spacing movements to be imparted to the carriage and being relatively fixed in the operative positions thereof, movable means operatively connected to the carriage and controlled in the movement thereof by said stops, and means cooperating with a selected stop for moving the movable means a distance dependent on the selected stop.

9. In a machine of the general nature described, a movable carriage, and means for selectively imparting different spacing movements to the carriage comprising an adjustable stop member provided with a plurality of different stop extensions and rotatable into its adjusted position, a movable carriage-operating member, and a differential lever pivoted intermediate its ends with one end arranged to engage the selected extension and the other end to engage the carriage-operating member, and a spring-pressed pin acting on said other end to urge said other end toward said carriage-operating member, said lever cooperating with the selected extension to move the movable member, the movement of such movable member being dependent on the selected extension.

10. In a machine of the general nature described, a carriage, and means for moving said carriage different spacing distances comprising a shaft, a plurality of operating levers each having uniform movement for each spacing operation, a movable member for each of said levers interposed between the lever and the shaft, a plurality of stops, and means for positioning a selected stop in the path of said movable member.

11. In a machine of the character described, a carriage, a keyboard lever, and means for operatively connecting the keyboard lever to the carriage to impart a differential spacing movement to the carriage comprising a second lever pivoted intermediate its ends to the keyboard lever, means interposable in the path of the second lever for varying the swing of said second lever, a ratchet wheel, a pawl for operating said wheel, means for operatively connecting the pawl to the second lever for moving the pawl on the movement of the second lever, a shaft for said ratchet wheel, and means operatively connecting the shaft to the carriage.

12. In a machine of the general nature described, a carriage, and means for moving said carriage different distances for characters of different widths comprising a shaft, a plurality of character levers each having uniform movement for each operation, a movable member carried and operated by each of said levers and interposed between the lever and the shaft, a second shaft, a plurality of stops carried by said shaft, a selected one of said stops being arranged in the path of said movable member.

13. In a machine of the general nature described having a carriage and key-levers, a carriage-actuating lever arranged upon and operating in conjunction with a key lever, means for controlling the movement of the actuating lever in response to a predetermined movement of the key lever, and means for operatively connecting the actuating lever to the carriage to move the carriage a distance relative to the movement of said actuating lever upon said key lever.

14. In a machine of the general nature described, means for controlling the movement of a main carriage comprising a plurality of pivoted key arms each having a second arm, a pivot connecting the second arm to the key arm, and means to vary the effective movement of said second arm on predetermined movement of the pivot and means for operatively connecting the second arm to the carriage, said means including a pair of cooperating gears of a selected gear ratio, said gears being removable and replaceable by gears of a different gear ratio to change the amount of carriage movement relatively to the amount of movement of said second arm.

15. In a machine of the general nature described, a revoluble bar, a plurality of sets of members of different lengths projecting from the bar, a character-shift lever, means for operatively connecting the shift lever to the bar to rotate the bar and to arrange one of the sets in operative position, and means controlled by the members for moving a main carriage a distance commensurate with the length of a selected member.

16. In a machine of the general nature described, a carriage, a plurality of main levers, a carriage-control lever pivoted upon each of the main levers, a bar bearing obstructions of various lengths interposable in the paths of the carriage-control levers, and means operated by said carriage-control levers for moving said carriage different distances on the operation of different key levers said means including a pair of cooperating gears of a selected gear ratio, said gears being removable and replaceable by gears of a different gear ratio to change the amount of carriage movement relatively to the amount of movement of the carriage control levers.

17. In a machine of the general nature described, a key lever, a second lever pivoted upon said key lever, an obstruction normally spaced from and in the path of one end of said second lever, said obstruction controlling the pivotal movement of said second lever relatively to the key lever during the latter part of the stroke of the key lever in the character-printing direction, and a movable carriage-operating member in the path of movement of the other end of said second lever, said member being moved by said other end only after said one end has been carried by the key lever against said obstruction and movement of the key lever is thereafter continued.

18. In a machine of the general nature described, a key lever, a second lever pivoted upon said key lever and an obstruction fixable in the path of movement of and sufficiently spaced from said second lever to fix one point of said second lever on one side of its pivot against movement, another point of the second lever on the other side of its pivot being movable with said pivot a distance in direct relation to the width of the character to be printed by the key lever, and a rock shaft operated by the second lever and having a projection engaged by the second-mentioned point of the second lever.

19. In a machine of the general nature described, a plurality of key levers, an auxiliary lever pivoted upon each of the key levers, a bar carrying a plurality of obstructions of different lengths, and means for moving a selected obstruction whose length is commensurate with the width of the character corresponding to a selected key lever into a fixed position in the path of that auxiliary lever on said selected key lever.

20. In a machine of the character described, a plurality of key levers, a carriage-control lever pivoted to each of the key levers, stops of different lengths each interposed in the path of one end of one of the control levers and adapted to engage said end of the control lever after predetermined movement of the key lever in a given direction, and a movable carriage-operating member for each control lever, said member being spaced from the corresponding stop of the control lever and arranged in the path of movement of the other end of the control lever, said member being moved by said other end during the final part of the movement of the key lever in said given direction and only after said one end has engaged its stop.

21. In a machine of the character described, a key lever, a differential lever carried by the key lever and movable therewith as a unit and also movable relatively thereto, a stop in spaced relation to and arranged in the path of the differential lever, and a movable carriage-operating member spaced from the stop and also arranged in the path of the differential lever and moved thereby only when the differential lever engages its stop during operation of the key lever.

22. In a machine of the character described, a key lever, a differential lever carried by the key lever and movable therewith as a unit and also swingable thereon, a movable stop in spaced relation to and fixable in the path of the differential lever, and a member arranged for operation by the differential lever only during engagement of the differential lever with said stop.

23. In a machine of the character described, a key lever, a differential lever carried by the key lever, a stop extending in the direction of the path of movement of and for fixing one point of the differential lever against movement during the latter part of the movement of the key lever, and carriage-operating means engageable by another point of the differential lever for operation thereby when said one point is fixed, the effective movement of the second-mentioned point of the differential lever being dependent on the length of said stop.

24. In a machine of the character described, a carriage, and carriage moving means including an oscillatory arm, a pin carried by the arm, a pawl pivotally mounted on the pin, a ratchet wheel engaged by the pawl, and a spring urging said arm in a carriage-moving direction, and means for holding said ratchet wheel against movement at the limit of the return movement of said arm under the influence of said spring including a second pivoted pawl provided with a lug arranged for engagement by said pin to move said pivoted pawl into ratchet-wheel locking position.

25. In a machine of the character described, a carriage, key levers each having a uniform stroke, and means for moving the carriage different distances on the operation of different key levers, said means including a shaft, means interposed between each of the key levers and the shaft for controlling the amount of rotation of the shaft on each complete stroke of a selected key lever, a ratchet wheel, a ratchet shaft loosely carrying the wheel, a first changeable gear loose on the ratchet shaft, a second shaft, a second change gear rotatable by the ratchet wheel and on the second shaft cooperating with the first change gear, said gears being removable and replaceable by gears of a different gear ratio from the gear ratio of said change gears, means for operatively connecting the second shaft to the carriage, and means for operatively connecting the first-mentioned shaft to the ratchet wheel.

26. In a machine of the character described, a carriage, key levers, and means operatively connecting the carriage and the key levers for moving the carriage different distances on the operation of different key levers, said means including a rock shaft, means cooperating with the key levers for rocking the shaft through different angles on the operation of different key levers, a ratchet shaft, a ratchet wheel loose on the ratchet shaft, a first change gear loose on the ratchet shaft and rotatable with the ratchet wheel, means for operatively connecting the first-mentioned shaft to the ratchet shaft, a spring-pulled pawl for the ratchet wheel operated by the ratchet shaft, a second shaft, a second change gear on the second shaft cooperating with the first change gear to control the relative rotation of said ratchet shaft and second shaft, said gears being removable and replaceable by gears having a different gear ratio from the gear ratio of said change gears, and means for operatively connecting the second shaft to the carriage.

27. In a machine of the character described, a carriage, key levers, and means operatively connecting the carriage and the key levers for moving the carriage different distances on the operation of different key levers, said means including a rock shaft, means cooperating with the key levers for rocking the shaft through different angles on the operation of different key levers, a ratchet shaft, a ratchet wheel loose on the ratchet shaft, a first change gear loose on the ratchet shaft and rotatable with the ratchet wheel, means for operatively connecting the first-mentioned shaft to the ratchet shaft, a spring-pulled pawl for the ratchet wheel operated by the ratchet shaft, a second shaft, a second change gear on the second shaft cooperating with the first change gear to control the relative rotation of said ratchet shaft and second shaft, means for operatively connecting the second shaft to the carriage, and means for varying the angle through which the rock shaft is moved by a key lever to provide differential character spacing movements of the carriage for type of different cases including adjustable stop means for the shaft rocking means.

28. In a machine of the character described, a carriage, and drive means for the carriage including a lost-motion mechanism operative to move the carriage, a pair of cooperating change gears interposed between the lost-motion mechanism and the carriage, said change gears being replaceable to vary the movement of the carriage on the given operative movement of said lost-motion mechanism to compensate for variations in the widths of characters of different point sizes, said lost-motion mechanism comprising a lever and adjustable means cooperating with said change gears and arranged in the path of the lever for rendering said mechanism operative to move the carriage through different distances corresponding to differences in the widths of corresponding characters of different case.

29. In a machine of the character described, a carriage, a lost-motion drive mechanism for imparting variable character-spacing movements to the carriage, in accordance with variations in the widths of characters of a given point size, means including a pair of cooperating change gears interposed between the carriage and said mechanism and replaceable by gears of a different gear ratio for varying the relative operative movements of the mechanism and the carriage to compensate for variations in the widths of corresponding characters of different point sizes and control means in said mechanism to impart variable effective movements to said mechanism in accordance with variations in the widths of corresponding characters of different case.

30. In a machine of the general nature described, a set of character levers for a plurality of sets of characters, a shift lever for selecting one of said sets of characters, an adjustable stop member, means controlled by the shift lever for fixing the stop member in its adjusted operative position, a plurality of sets of stops of different sizes carried by the stop member, a carriage, a carriage-operating member, and means actuated by the character levers and cooperating with that set of stops selected by the shift lever for actuating the carriage-operating member to move the carriage different character-spacing distances.

31. In a machine of the general nature described, a rotatable stop member, a plurality of sets of stops on said member, the stops of each set varying in size from the other stops in the set in accordance with characters of different widths and the stops of different sets varying in size in accordance with the case of the character controlled by said set, means for rotating the stop member and for also controlling the case of selected characters to removably fix a selected set of stops in the operative position thereof, and carriage-moving means cooperating with the stops for moving the carriage different character-spacing distances.

HARRY C. JONES.